US012264469B2

(12) United States Patent
Reed et al.

(10) Patent No.: US 12,264,469 B2
(45) Date of Patent: Apr. 1, 2025

(54) DRAIN CLEANING MACHINE

(71) Applicant: MILWAUKEE ELECTRIC TOOL CORPORATION, Brookfield, WI (US)

(72) Inventors: Michael C. Reed, Milwaukee, WI (US); Sean T. Kehoe, Hartland, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/480,590

(22) Filed: Oct. 4, 2023

(65) Prior Publication Data

US 2024/0026669 A1 Jan. 25, 2024

Related U.S. Application Data

(63) Continuation of application No. 17/335,463, filed on Jun. 1, 2021, now Pat. No. 11,821,188, which is a (Continued)

(51) Int. Cl.
*E03C 1/302* (2006.01)
*B08B 9/045* (2006.01)

(52) U.S. Cl.
CPC .............. *E03C 1/302* (2013.01); *B08B 9/045* (2013.01)

(58) Field of Classification Search
CPC ........... B08B 9/045; E03C 1/302; E03F 9/005
See application file for complete search history.

(56) References Cited

U.S. PATENT DOCUMENTS 1,842,166 A 1/1932 Haines
2,102,917 A 12/1937 Rolland
(Continued)

FOREIGN PATENT DOCUMENTS

CA 3021277 A1 * 4/2019 ............. B08B 9/045
CN 85104869 A 8/1986
(Continued)

OTHER PUBLICATIONS

International Search Report and Written Opinion for Application No. PCT/US2019/045626 dated Jan. 21, 2020 (24 pages).
(Continued)

*Primary Examiner* — Marc Carlson
(74) *Attorney, Agent, or Firm* — Michael Best & Friedrich LLP

(57) ABSTRACT

A drain cleaning machine for moving a snake in a drain. The drain cleaning machine includes a housing, a motor configured to move the snake in the drain, a switch trigger configured to move between a first switch trigger position and a second switch trigger position, an actuating lever moveable between a deactivated position and an activated position, and a switch linkage configured to be moved by the actuating lever between a first switch linkage position and a second switch linkage position. In response to the actuating lever moving from the deactivated position to the activated position, the switch linkage is moved from the first switch linkage position to the second switch linkage position, and in response to the actuating lever moving from the activated position to the deactivated position, the switch linkage is moved from the second switch linkage position to the first switch linkage position.

20 Claims, 37 Drawing Sheets

Related U.S. Application Data continuation of application No. 16/535,321, filed on Aug. 8, 2019, now Pat. No. 11,021,859.

(60) Provisional application No. 62/785,328, filed on Dec. 27, 2018, provisional application No. 62/746,040, filed on Oct. 16, 2018, provisional application No. 62/726,582, filed on Sep. 4, 2018, provisional application No. 62/717,411, filed on Aug. 10, 2018.

(56) References Cited

U.S. PATENT DOCUMENTS 2,223,005 A 11/1940 Kerber
2,267,493 A 12/1941 Clotz
2,468,490 A 4/1949 Joseph
2,504,391 A 4/1950 Carson
2,730,740 A 1/1956 O'Brien
2,926,372 A 3/1960 O'Brien
2,926,775 A 3/1960 O'Brien
2,953,799 A 7/1960 Arnold
2,960,851 A 11/1960 Ciaccio
3,007,186 A 11/1961 Olsson
3,025,547 A 3/1962 Ciaccio
3,071,794 A 1/1963 Prange
3,083,391 A * 4/1963 Prange .................... E03F 9/005 226/49
3,095,592 A 7/1963 Hunt
3,159,861 A 12/1964 Sarcone
3,176,335 A 4/1965 Ciaccio et al.
3,206,782 A 9/1965 Larsen
3,213,473 A 10/1965 Singer
3,224,024 A 12/1965 Hunt
3,242,518 A 3/1966 Prange
3,246,354 A 4/1966 Cooney et al.
3,451,089 A 6/1969 Carlson et al.
3,451,090 A 6/1969 Presti et al.
3,605,158 A 9/1971 Russell
3,727,261 A 4/1973 Levine
3,882,565 A * 5/1975 Irwin ...................... B08B 9/045 15/104.33
3,928,885 A * 12/1975 Peterson .............. B65H 75/364 242/387
3,983,593 A * 10/1976 Naeve ..................... E03F 9/005 254/134.3 FT
4,153,966 A * 5/1979 Irwin ...................... E03F 9/005 15/104.33
4,246,802 A * 1/1981 Rasmussen ........... F16H 19/025 74/25
4,266,709 A * 5/1981 Kruger .................. B08B 9/0436 254/134.3 FT
4,364,139 A * 12/1982 Babb ....................... E03F 9/005 15/104.33
4,395,791 A * 8/1983 Irwin ...................... E03F 9/005 226/25
4,570,281 A * 2/1986 Boelens .................. B08B 9/045 15/104.33
4,580,306 A * 4/1986 Irwin ...................... B08B 9/045 226/52
4,611,360 A * 9/1986 Irwin ...................... B08B 9/045 15/104.33
4,686,732 A * 8/1987 Irwin ...................... B08B 9/045 226/52
5,031,263 A * 7/1991 Babb ....................... E03F 9/005 74/567
5,031,276 A * 7/1991 Babb ....................... B08B 9/045 280/43.12
5,193,242 A * 3/1993 Irwin ...................... B08B 9/045 15/104.31
5,195,392 A * 3/1993 Moore .................... F16L 55/18 356/241.3
5,199,129 A * 4/1993 Salecker ................. E03F 9/005 226/25
5,239,724 A * 8/1993 Salecker ................. E03F 9/005 15/104.33
5,283,922 A * 2/1994 Ruprecht ................ E03F 9/005 15/104.33
5,309,595 A * 5/1994 Salecker ................. E03F 9/005 15/257.01
5,426,807 A * 6/1995 Grimsley ................ E03F 9/005 15/104.095
5,507,062 A * 4/1996 Salecker ................. E03F 9/005 74/25
5,603,136 A * 2/1997 Truschler ................ B08B 9/045 15/104.33
5,636,403 A 6/1997 Grimsley et al.
5,640,736 A * 6/1997 Salecker ................. B08B 9/045 15/104.31
5,657,505 A * 8/1997 Gallagher ............... E03F 9/005 15/104.33
5,862,561 A * 1/1999 Irwin ...................... B08B 9/045 15/104.31
5,901,401 A * 5/1999 Rutkowski ............. E03F 9/005 15/104.31
5,996,159 A 12/1999 Irwin
6,009,588 A * 1/2000 Rutkowski ............. B08B 9/045 15/104.33
6,243,905 B1 6/2001 Rutkowski
6,343,398 B1 * 2/2002 Silverman ............... B08B 9/045 15/104.31
6,360,397 B1 * 3/2002 Babb ....................... B08B 9/045 15/104.33
6,381,798 B1 * 5/2002 Rutkowski ............. B08B 9/045 15/104.33
6,412,136 B1 7/2002 Rutkowski
6,637,064 B2 * 10/2003 Silverman ............... B08B 9/045 15/104.31
6,655,228 B1 * 12/2003 Margherio ............. E03F 9/005 74/424.77
7,222,383 B2 * 5/2007 Hale ....................... B08B 9/045 474/903
7,367,077 B2 * 5/2008 Rutkowski ............. B08B 9/045 15/104.31
7,478,451 B2 * 1/2009 Rutkowski ............. B08B 9/045 74/424.77
7,676,879 B1 * 3/2010 Rutenberg ............. B08B 9/045 15/104.31
7,685,669 B2 3/2010 Rutkowski et al.
7,889,980 B2 * 2/2011 Sooy .................... G05B 19/042 396/19
7,935,192 B2 * 5/2011 Silverman ............... B08B 9/045 15/104.095
8,046,862 B2 * 11/2011 Eisermann ............. B65H 61/00 242/563.2
8,060,868 B2 * 11/2011 Meijer ...................... G06F 8/72 717/114
8,176,593 B2 * 5/2012 Gress ...................... B08B 9/045 242/563.2
8,413,347 B2 4/2013 Gress et al.
8,615,837 B2 * 12/2013 Hale ....................... B08B 9/045 318/245
8,646,143 B2 * 2/2014 Lokkinen ................ E03F 9/005 242/390.8
9,009,906 B2 4/2015 Hale et al.
9,550,649 B2 * 1/2017 Zink ...................... B65H 79/00
2005/0246846 A1 * 11/2005 Rutkowski ............. E03F 9/005 254/134.3 FT
2008/0098544 A1 * 5/2008 Rutkowski ............. E03F 9/005 15/104.33
2008/0148503 A1 * 6/2008 Babb ....................... B08B 9/045 15/104.33
2008/0244816 A1 * 10/2008 Babb ......................... E03D 9/00 4/255.01
2010/0005603 A1 * 1/2010 Liu ......................... B08B 9/045 15/28
2013/0160227 A1 * 6/2013 Rutkowski ............ B08B 9/0436 15/104.33
2013/0160583 A1 * 6/2013 Kai ..................... F16H 25/2261 74/89.23

(56) References Cited

U.S. PATENT DOCUMENTS

| | | | | |
|---|---|---|---|---|
| 2014/0352464 | A1* | 12/2014 | Zink | F16H 19/04 74/30 |
| 2016/0175899 | A1* | 6/2016 | Dunkin | B08B 9/045 226/143 |
| 2017/0284078 | A1* | 10/2017 | Puzio | E03F 9/005 |
| 2017/0304879 | A1* | 10/2017 | Hsu | B08B 9/04 |
| 2018/0030715 | A1* | 2/2018 | Miller | E03C 1/302 |
| 2018/0080212 | A1* | 3/2018 | Cole | E03F 9/002 |
| 2018/0147612 | A1* | 5/2018 | Kehoe | E03F 9/005 |
| 2018/0169719 | A1* | 6/2018 | Turner | E03F 7/12 |
| 2020/0048885 | A1* | 2/2020 | Reed | E03F 9/005 |

FOREIGN PATENT DOCUMENTS

| | | | | |
|---|---|---|---|---|
| CN | 101180139 | A | 5/2008 | |
| CN | 101631918 | A | 1/2010 | |
| CN | 101782681 | B | 7/2010 | |
| CN | 201661850 | U | 12/2010 | |
| CN | 102036759 | B | 4/2011 | |
| CN | 204738359 | U | 11/2015 | |
| CN | 204980665 | U | 1/2016 | |
| DE | 2244206 | C2 | 3/1974 | |
| DE | 3221245 | A1 | 12/1983 | |
| DE | 3535972 | A1 | 5/1986 | |
| DE | 19739359 | A1 | 5/1999 | |
| DE | 10227204 | B4 | 1/2004 | |
| DE | 102006006602 | A1 | 8/2007 | |
| DE | 102008015532 | A1 | 10/2009 | |
| DE | 202011109885 | U1 | 8/2012 | |
| DE | 202011109887 | U1 | 8/2012 | |
| DE | 202008018563 | U1 | 11/2015 | |
| DE | 202014011027 | U9 | 10/2020 | |
| EP | 0065474 | B1 | 11/1982 | |
| EP | 0530304 | A1 | 3/1993 | |
| EP | 0607612 | A1 | 7/1994 | |
| EP | 0786564 | A1 * | 7/1997 | |
| EP | 1818114 | B1 | 8/2007 | |
| EP | 1871548 | A0 | 1/2008 | |
| EP | 2371462 | B1 | 10/2011 | |
| EP | 2189868 | B1 | 4/2013 | |
| EP | 2587332 | B1 | 7/2014 | |
| EP | 2587333 | B1 | 7/2014 | |
| EP | 2313211 | B1 | 9/2015 | |
| EP | 2539087 | B1 | 9/2016 | |
| EP | 3276097 | A1 | 1/2018 | |
| GB | 2171848 | A * | 9/1986 | H01H 13/68 |
| JP | 2007054738 | A | 3/2007 | |
| KR | 20150115509 | A | 10/2015 | |
| KR | 20160143309 | A | 12/2016 | |
| NL | 9100342 | A | 9/1992 | |
| WO | 9118236 | A2 | 11/1991 | |
| WO | 2006112847 | A1 | 10/2006 | |
| WO | 2006112848 | A1 | 10/2006 | |
| WO | 2008079702 | A1 | 7/2008 | |
| WO | 2009143497 | A2 | 11/2009 | |
| WO | 2011104432 | A1 | 9/2011 | |
| WO | 2016141923 | A1 | 9/2016 | |

OTHER PUBLICATIONS

Partial Supplementary European Search Report for Application No. 19846372.1 dated Aug. 8, 2022 (13 pages).

* cited by examiner

DRAIN CLEANING MACHINE

CROSS-REFERENCE TO RELATED APPLICATIONS

This application is a continuation of U.S. patent application Ser. No. 17/335,463 filed on Jun. 1, 2021, now U.S. Pat. No. 11,821,188, which is a continuation of U.S. patent application Ser. No. 16/535,321 filed on Aug. 8, 2019, now U.S. Pat. No. 11,021,859, which claims priority to U.S. Provisional Patent Application No. 62/785,328 filed on Dec. 27, 2018, U.S. Provisional Patent Application No. 62/746,040 filed on Oct. 16, 2018, U.S. Provisional Patent Application No. 62/726,582 filed on Sep. 4, 2018, and U.S. Provisional Patent Application No. 62/717,411 filed on Aug. 10, 2018, the entire contents of all of which are incorporated herein by reference.

FIELD OF THE INVENTION

The present invention relates to drain cleaning machines, and more particularly to sectional drain cleaning machines.

BACKGROUND OF THE INVENTION

Drum-type and sectional drain cleaning machines are both used to feed a snake (e.g., a cable or spring) through a drain to clean the drain. Drum-type machines rotate a drum containing the snake to feed the snake into the drain. In sectional drain cleaning machines, the snake is not stored in the machine and is instead fed into the machine.

SUMMARY OF THE INVENTION

The present invention provides, in one aspect, a drain cleaning machine for moving a snake in a drain. The drain cleaning machine includes a housing, a snake passage in the housing and defining a snake axis, a motor configured to move the snake in the drain when the snake is arranged along the snake axis and the motor is activated, a switch trigger configured to move between a first switch trigger position, in which the motor is not activated, and a second switch trigger position, in which the motor is activated, the switch trigger biased to the first switch trigger position, an actuating lever moveable between a deactivated position and an activated position, and a switch linkage configured to be moved by the actuating lever between a first switch linkage position, in which the switch trigger is moved to the first switch trigger position, and a second switch linkage position, in which the switch trigger is moved to the second switch trigger position. In response to the actuating lever moving from the deactivated position to the activated position, the switch linkage is moved from the first switch linkage position to the second switch linkage position, and in response to the actuating lever moving from the activated position to the deactivated position, the switch linkage is moved from the second switch linkage position to the first switch linkage position.

The present invention provides, in another aspect, a drain cleaning machine for moving a snake in a drain. The drain cleaning machine includes a housing, a snake passage in the housing and defining a snake axis, a motor configured to move the snake in the drain when the snake is arranged along the snake axis and the motor is activated, a switch trigger configured to activate the motor when pressed, an actuating lever moveable between a deactivated position and an activated position, a switch linkage configured to be moved by the actuating lever toward the switch trigger, a plunger configured to depress the switch trigger, a spring seated against the plunger and configured to bias the switch linkage away from the plunger, and an actuating lever moveable between a deactivated position and an activated position. When the actuating lever moves to the activated position, the push member pushes the switch linkage toward the switch trigger, compressing the spring and pushing the plunger toward the switch trigger, causing the plunger to depress the switch trigger.

The present invention provides, in yet another aspect, a drain cleaning machine for moving a snake in a drain. The drain cleaning machine includes a snake passage in the housing and defining a snake axis, a motor configured to move the snake in the drain when the snake is arranged along the snake axis and the motor is activated, a radial drive mechanism used to spin the snake about the snake axis, the radial drive mechanism being switchable between an engaged state and a disengaged state, a translate mechanism used to translate the snake along the snake axis, the translate mechanism being switchable between an engaged state and a disengaged state, a selection mechanism configured to switch the radial drive mechanism from the disengaged state to the engaged state and configured to switch the translate mechanism from the disengaged state to the engaged state, a switch trigger configured to move between a first switch trigger position, in which the motor is not activated, and a second switch trigger position, in which the motor is activated, the switch trigger biased to the first switch trigger position, an actuating lever moveable between a deactivated position and an activated position, and a switch linkage configured to be moved by the actuating lever between a first switch linkage position, in which the switch trigger is moved to the first switch trigger position, and a second switch linkage position, in which the switch trigger is moved to the second switch trigger position. Moving the actuating lever to the activated position activates the motor and causes the selection mechanism to engage the translate mechanism or the radial drive mechanism.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

First Embodiment—Drain Cleaning Machine 10

Figure 1:
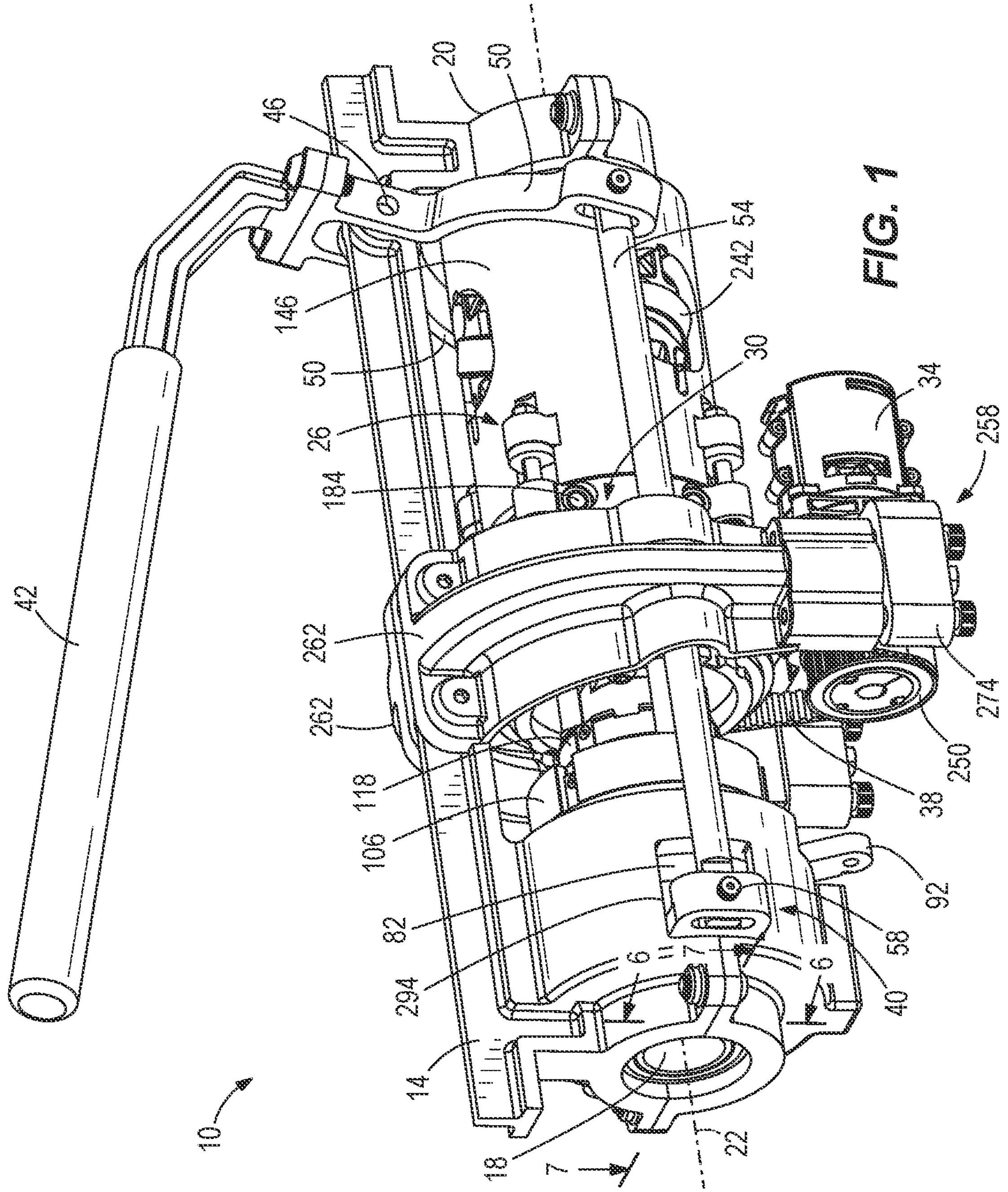
FIG. 1 is a perspective view of a drain cleaning machine.
Figure 2:
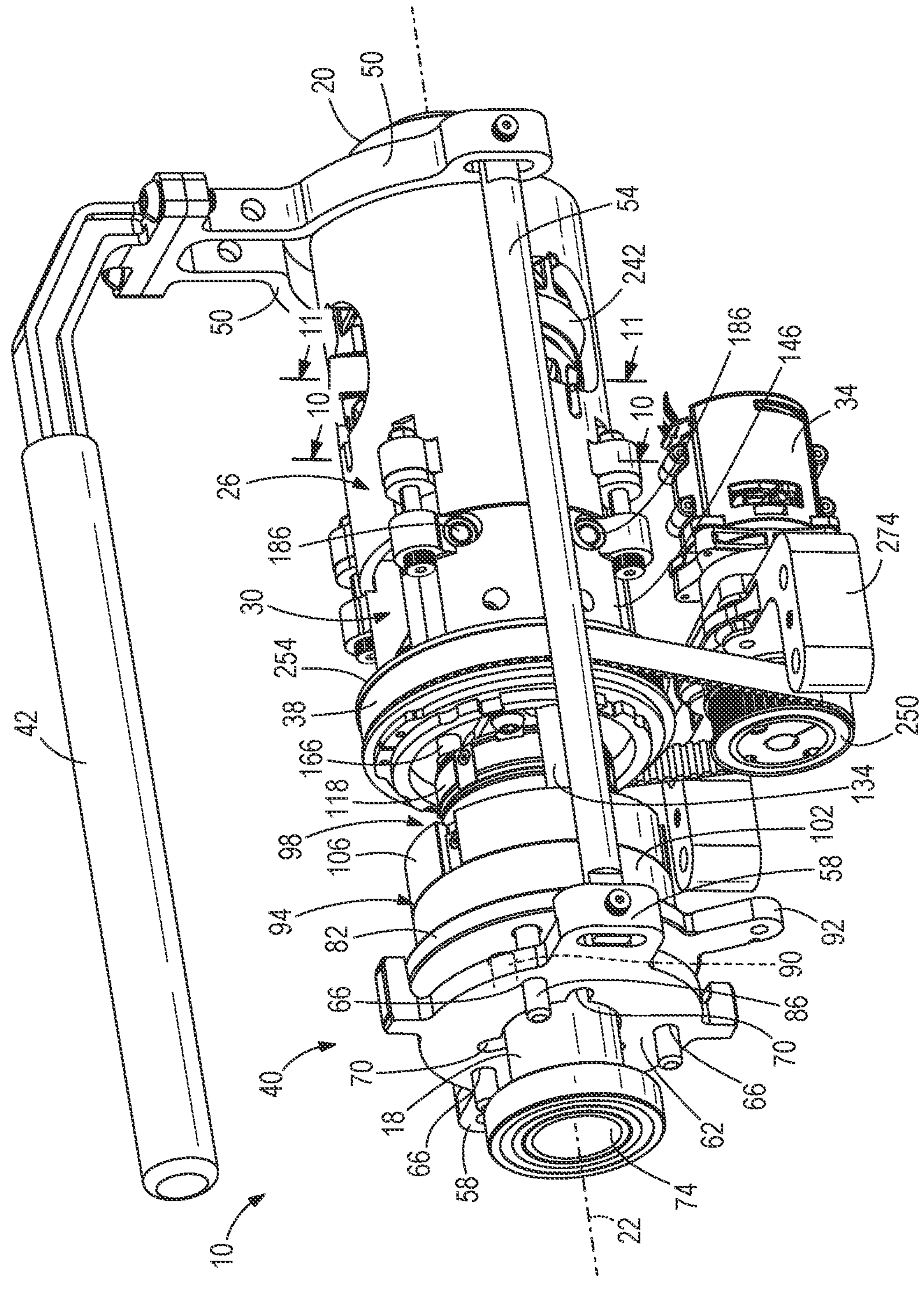
FIG. 2 is a perspective view of the drain cleaning machine of FIG. 1, with portions removed.

As shown in FIGS. 1 and 2, a drain cleaning machine 10 includes an inner frame 14, a snake outlet tube 18 and snake inlet tube 20 collectively defining a snake axis 22, a translate mechanism 26, a radial drive mechanism 30, and a motor 34 to rotate the feed and radial drive mechanisms 26, 30 about the snake axis 22. In the illustrated embodiment, the motor

34 is operatively coupled to and rotates the feed and radial drive mechanisms 26, 30 via a belt 38. In some embodiments, the drain cleaning machine 10 is a DC battery powered drain cleaning machine in which the motor 34 is powered by a battery or battery pack. The battery pack may be received in a battery compartment. In some embodiment, the battery compartment may have a battery door that seals and isolates the battery from the contaminated environment, thereby keeping the battery clean and dry. In some embodiments, in addition to being powered by the battery, the drain cleaning machine 10 and motor 34 can also be powered by AC power. In alternative embodiments, the drain cleaning machine 10 and motor 34 can only be powered by AC power. The translate mechanism 26 is used to translate a snake (e.g., a cable or spring) (not shown) along the snake axis 22 into or out of a drain. The radial drive mechanism 30 is used to spin the snake about the snake axis 22.

The drain cleaning machine 10 also includes a selection mechanism 40 including an actuating lever 42, a push plate 62, and a selection plate 82. The actuating lever 42 pivots on the inner frame 14 about a pivot point 46 between an activated position shown in FIG. 2 and a deactivated position shown in FIG. 1. In some embodiments, the actuating lever 42 activates the motor 34 when set to the activated position. In alternative embodiments, instead of actuating lever 42, a separate switch or actuator, such as a foot pedal, can be used to activate the motor 34. As described in further detail below, the selection mechanism 40 allows an operator to switch between selecting the translate mechanism 26 or the radial drive mechanism 30 in manipulating the snake. The actuating lever 42 has a pair of arms 50 respectively coupled to a pair of pull linkages 54. The pull linkages 54 are coupled to a pair of arms 58 of the push plate 62 that can translate in a direction parallel to the snake axis 22, as explained in further detail below.

Figure 3:
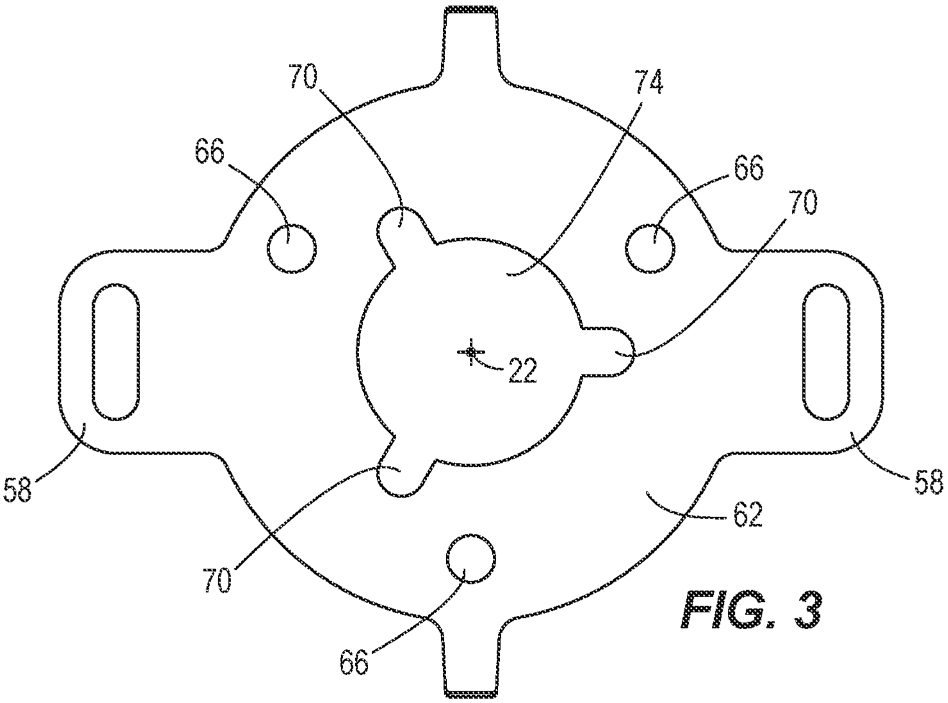
FIG. 3 is a plan view of a push plate of the drain cleaning machine of FIG. 1.

As shown in FIG. 3, the push plate 62 includes a plurality of outer apertures 66 and a plurality of inner apertures 70. The outer apertures 66 and inner apertures 70 are arranged parallel to the snake axis 22. In the illustrated embodiment, the push plate 62 includes three outer apertures 66 and three inner apertures 70. In other embodiments, the push plate 62 may include more or fewer outer and inner apertures 66, 70. The three inner apertures 70 extend from a central aperture 74 to accommodate the snake outlet tube 18 and to allow the push plate 62 to translate along the snake outlet tube 18.

Figure 4:
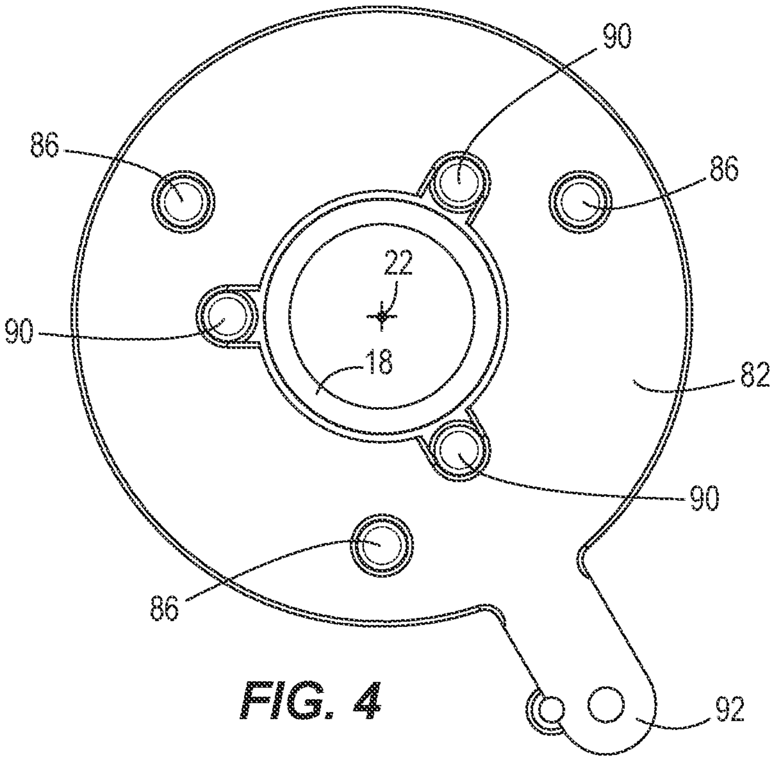
FIG. 4 is a plan view of a selection plate of the drain cleaning machine of FIG. 1.
Figure 5:
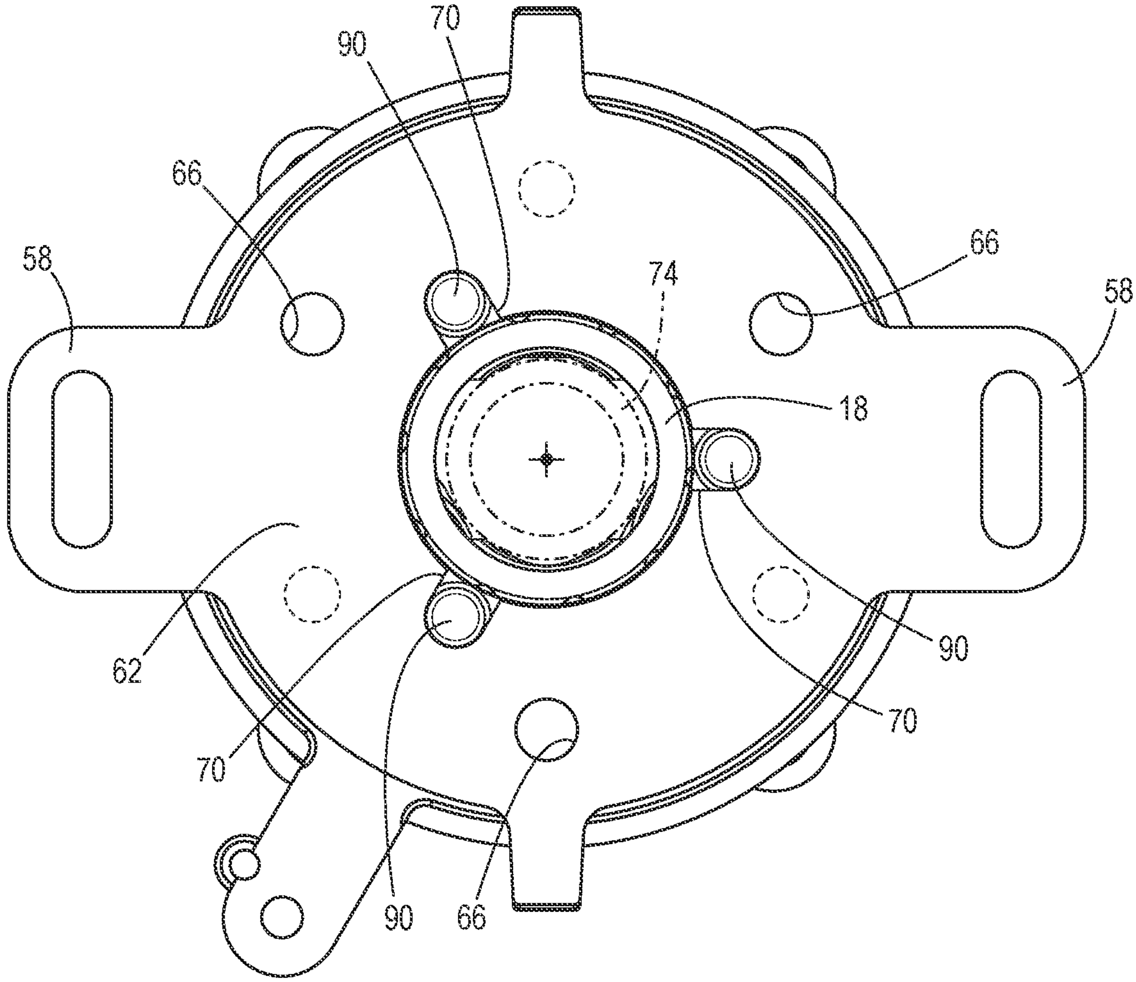
FIG. 5 is a plan view of the push plate and the selection plate of the drain cleaning machine of FIG. 1, with the selection plate in a translate position.
Figure 12:
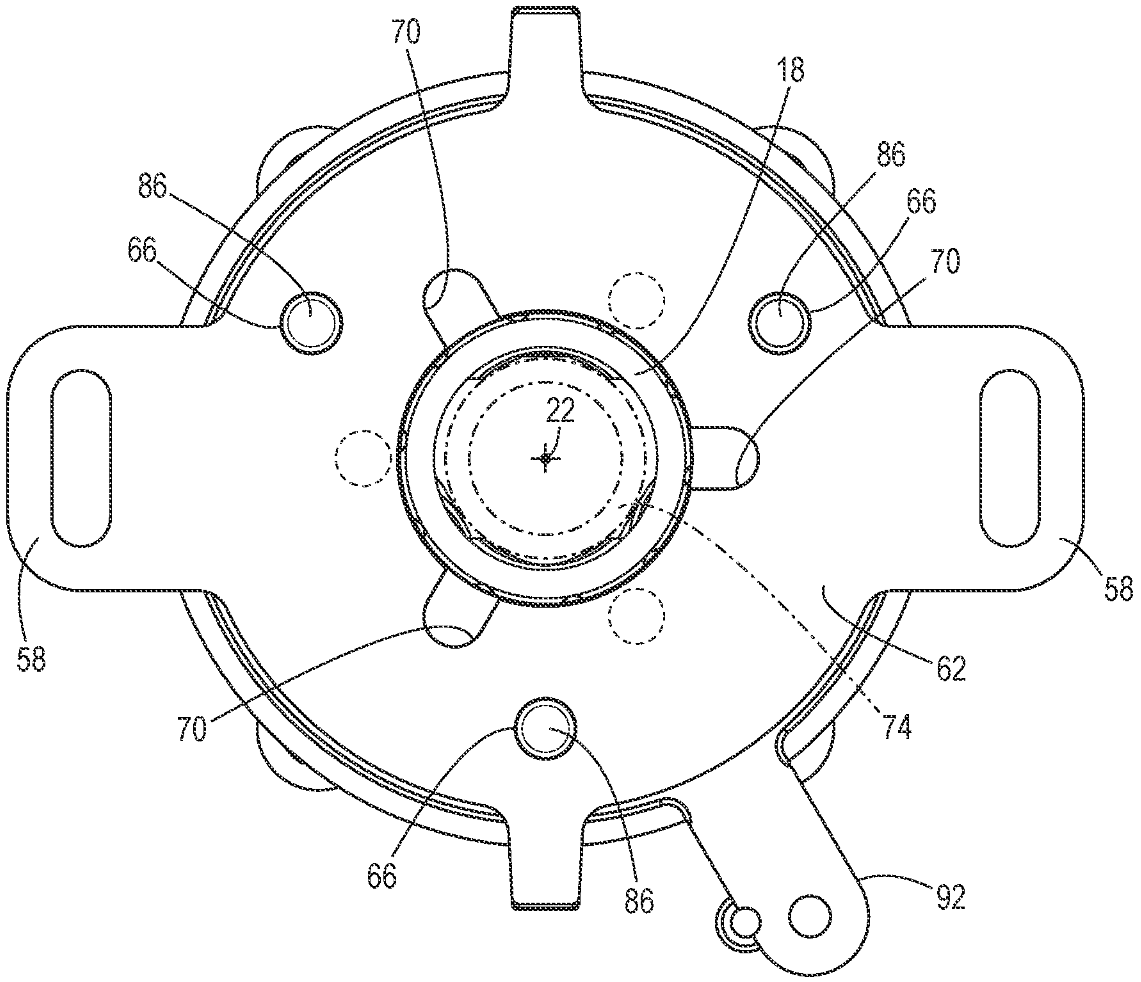
FIG. 12 is a plan view of the push plate and the selection plate of the drain cleaning machine of FIG. 1, with the selection plate in a radial drive position.

With reference to FIG. 4, the selection plate 82 supports a plurality of outer pins 86 and a plurality of inner pins 90 that are also part of the selection mechanism 40. The selection plate 82 includes a finger 92 to allow an operator to rotate the selection plate between a translate position shown in FIGS. 5 and 6 and a radial drive position shown in FIGS. 4, 12, and 13. When the selection plate 82 is in the translate position, the inner pins 90 are aligned with the inner apertures 70 of the push plate 62, and the outer pins 86 are not aligned with the outer apertures 66, as shown in FIG. 5. When the selection plate 82 is in the radial drive position, the outer pins 86 are aligned with the outer apertures 66 of the push plate 62, and the inner pins 90 are not aligned with the inner apertures 70, as shown in FIG. 12. As explained in further detail below, when the selection plate 82 is in the translate position, the selection mechanism 40 can switch the translate mechanism 26 from a disengaged state to an engaged state. When the selection plate 82 is in the radial drive position, the selection mechanism 40 can switch the translate mechanism 26 from a disengaged state to an engaged state.

Figure 6:
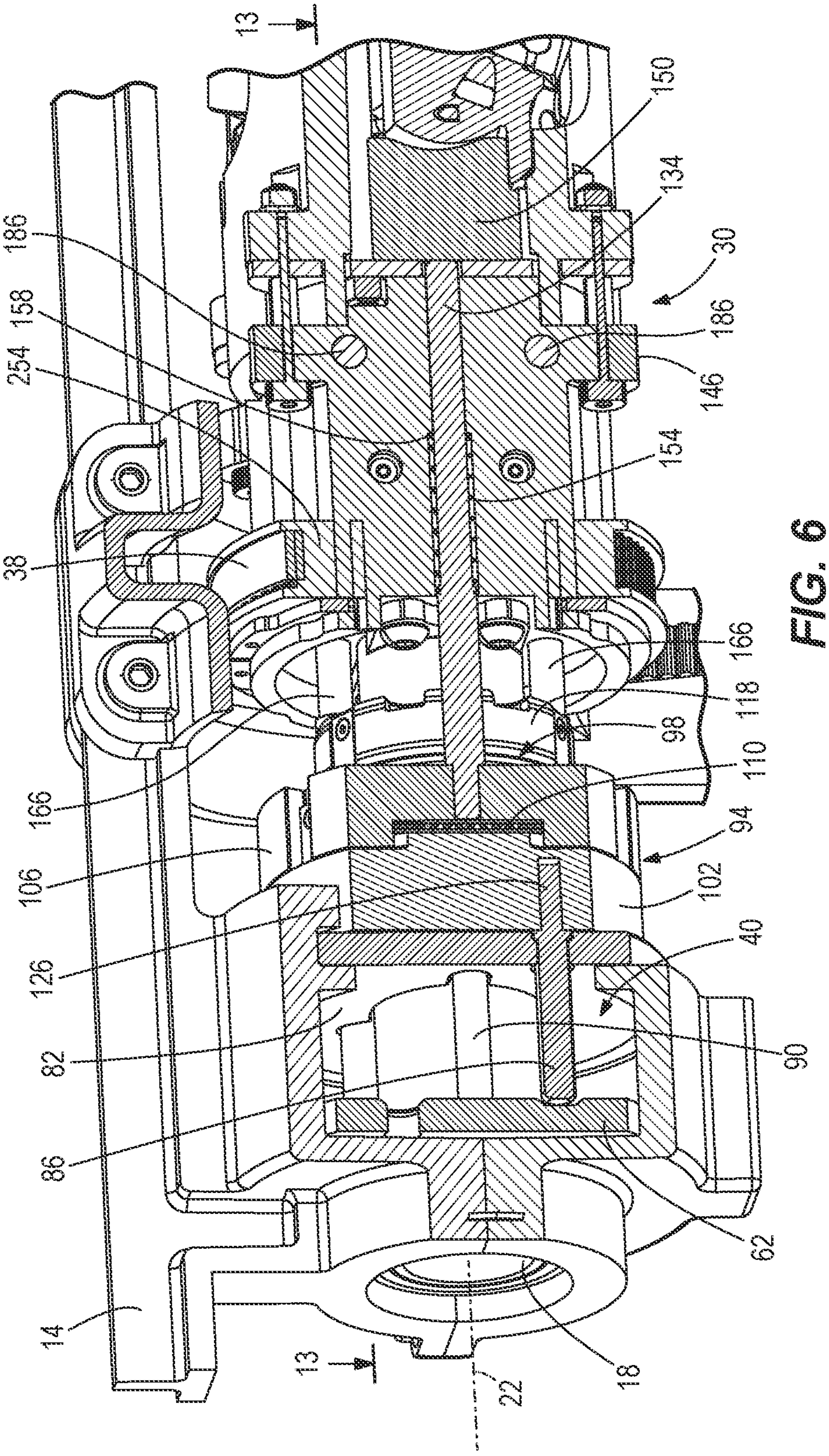
FIG. 6 is a cross-sectional view of the drain cleaning machine taken along section line 6-6 of FIG. 1.
Figure 7:
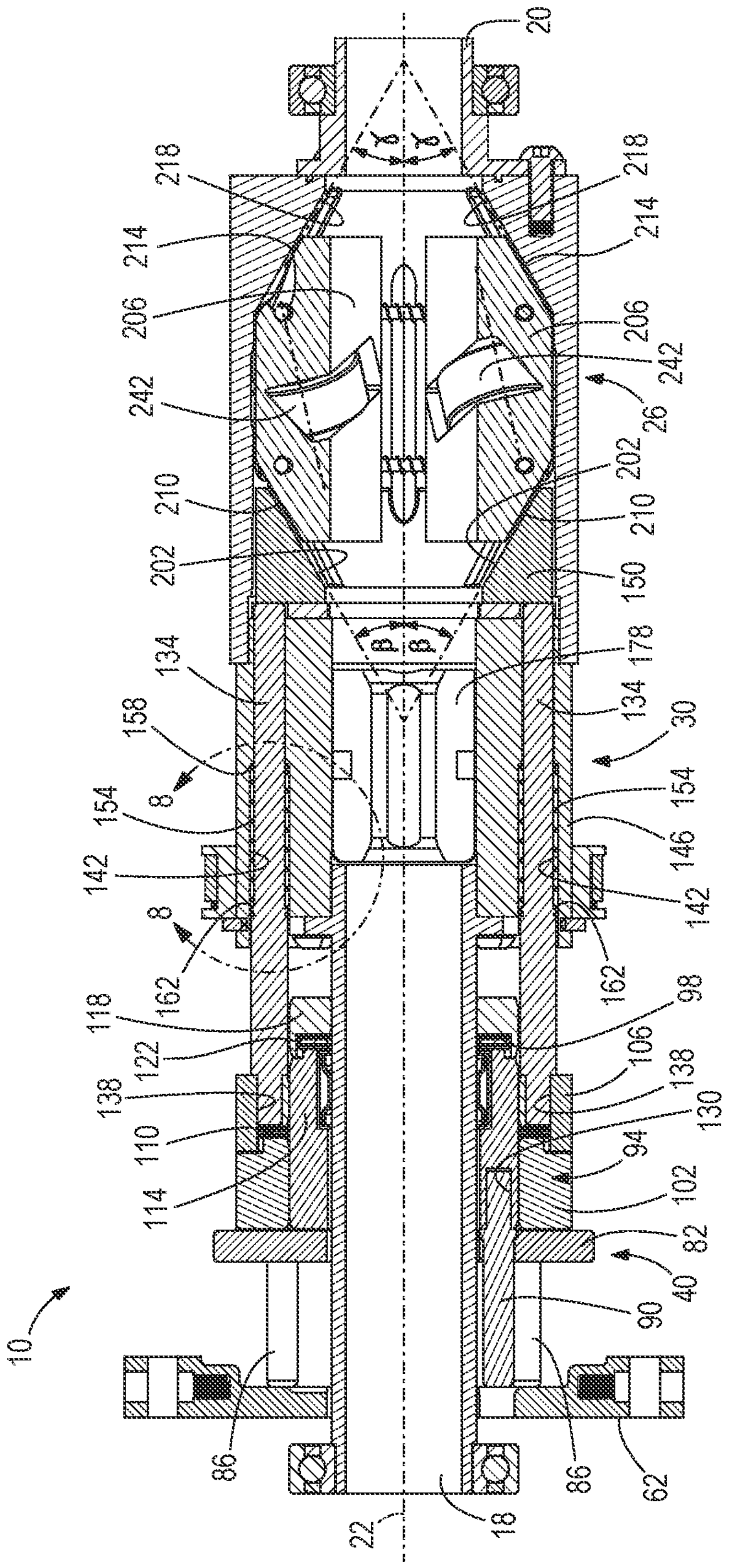
FIG. 7 is a cross-sectional view of the drain cleaning machine taken along section line 7-7 of FIG. 1.
Figure 13:
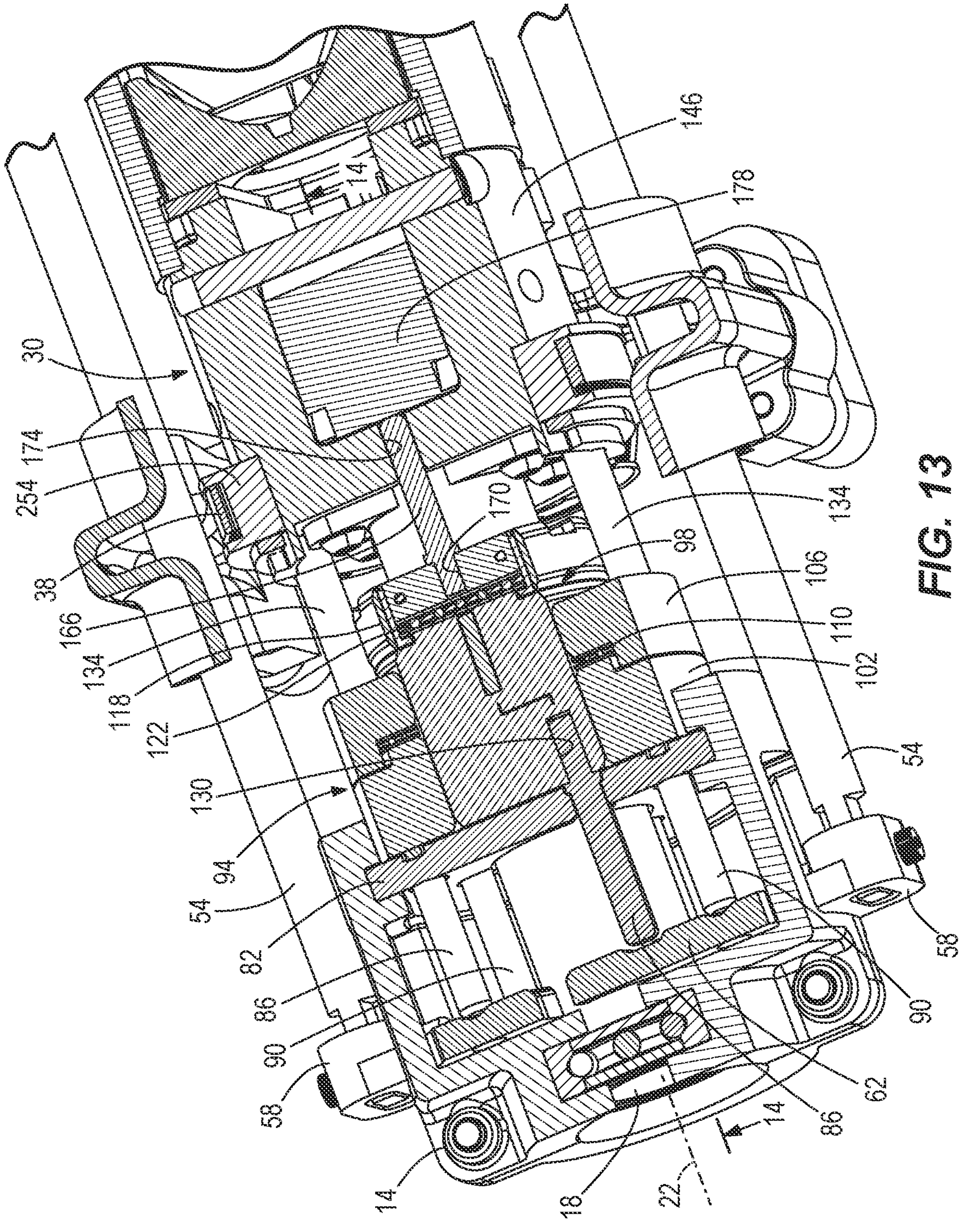
FIG. 13 is a cross-sectional view of a portion of the drain cleaning machine of FIG. 1.
Figure 14:
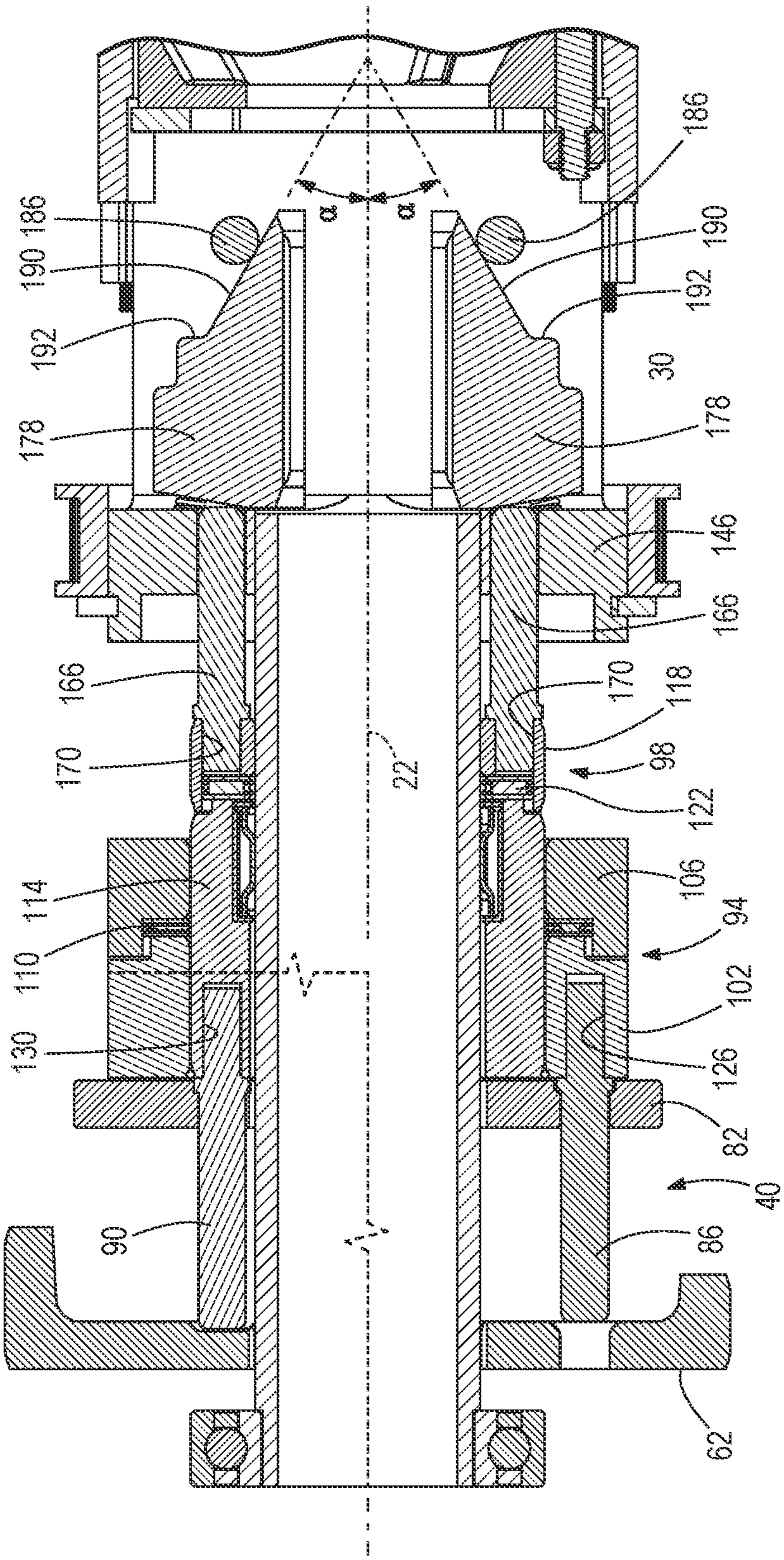
FIG. 14 is a cross sectional view of a portion of the drain cleaning machine taken along section line 14-14 of FIG. 13.

With reference to FIGS. 2, 6, 7, 9, 13 and 14, the drain cleaning machine 10 also includes an outer thrust assembly 94 and an inner thrust assembly 98. Both the outer and inner thrust assemblies 94, 98 are supported by the snake oulet tube 18. In other embodiments, the outer and inner thrust assemblies 94, 98 are not supported by the snake outlet tube 18, and instead are respectively supported by outer push rods 134 and inner push rods 166, described below. The outer thrust assembly 94 includes a first race 102, a second race 106, and an outer thrust bearing 110 with a plurality of rollers in between the first and second races 102, 106. The inner thrust assembly 98 includes a first race 114, a second race 118, and an inner thrust bearing 122 with a plurality of rollers in between the first and second races 114, 118. With reference to FIGS. 6 and 14, the outer pins 86 of the selection mechanism 40 are arranged in bores 126 of the first race 102 of the outer thrust assembly 94. With reference to FIGS. 7 and 13, the inner pins 90 of the selection mechanism 40 are arranged in bores 130 of the first race 114 of the inner thrust assembly 98.

Figure 8:
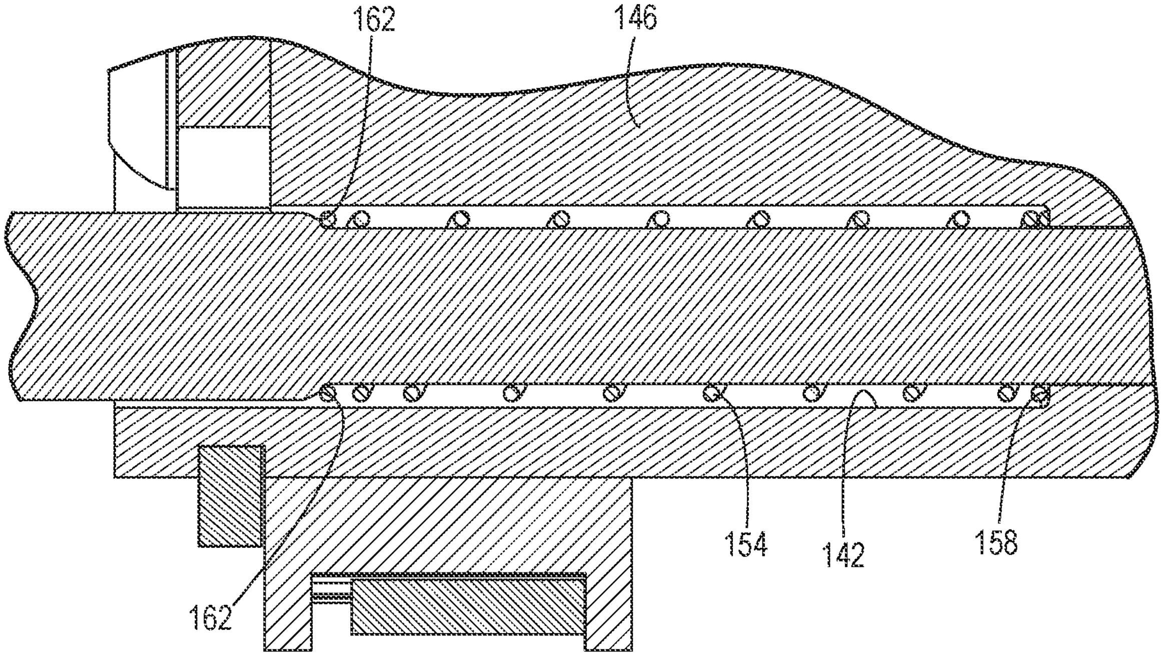
FIG. 8 is an enlarged view of a portion of the cross-section of the drain cleaning machine of FIG. 7.
Figure 9:
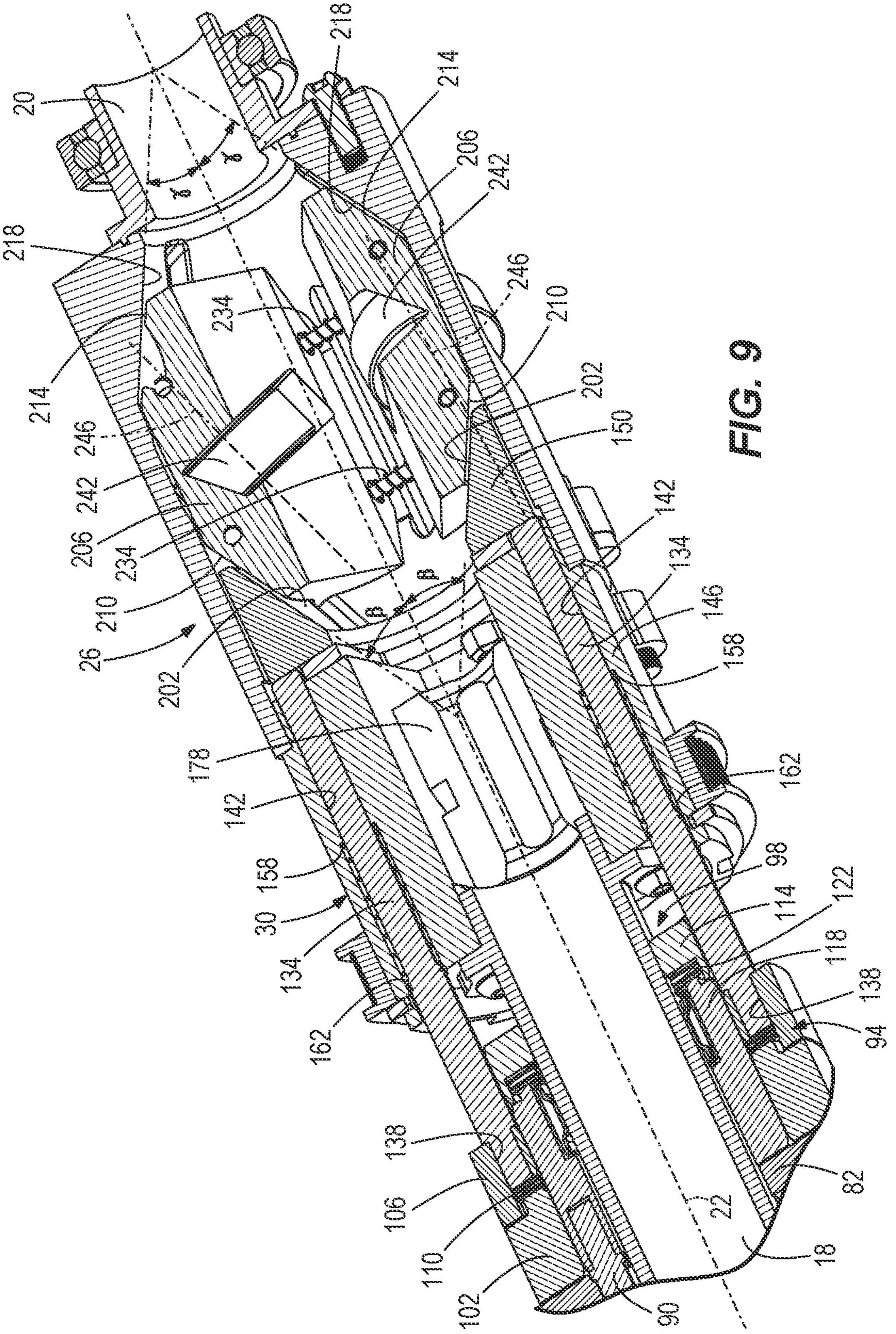
FIG. 9 is a perspective, cross-sectional view of a portion of the drain cleaning machine taken along section line 7-7 of FIG. 1.

With reference to FIGS. 7 and 9, a pair of outer push rods 134 is arranged in bores 138 of the second race 106 of the outer thrust assembly 94. The outer push rods 134 respectively extend through bores 142 of a rotating shell 146 that supports both the feed and radial drive mechanisms 26, 30, such that both the translate and radial drive mechanism 26, 30 are rotatable with the rotating shell 146. The outer push rods 134 are both abuttable against a push cone 150 of the translate mechanism 26. As shown in FIGS. 6-8, a spring 154 is arranged against a spring seat 158 within each bore 142 of the rotating shell 146. The springs 154 are each biased against a shoulder 162 of each outer push rod 134, such that each of the push rods 134 is biased away from the push cone 150 and toward the second race 106 of the outer thrust assembly 94.

Figure 15:
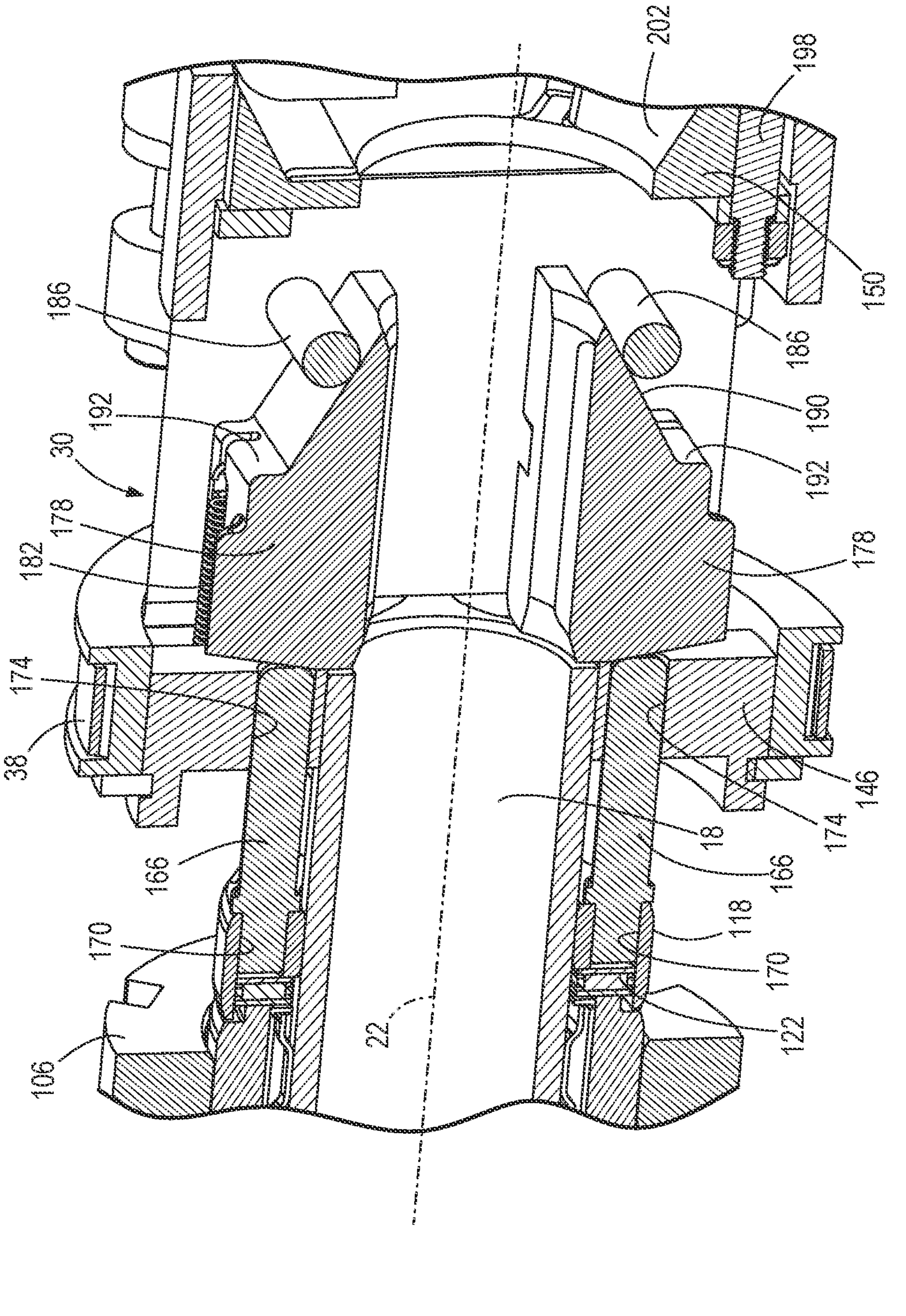
FIG. 15 is a perspective, cross-sectional view of the portion of the drain cleaning machine of FIG. 14.
Figure 16:
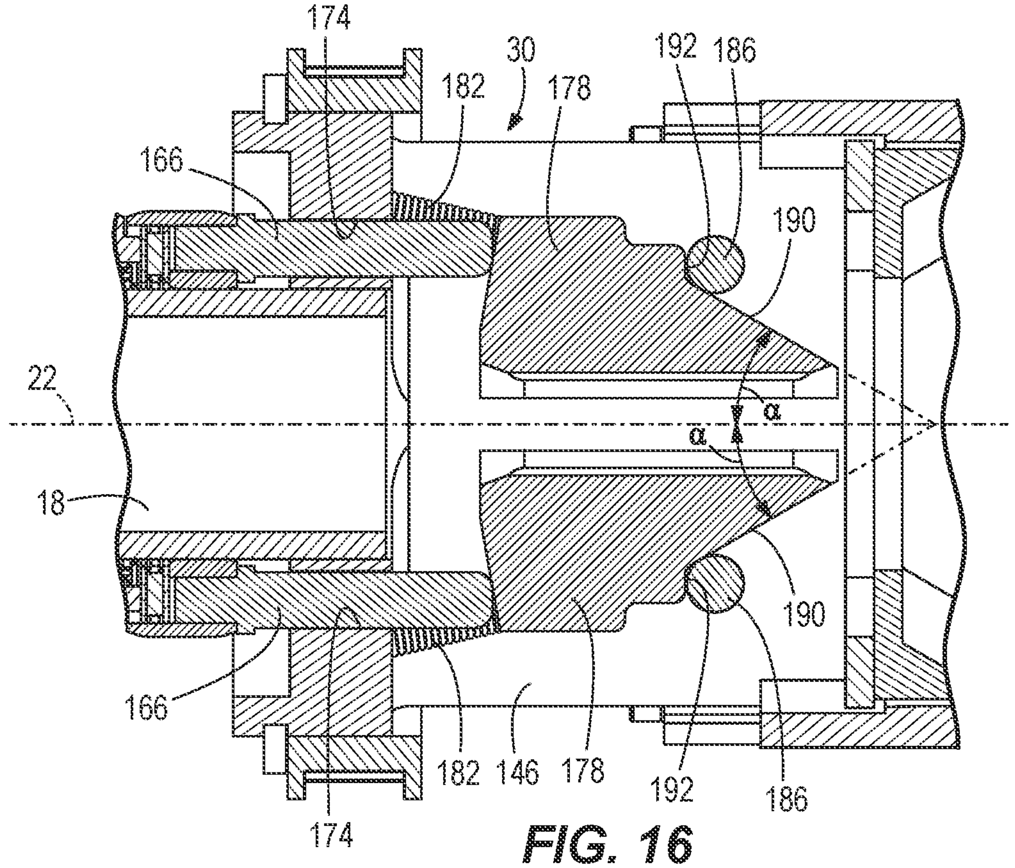
FIG. 16 is a cross-sectional view of part of the drain cleaning machine shown in FIG. 14.

With reference to FIGS. 14-16, a pair of inner push rods 166 is arranged in bores 170 of the second race 118 of the inner thrust assembly 98. The inner push rods 166 respectively extend through bores 174 in the rotating shell 146 and are respectively abuttable against a first collet 178 and a second collet 180 of the radial drive mechanism 30. The collets 178, 180 are arranged in the rotating shell 146 for rotation therewith and are translatable within the rotating shell 146, as described in further detail below. As shown in FIGS. 15 and 16, a spring 182 is secured between each collet 178, 180 and the rotating shell 146, such that each collet 178, 180 is biased toward its respective inner push rod 166 and away from a respective cross pin 186 of the radial drive mechanism 30.

Each collet 178, 180 has a sloped face 190 that is arranged at an acute angle $\alpha$ with respect to the snake axis 22 and is engageable with the cross pin 186. At the edge of the sloped face 190, each collet 178, 180 includes a shoulder 192. As explained in further detail below, when the collets 178, 180 are moved toward the snake axis 22, the radial drive mechanism 30 is in an engaged state, as shown in FIG. 16. When the collets 178, 180 are moved by the springs 182 away from the snake axis 22, the radial drive mechanism 30 is in a disengaged state, as shown in FIGS. 14 and 15.

In some embodiments, the springs 182 may be omitted. In these embodiments, when translate mechanism 26 is engaged and the radial drive mechanism 30 is not engaged, the centrifugal force experienced by the collets 178, 180 during rotation of the rotating shell 146 causes the collets 178 to move away from the snake axis 22. Thus, springs 182 are not required to inhibit the collets 178, 180 from engaging the snake when translate mechanism 26 is engaged and the radial drive mechanism 30 is not engaged.

With reference to FIGS. 1, 2, 7 and 9-11, the push cone 150 is arranged within the rotating shell 146 and coupled for rotation therewith. The push cone 150 is translatable in a direction parallel to the snake axis 22 within the rotating shell 146 along a plurality of guide rods 198 (FIGS. 10 and 11) fixed along the length of the rotating shell 146. The push cone 150 has an inner face 202 whose inner diameter increases when moving in a direction away from the rotating shell 146. Thus, the inner face 202 is arranged at an acute angle β with respect to the snake axis 22, as shown in FIG. 7.

The translate mechanism 26 also includes a plurality of wheel collets 206 arranged within the rotating shell 146. Each wheel collet 206 includes a first face 210 that is pushable by the inner face 202 of the push cone 150 and is arranged at the acute angle β with respect to the snake axis 22. Each wheel collet 206 includes an opposite second face 214 arranged at an acute angle γ with respect to the snake axis 22 and moveable along an inner face 218 of the rotating shell 146, which is also arranged at the acute angle γ with respect to the snake axis 22.

Figure 10:
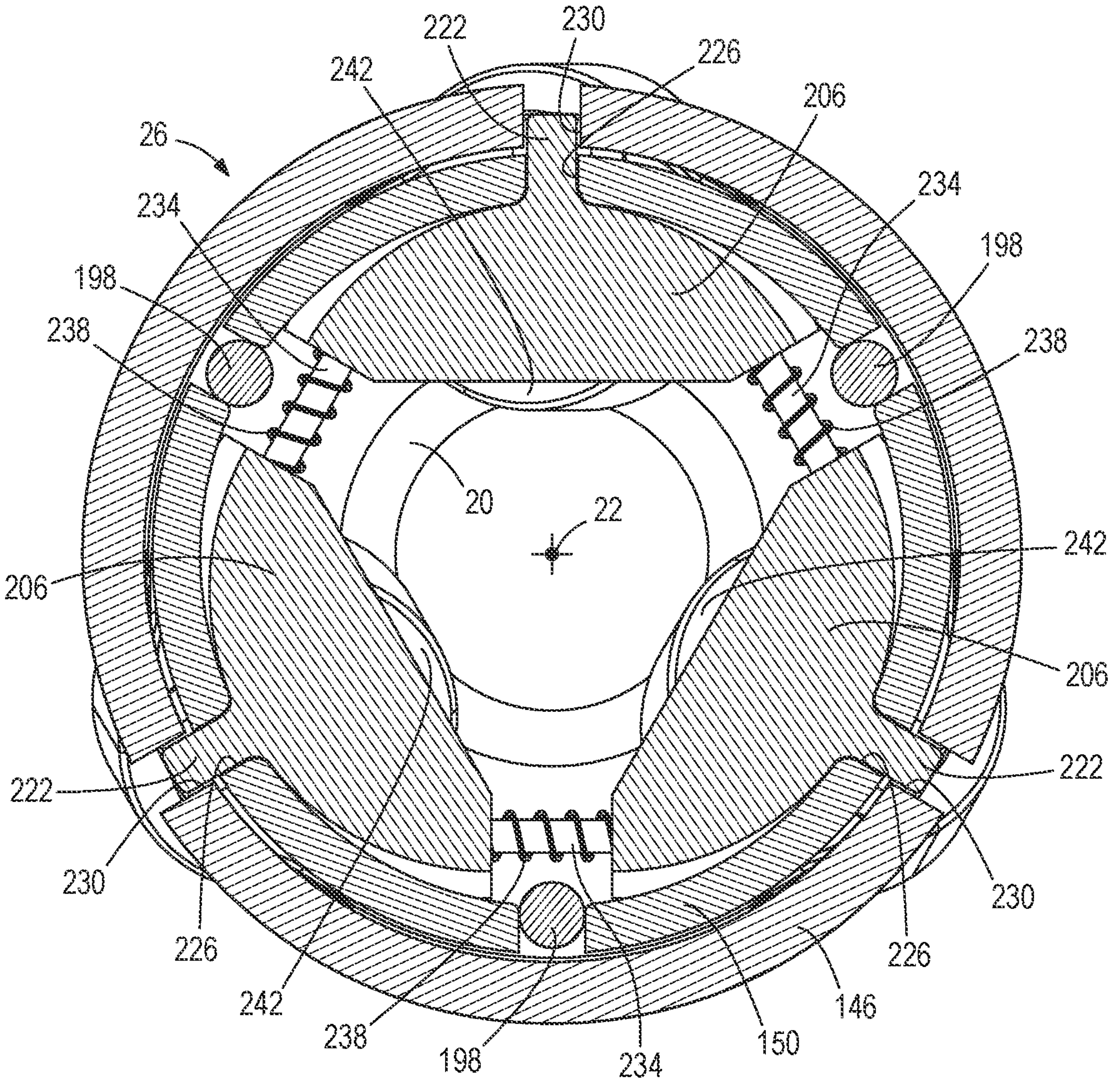
FIG. 10 is a cross-sectional view of a translate mechanism of the drain cleaning machine taken along section line 10-10 of FIG. 2.
Figure 11:
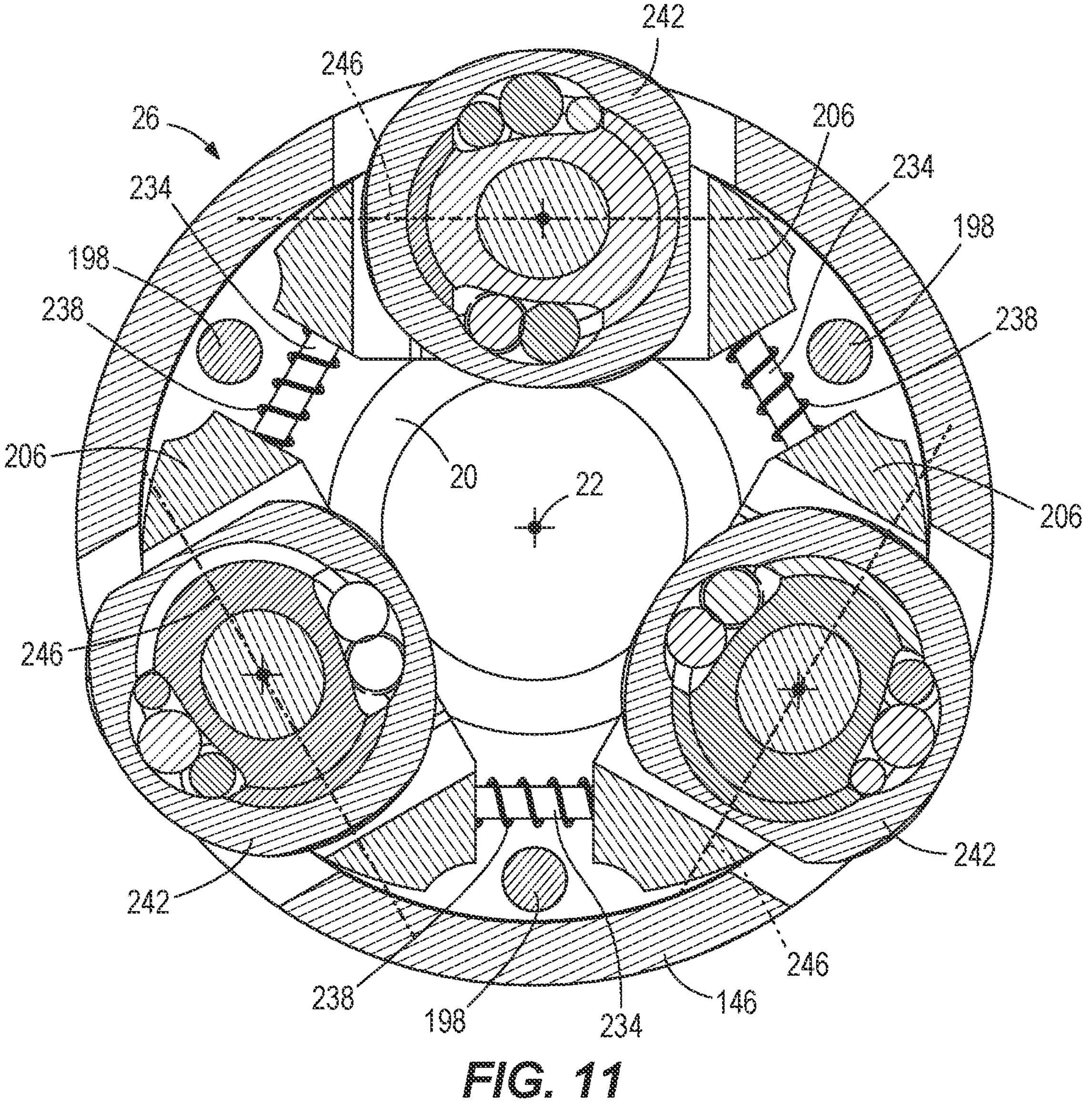
FIG. 11 is a cross-sectional view of the translate mechanism of the drain cleaning machine taken along section line 11-11 of FIG. 2.

As shown in FIG. 10, the wheel collets 206 each include a radially outward-extending key 222 that fits within keyways 226 of the push cone 150 and keyways 230 of the rotating shell 146, such that the collets rotate with the push cone 150 and rotating shell 146. A pin 234 is arranged between each pair of adjacent wheel collets 206, and a compression spring 238 is arranged around each pin 234 and seated against the adjacent wheel collets 206, such that each pair of adjacent wheel collets 206 are biased away from each other by the spring 238. Each wheel collet 206 rotatably supports a wheel 242, or radial bearing, having a wheel axis 246. As shown in FIGS. 7, 9 and 11, the wheel axes 246 are skewed (i.e., non-parallel) with each other, and the wheel axes 246 are skewed (i.e., non-parallel) with the snake axis 22. As explained in further detail below, when the translate mechanism 26 is in an engaged state, the wheel collets 206 and wheels 242 are moved toward the snake axis 22. When the translate mechanism 26 is in a disengaged state, the wheel collets 206 and wheels 242 are allowed to be biased away from each other, and thus away from the snake axis 22.

Figure 17:
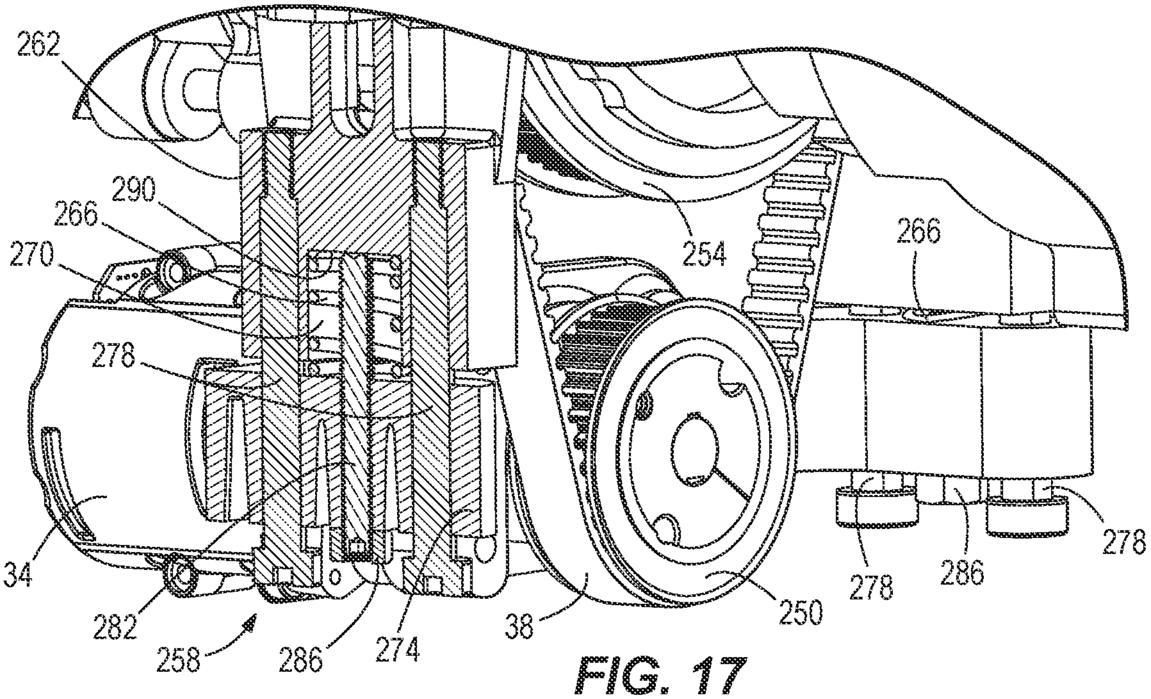
FIG. 17 is a cross-sectional view of a portion of the drain cleaning machine of FIG. 1, illustrating a tensioning assembly.

With reference to FIG. 17, the drain cleaning machine 10 also includes a first pulley 250 to transmit torque from the motor 34 to the rotating shell 146 via the belt 38. Specifically, the belt 38 engages with a second pulley 254 fixed on the rotating shell 146 of the radial drive mechanism 30. The drain cleaning machine 10 also includes a tensioning assembly 258 for allowing the belt 38 to be installed and tensioned on first pulley 250. A pair of first support members 262 couple the tensioning assembly 258 to the frame 14. The tensioning assembly 258 includes a pair compression springs 266 (one on each side), respectively set within bores 270 respectively defined in the first support members 262. The springs 266 bias a second support member 274 of the tensioning assembly 258, which supports the motor 34 and first pulley 250, away from the first support members 262. The tensioning assembly 258 also includes a pair of shoulder bolts 278 threaded within each first support member 262 and respectively extending through the second support member 274. The tensioning assembly 258 further includes a pair of set screws 282 (one on each side), which are respectively threaded through the second support member 274 into the bores 270 of the first support members 262. A lock nut 286 threads onto each set screw 282.

Installation of the Belt 38

In order to install and tension the belt 38 onto the drain cleaning machine 10, the belt 38 is initially off the first pulley 250, but needs to be installed. To install the belt 38, an operator moves the second support member 274 toward the first support members 262, thereby compressing the springs 266 and moving the first pulley 250 toward the second pulley 254, allowing clearance for the belt 38 to be slipped on the first pulley 250. Prior to slipping on the belt 38 and while still holding the second support member 274 toward the first support members 262 to compress springs 266, the shoulder bolts 278 are installed through the second support member 274 and first support members 262 and threaded into the first support members 262. The belt 38 is then slipped on the first pulley 250, and the second support member 272 is then released to allow the springs 266 to expand and push the second support member 272 away from the first support members 262. This causes the belt 38 to become taut as the first pulley 250 is moved away from the second pulley 254. The set screws 282 are then threaded through the second support member 272 and into the bores 270 of the first support members 262 until the set screws 282 touch a seat 290 of the bores 270. The lock nuts 286 are then threaded onto the set screws 282 to prevent the belt 38 from falling off the first pulley 250 in case, for example, the drain cleaning machine 10 is dropped. In other embodiments, the set screws 282 are not used, and the second support members 274 are respectively coupled to the first support members 262 by the shoulder bolts 278.

Selection and Operation of the Translate Mechanism 26

When an operator desires to feed a snake into a drain, the operator first places the snake through the snake inlet tube 20 of the drain cleaning machine 10 until the snake protrudes from the snake outlet tube 18 and is arranged within the inlet of the drain. The operator then rotates the selection plate 82 to the translate position, as shown in FIGS. 5 and 6. Rotation of the selection plate 82 to the translate position also causes the outer and inner pin 86, 90, and thus the outer thrust assembly 94, the inner thrust assembly 98, the radial drive mechanism 30, and the translate mechanism 26 to all co-rotate with the selection plate 82 about the snake axis 22. The operator then pivots the actuating lever 42 from the deactivated position of FIG. 1 to the activated position of FIG. 2, causing the arms 50 to pivot and the linkage members 54 to pull the arms 58 of the push plate 62. The arms 58 translate within windows 294 of the frame 14, causing the push plate 62 to move toward the selection plate 82. The arms 58 within windows 294 also prevent the push plate 62 from rotating with respect to the inner frame 14 and snake inlet tube 18. Because the selection plate 82 is in the translate position, the inner pins 90 are aligned with the inner apertures 70 of the push plate 62 and the outer pins 86 are not aligned with the outer apertures 66, as shown in FIG. 5.

As the push plate 62 moves toward the selection plate 82, the inner pins 90 slip through the inner apertures 70 of the push plate 62, while the outer pins 86 are pushed by the push plate 62 toward the first race 102 of the outer thrust assembly 94, as shown in FIG. 6. Thus, the outer pins 86 push the outer thrust assembly 94, which in turn pushes the outer push rods 134 against the biasing force of springs 154 toward the push cone 150, as shown in FIG. 7. The push cone 150 is thus pushed by the outer push rods 134 toward the wheel collets 206. As the push cone 150 pushes against the wheel collets 206, the wheel collets 206 are translated within the rotating shell 146 towards the inner face 218 of the rotating shell 146. Once the second faces 214 of the wheel collets 206 engage against the inner face 218 of the rotating shell 146, the wheel collets 206 begin to move towards the snake axis 22. Specifically, the faces 210 of the wheel collets 206 slide along the inner face 202 of the push cone 150 and the second faces 214 of the wheel collets 206 slide along the inner face 218 of the rotating shell 146, causing adjacent wheel collets 206 to move toward each other against the biasing force of springs 238, and resulting in movement of the wheel collets 206 towards the snake axis 22, as shown in FIGS. 7 and 9. As the wheel collets 206 move toward snake axis 22, the wheels 242 move toward snake axis 22 until the wheels 242 engage the snake. In this position, the translate mechanism 26 is in an engaged state.

While still holding the actuating lever 42 in the selection position, the operator then actuates the motor 34 in the feed direction. The first pulley 250 transmits torque from the motor 34 to the second pulley 254, which causes the rotating shell 146 of the radial drive mechanism 30 to rotate. The rotating shell 146 thus rotates with the rotating shell 146 of the radial drive mechanism, causing the wheel collets 206 and wheels 242 to rotate about the snake axis 22. Because the wheel axes 246 are not parallel with the snake axis 22 and because the wheels 242 are engaged against the snake, rotation of the wheels 242 around the snake axis 22 causes the snake to move along the snake axis 22 through the drain cleaning machine 10 and into the drain. As discussed later herein, in some embodiments, movement of the actuating lever 42 to the activated position automatically starts the motor 34.

Selection and Operation of the Radial Drive Mechanism 30

Once the operator has fed a complete or sufficient length of the snake into the drain, the operator may wish to spin the snake in order to, for example, break up clogs within the drain. In order to spin the snake, the operator switches the translate mechanism 26 to a disengaged state and switches the radial drive mechanism 30 to an engaged state. Thus, the operator moves the actuating lever 42 back to the deactivated position shown in FIG. 1. Movement of the actuating lever 42 to the deactivated position translates the push plate 62 away from the selection plate 82, allowing the springs 154 to bias the outer push rods 134 away from the push cone 150, and pushing the outer thrust assembly 94 and the outer pins 86 away from the outer push rods 134. Because the push cone 150 is no longer pushed by the outer push rods 134 against the wheel collets 206, the wheel collets 206 are biased by the springs 238 away from each other and away from the snake axis 22, so the wheels 242 are no longer engaged against the snake and the translate mechanism is in a disengaged state. As discussed later herein, in some embodiments, movement of the actuating lever 42 to the deactivated position automatically stops the motor 34.

The operator then rotates the selection plate 82 to the radial drive position, as shown in FIGS. 4, 12, and 13. Rotation of the selection plate 82 to the radial drive position also causes the outer and inner pin 86, 90, and thus the outer thrust assembly 94, the inner thrust assembly 98, the radial drive mechanism 30, and the translate mechanism 26 to all co-rotate with the selection plate 82 about the snake axis 22. The operator then pivots the actuating lever 42 from the non-selection position of FIG. 1 to the activated position of FIG. 2, causing the arms 50 to pivot and the linkage members 54 to pull the arms 58 of the push plate 62. The arms 58 translate within the windows 294 of the frame 14, causing the push plate 62 to move toward the selection plate 82. Because the selection plate 82 is in the radial drive position, the inner pins 90 are not aligned with the inner apertures 70 of the push plate 62, and the outer pins 86 are aligned with the outer apertures 66, as shown in FIG. 12.

As the push plate 62 moves toward the selection plate 82, the outer pins 86 slip through the outer apertures 66 of the push plate 62 while the inner pins 90 are pushed by the push plate 62 toward the first race 114 of the inner thrust assembly 98, as shown in FIG. 13. Thus, the inner pins 90 push the inner thrust assembly 98, which in turn pushes the inner push rods 166 toward the collets 178, 180. The collets 178, 180 are respectively pushed by the inner push rods 166 toward the cross pins 186, as shown in FIGS. 14 and 15. As the collets 178, 180 push against the cross pins 186, the sloped faces 190 of the collets slide against the cross pins 186 while the collets 178, 180 move toward the snake axis 22 until the cross pins abut against the shoulders 192, at which point the collets 178, 180 are engaged against the snake such that the radial drive mechanism 30 is in an engaged state. As the collets 178, 180 rotate about the snake axis 22 while clamped on the snake, the snake spins about the snake axis 22 without moving along the snake axis 22.

In some embodiments, the inner push rod 166 that engages with the first collet 178 is omitted and the first collet 178 is radially locked or fixed in place, for instance, by a nut and a bolt. Thus, in these embodiments, only the second collet 180, the moveable collet, is moveable toward and away from the snake axis 22, when the radial drive mechanism 30 is alternatively switched between the engaged and disengaged states. In these embodiments, the clamping force exerted on the snake between the first and second collets 178, 180 is increased when the radial drive mechanism 30 is in the engaged state because the input force to clamp the snake is no longer divided between the first and second collets 178, 180. In some embodiments with the locked first collet 178, the clamping force exerted on the snake between the first and second collets 178, 180 is double or more that of the clamping force of the embodiment when the first collet 178 is moveable. In some embodiments with the locked first collet 178, the clamping force exerted on the snake between the first and second collets 178, 180 is 2.6 times the clamping force of the embodiments when the first collet 178 is moveable, because locking the first collet 178 reduces the friction between the snake and the first and second collets 178, 180. Specifically, all of the input force is transferred into the second collet 180 via the single inner push rod 166 engaging the second collet 180, which moves the second collet 180 toward the snake axis 22 and toward the first collet 178. In still other embodiments, the radial drive mechanism 30 can include more than two collets, with all the collets except one collet being locked in position, and the one collet being moveable toward and away from the snake axis 22 as the radial drive mechanism 30 is switched between the engaged and disengaged states to alternatively clamp and release the snake.

Retraction of the Snake from the Drain

Once the operator is satisfied with the operation of the radial drive mechanism 30 to spin the snake within the drain, the operator may wish to retract the snake from the drain. In order to retract the snake from the drain, the operator switches the radial drive mechanism 30 to the disengaged state and switches the translate mechanism 26 to the engaged state. The operator first turns off the motor 34 and moves the actuating lever 42 back to the deactivated position shown in FIG. 1. Movement of the actuating lever 42 to the deactivated position translates the push plate 62 away from the selection plate 82, allowing the springs 182 to pull the collets 178, 180 away from the snake axis 22, and pushing the inner push rods 166, the inner thrust assembly 98, and the inner pins 90 away from the collets 178, 180. Because the collets 178, 180 are moved away from the snake axis 22 and disengaged from the snake, the radial drive mechanism 30 is in a disengaged state.

The operator then switches the translate mechanism 26 to the engaged state, as described above. However, instead of actuating the motor 34 in a feed direction, the operator actuates the motor 34 in a retract direction, which is opposite of the feed direction. This causes the wheels 242 to rotate around the snake axis 22, but instead of feeding the snake into the drain, the wheels 242 cause the snake to move along the snake axis 22 through the drain cleaning machine 10 and retract out of the drain.

Manual Feeding and Retraction of the Snake while Engaging the Radial Drive Mechanism 30

In some instances, the operator may want to engage the radial drive mechanism 30 to spin the snake about the snake axis 22 while simultaneously feeding or retracing the snake from the drain. In these instances, the operator engages the radial drive mechanism 30 as described above, while the motor 34 is actuated. Then, the operator manually feeds the snake into or pulls the snake out of the snake inlet tube 20. As the snake is moved along the snake axis 22 into or out of the snake inlet tube 20, the snake is simultaneously spun about the snake axis 22 by the radial drive mechanism 30, thereby “drilling” the snake into or out a drain.

Second Embodiment—Drain Cleaning Machine 298

Figure 18:
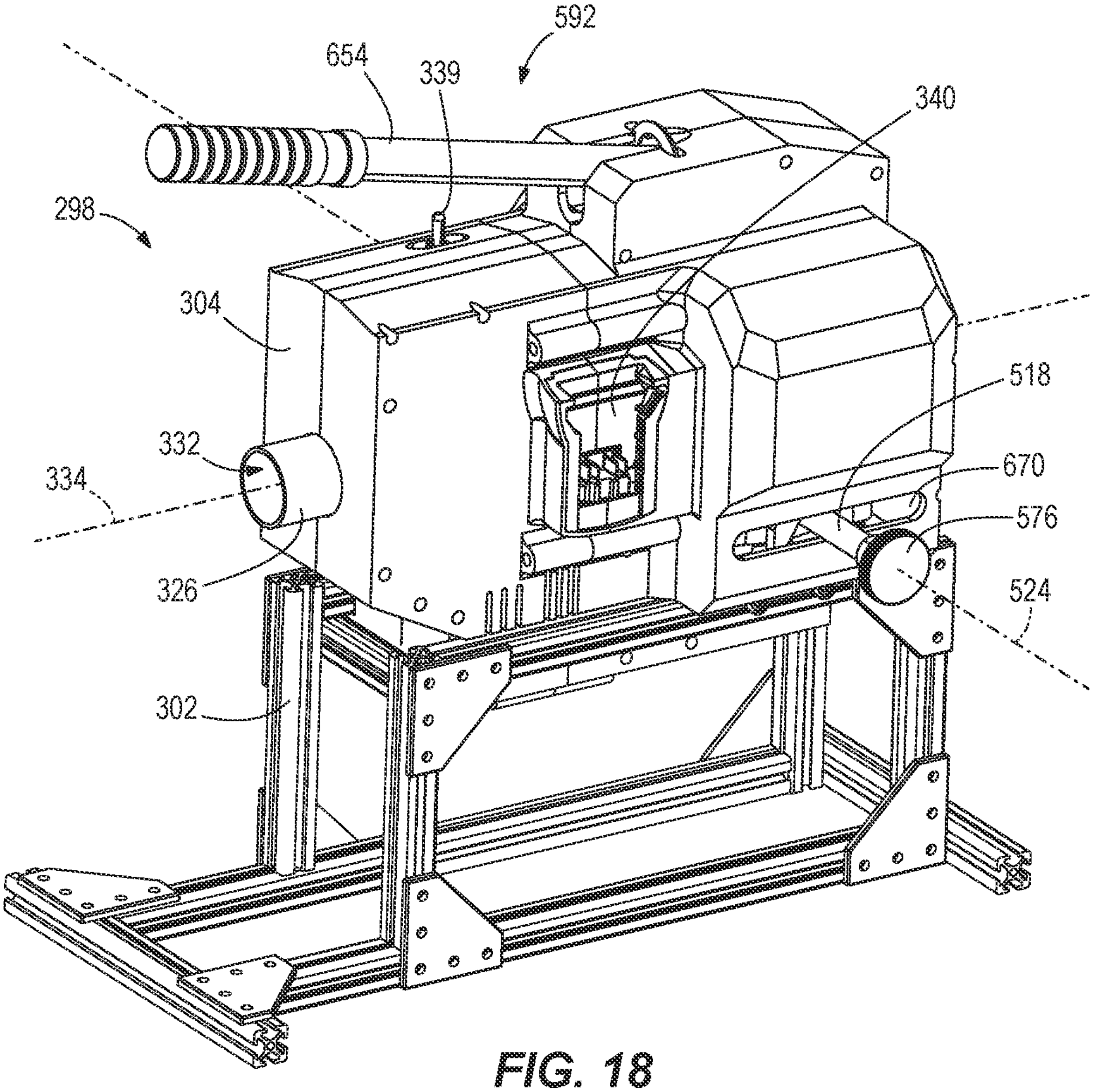
FIG. 18 is a perspective view of a drain cleaning machine according to another embodiment of the invention.
Figure 19:
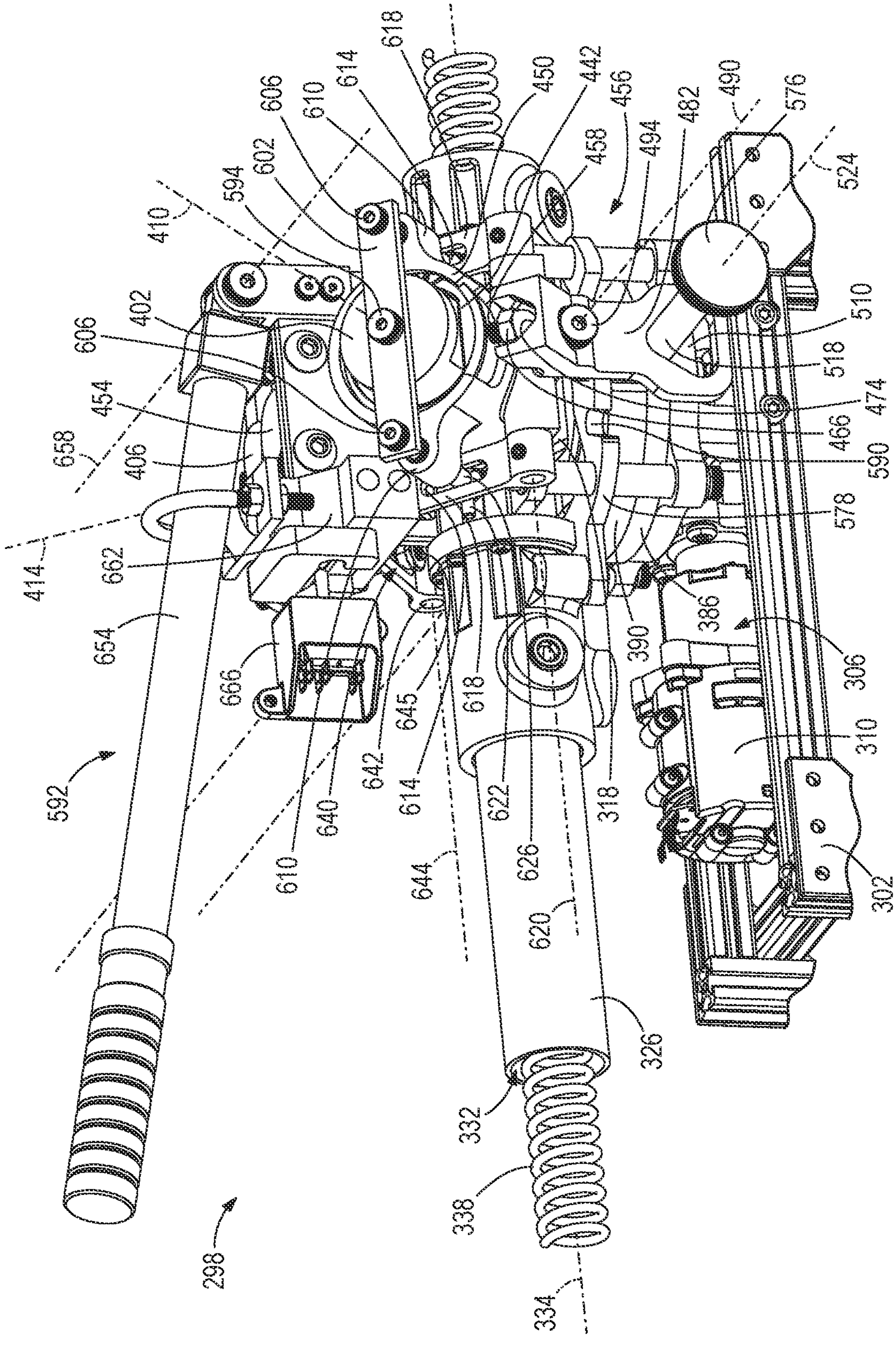
FIG. 19 is a perspective view of the drain cleaning machine of FIG. 18 with a housing removed.
Figure 20:
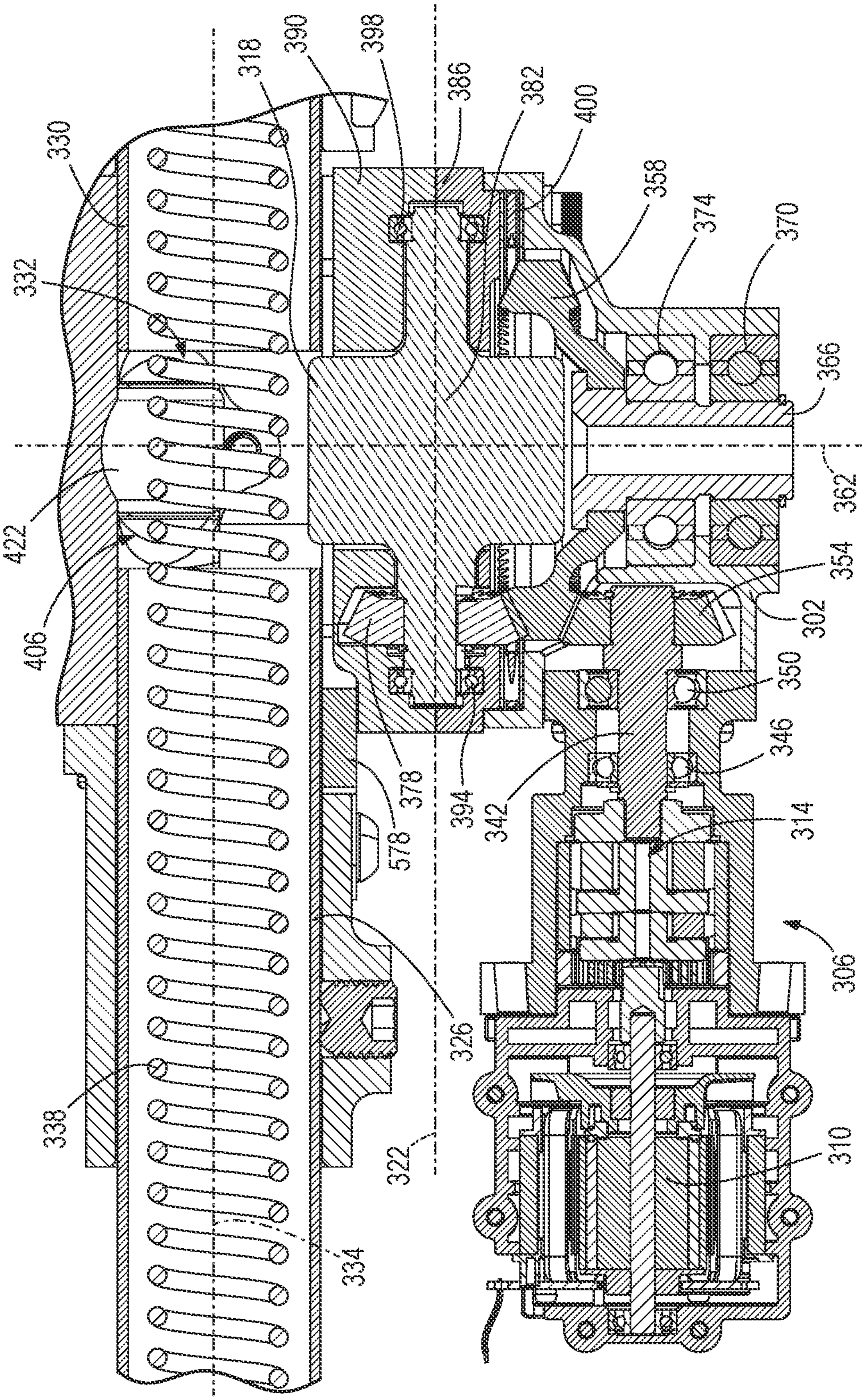
FIG. 20 is a cross-sectional view of the drain cleaning machine of FIG. 18.

As shown in FIGS. 18-20, a drain cleaning machine 298 includes a frame 302, a housing 304, a drive mechanism 306 having a motor 310 and a transmission 314, and a drive wheel 318 that receives torque from the motor 310 via the transmission 314 and defines a drive axis 322. The drain cleaning machine 298 also includes a snake inlet tube 326 and a snake outlet tube 330 that collectively form a snake passage 332 defining a snake axis 334 along which a snake 338 can be fed or about which the snake 338 can be rotated. In some embodiments, the snake 338 is formed of steel. The drain cleaning machine 298 also includes a forward/reverse switch 339 for selecting the direction of rotation of the motor 310 and a battery receptacle 340 for receiving a battery to power the motor 310. In some embodiments, the battery receptacle 340 is battery compartment covered by a battery door that seals and isolates the battery from the contaminated environment, thus keeping the battery clean and dry. In some embodiments, the drain cleaning machine 298 and motor 310 can be powered by AC power instead of or in addition to the battery.

As shown in FIG. 20, the transmission 314 includes an output shaft 342 rotatably supported in the frame 302 by first and second bearings 346, 350. A first bevel gear 354 is coupled for rotation with the output shaft 342 and is engaged with a double bevel gear 358 that defines a shift axis 362. The double bevel gear 358 is coupled for rotation with a mode shaft 366 that is arranged along the shift axis 362 and rotatably supported in the frame 302 by third and fourth bearings 370, 374. The double bevel gear 358 is engaged with a second bevel gear 378 that is coupled for rotation with a drive axle 382 arranged along the drive axis 322. The drive wheel 318 is coupled for rotation with the drive axle 382 about the drive axis 322 and the drive axle 382 is rotatably supported between first and second shift plates 386, 390 by fifth and sixth bearings 394, 398. The first shift plate 386 is arranged on a thrust bearing 400 and is coupled for rotation with the second shift plate 390, such that the first shift plate 386 and second shift plate 390 can rotate together about the shift axis 362.

As explained in further detail below, the drive wheel 318 is moveable between a first position in which the drive axis 322 is parallel to the snake axis 334 (FIGS. 20-22 and 24), a second position in which the drive wheel 318 has been rotated a negative amount of degrees $\alpha$ from the first position about the shift axis 362 (i.e. counterclockwise as viewed in FIG. 27), such that the drive axis 322 is not parallel to the snake axis 334, and a third position in which the drive wheel 318 has been rotated a positive amount of degrees $\beta$ from the first position about the shift axis 362 (i.e. clockwise as viewed in FIG. 30), such that the drive axis 322 is not parallel to the snake axis 334. In some embodiments, $\alpha$ and $\beta$ are equal to 25 degrees. However, in other embodiments, $\alpha$ and $\beta$ can be between 0 and 25 degrees or between 25 and 90 degrees.

Figure 21:
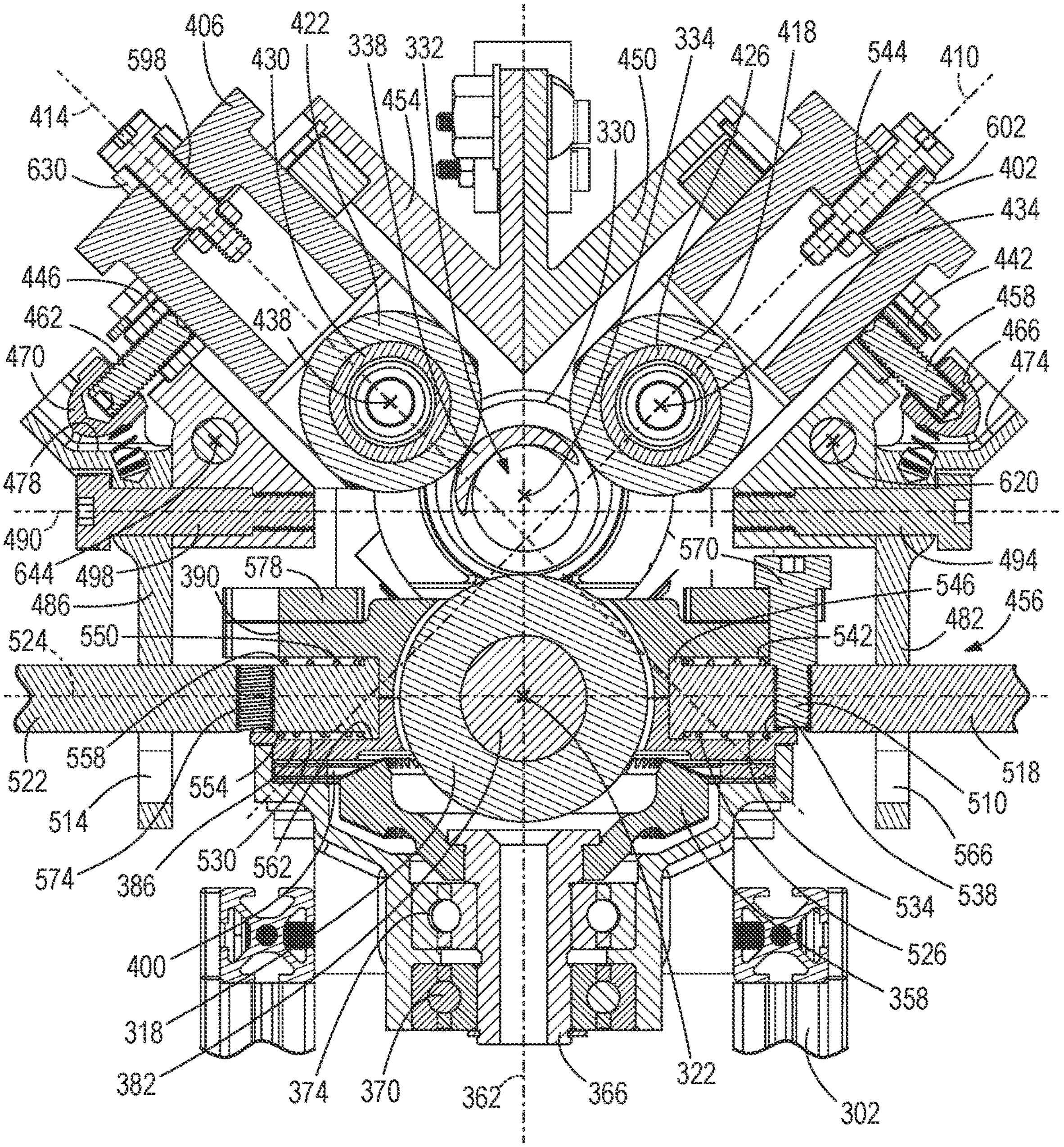
FIG. 21 is a cross-sectional view of the drain cleaning machine of FIG. 18.
Figure 22:
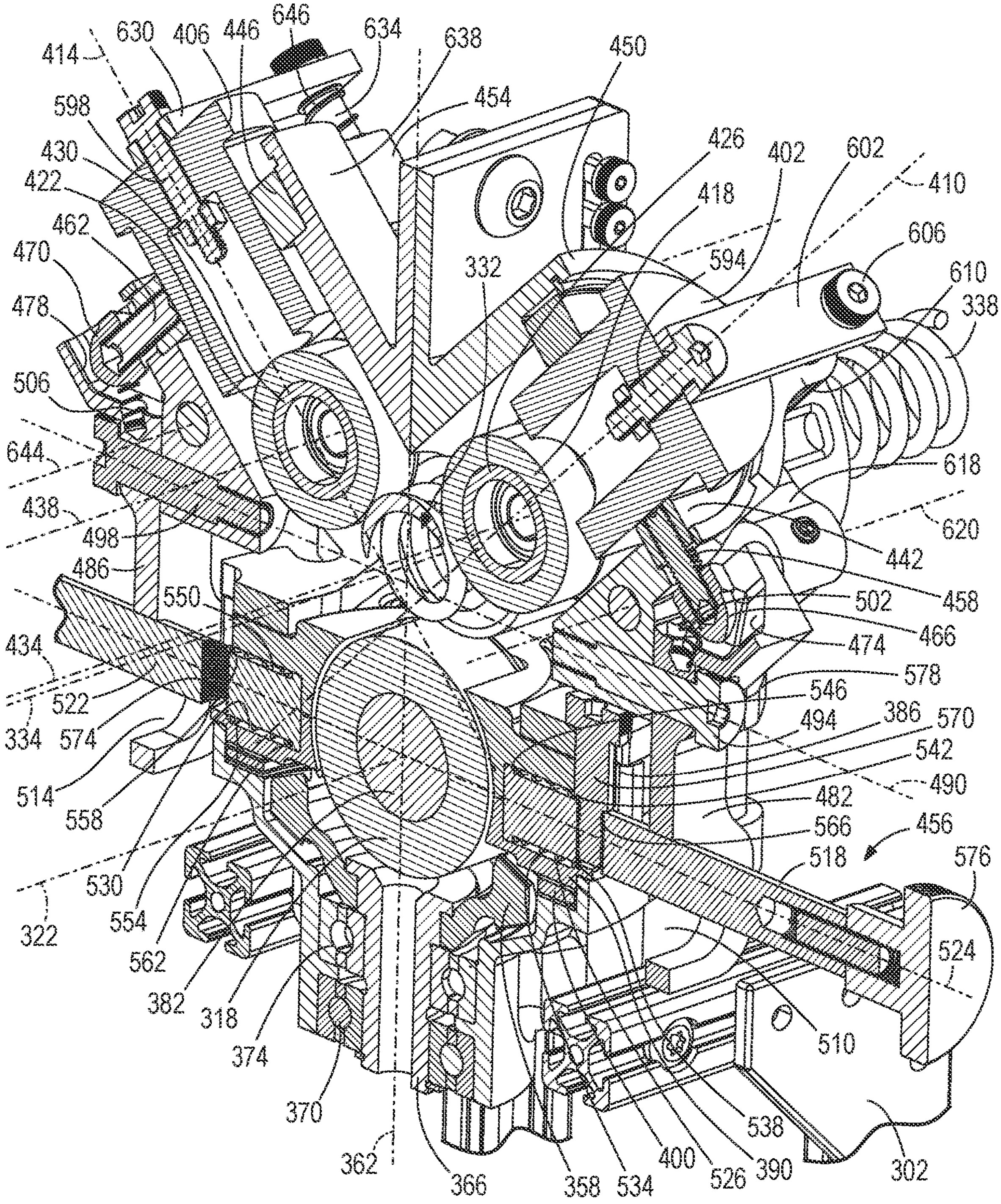
FIG. 22 is a perspective cross-sectional view of the drain cleaning machine of FIG. 18.

As shown in FIGS. 21 and 22, the drain cleaning machine 298 also includes first and second idler wheel carriers 402, 406 respectively defining first and second carrier axes 410, 414 and carrying first and second idler wheels 418, 422. As explained in further detail below, the first and second idler wheel carriers 402, 406 are respectively moveable along the first and second carrier axes 410, 414 between engaged positions, in which the idler wheels 418, 422 are moved toward the snake axis 334, and disengaged positions, in which the idler wheels 418, 422 are moved away from the snake axis 334.

The first and second idler wheels 418, 422 are respectively supported in the first and second idler wheel carriers 402, 406 by first and second idler wheel axles 426, 430 that respectively define first and second idler wheel axes 434, 438. The first and second idler wheel carriers 402, 406 are respectively coupled for rotation with first and second rotation collars 442, 446 that are respectively arranged within first and second idler chutes 450, 454 of the frame 302.

Figure 25:
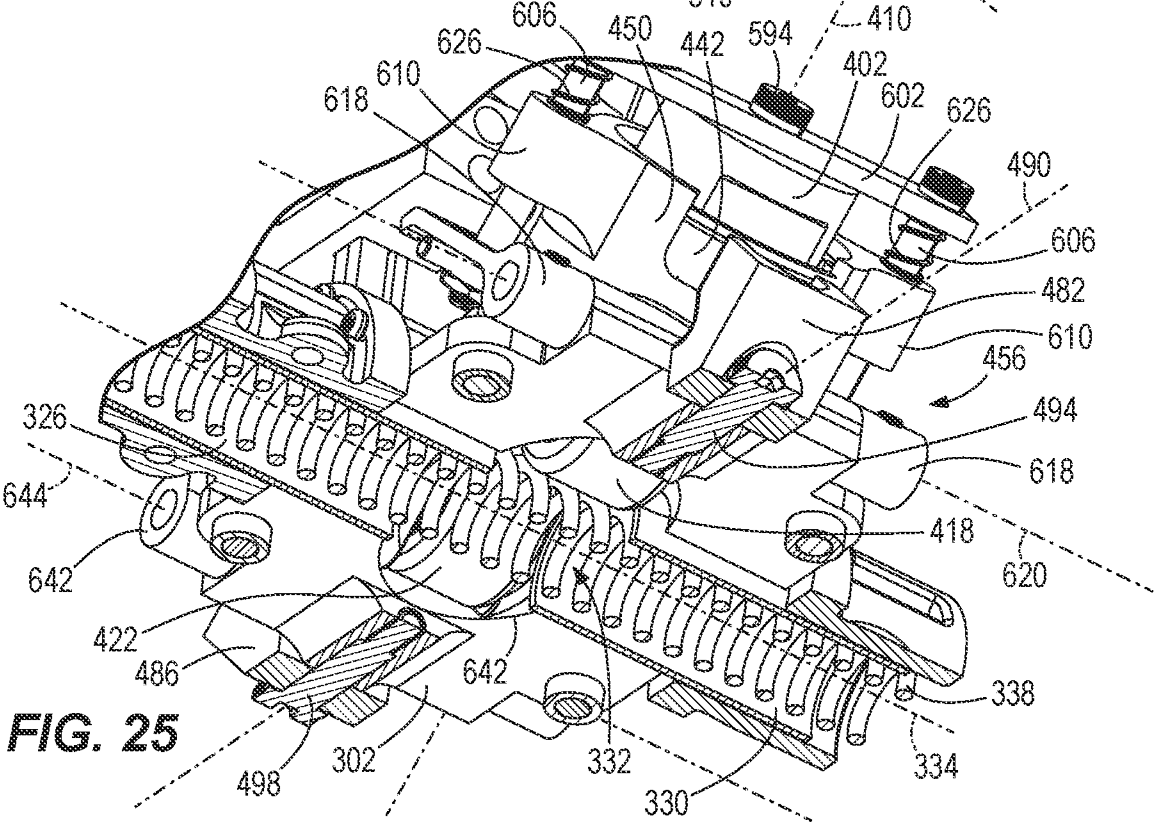
FIG. 25 is a cross-sectional view of the drain cleaning machine of FIG. 18 with a selection mechanism in a radial drive mode.
Figure 28:
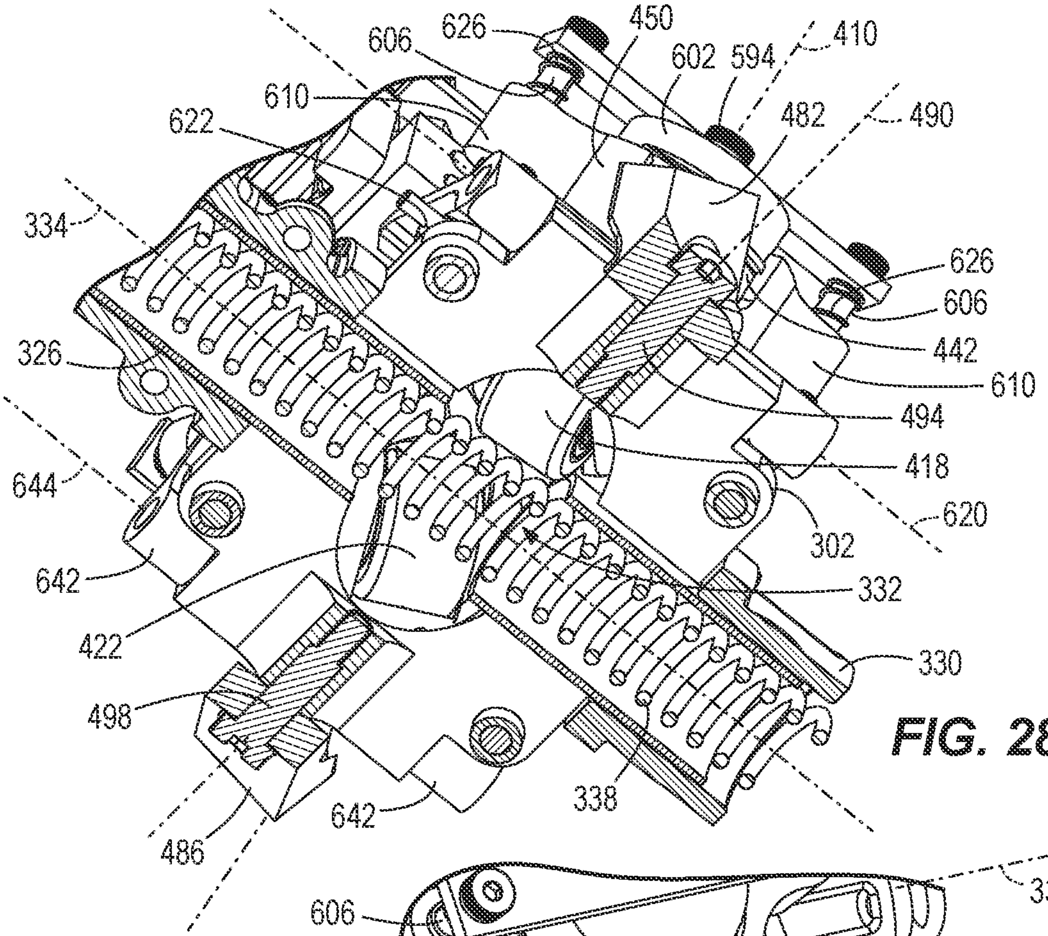
FIG. 28 is a cross-sectional view of the drain cleaning machine of FIG. 18 with the selection mechanism in the feed mode.
Figure 31:
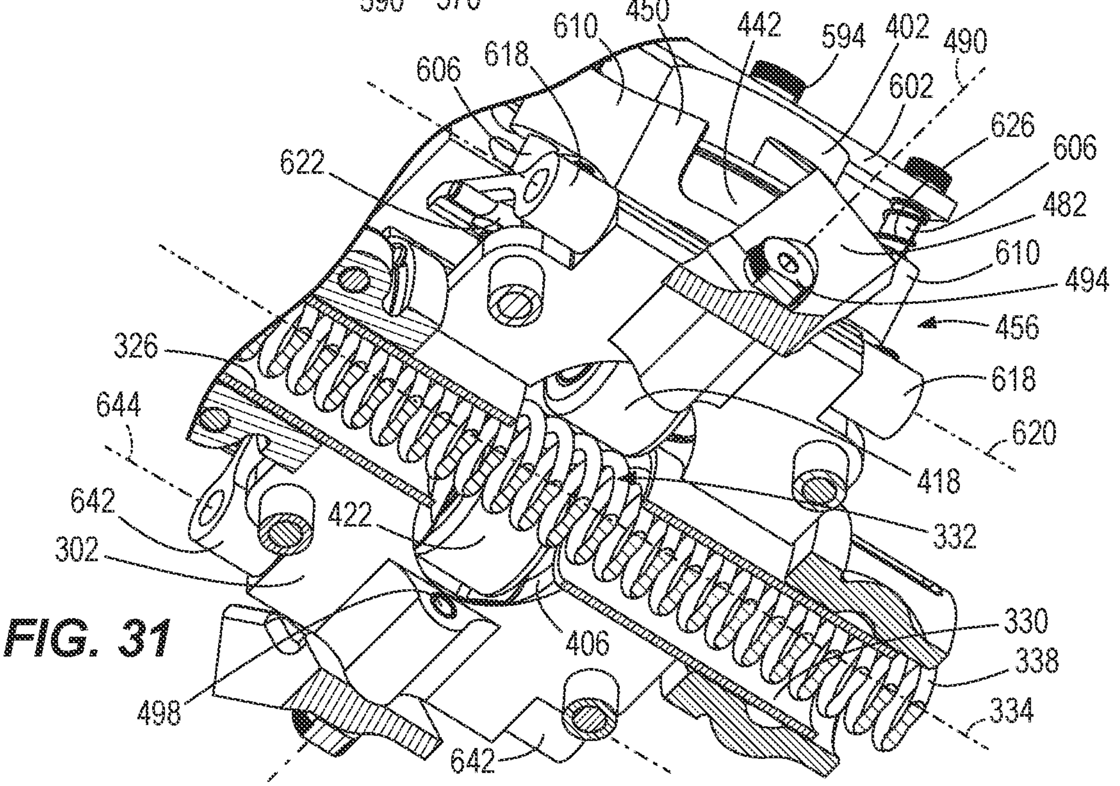
FIG. 31 is a cross-sectional view of the drain cleaning machine of FIG. 18 with the selection mechanism in the retract mode.

As explained in further detail below, the first idler wheel 418 is rotatable between a first position, in which the first idler wheel axis 434 is parallel to the snake axis 334 (FIGS. 21, 22 and 25), a second position in which the first idler wheel 418 has been rotated a positive amount of degrees $\gamma$ from the first position about the first carrier axis 410 (i.e. clockwise when viewed above the first idler wheel carrier 402 in a direction towards the snake axis 334), such that the first idler wheel axis 434 is not parallel to the snake axis 334 as shown in FIG. 28, and a third position in which the first idler wheel 418 has been rotated a negative amount of degrees $\delta$ from the first position about the first carrier axis 410 (i.e. counterclockwise when viewed above the first idler wheel carrier 402 in a direction towards the snake axis 334), such that the first idler wheel axis 434 is not parallel to the snake axis 334 as shown in FIG. 31.

As explained in further detail below, the second idler wheel 422 is rotatable between a first position, in which the second idler wheel axis 438 is parallel to the snake axis 334 (FIGS. 21, 22 and 25), a second position in which the second idler wheel 422 has been rotated a positive amount of degrees $\gamma$ from the first position about the second carrier axis 414 (i.e. clockwise when viewed above the second idler wheel carrier 406 in a direction towards the snake axis 334), such that the second idler wheel axis 438 is not parallel to the snake axis 334 as shown in FIG. 28, and a third position in which the second idler wheel 422 has been rotated a negative amount of degrees $\delta$ from the first position about the second carrier axis 414 (i.e. counterclockwise when viewed above the second idler wheel carrier 406 in a direction towards the snake axis 334), such that the second idler wheel axis 438 is not parallel to the snake axis 334 as shown in FIG. 31.

In some embodiments, γ and δ are equal to 25 degrees. However, in other embodiments, γ and δ can be between 0 and 25 degrees or between 25 and 90 degrees.

Selection Mechanism 456

The drain cleaning machine 298 includes a selection mechanism 456, which includes the first and second shift plates 386, 390, the first and second rotation collars 442, 446, as well as everything described in this paragraph and the following four paragraphs. In some embodiments, the first and second shift plates 386, 390 are formed as a single shift plate that rotatably supports the fifth and sixth bearings 394, 398, the drive axle 382 and the drive wheel 318. As explained in further detail below, the selection mechanism 456 is switchable between a radial drive mode, in which the drive wheel 318, the first idler wheel 418, and the second idler wheel 422 are all in their respective first positions, a feed mode, in which the drive wheel 318, the first idler wheel 418, and the second idler wheel 422 are all in their respective second positions, and a retract mode, in which the drive wheel 318, the first idler wheel 418, and the second idler wheel 422 are all in their respective third positions.

Figure 23:
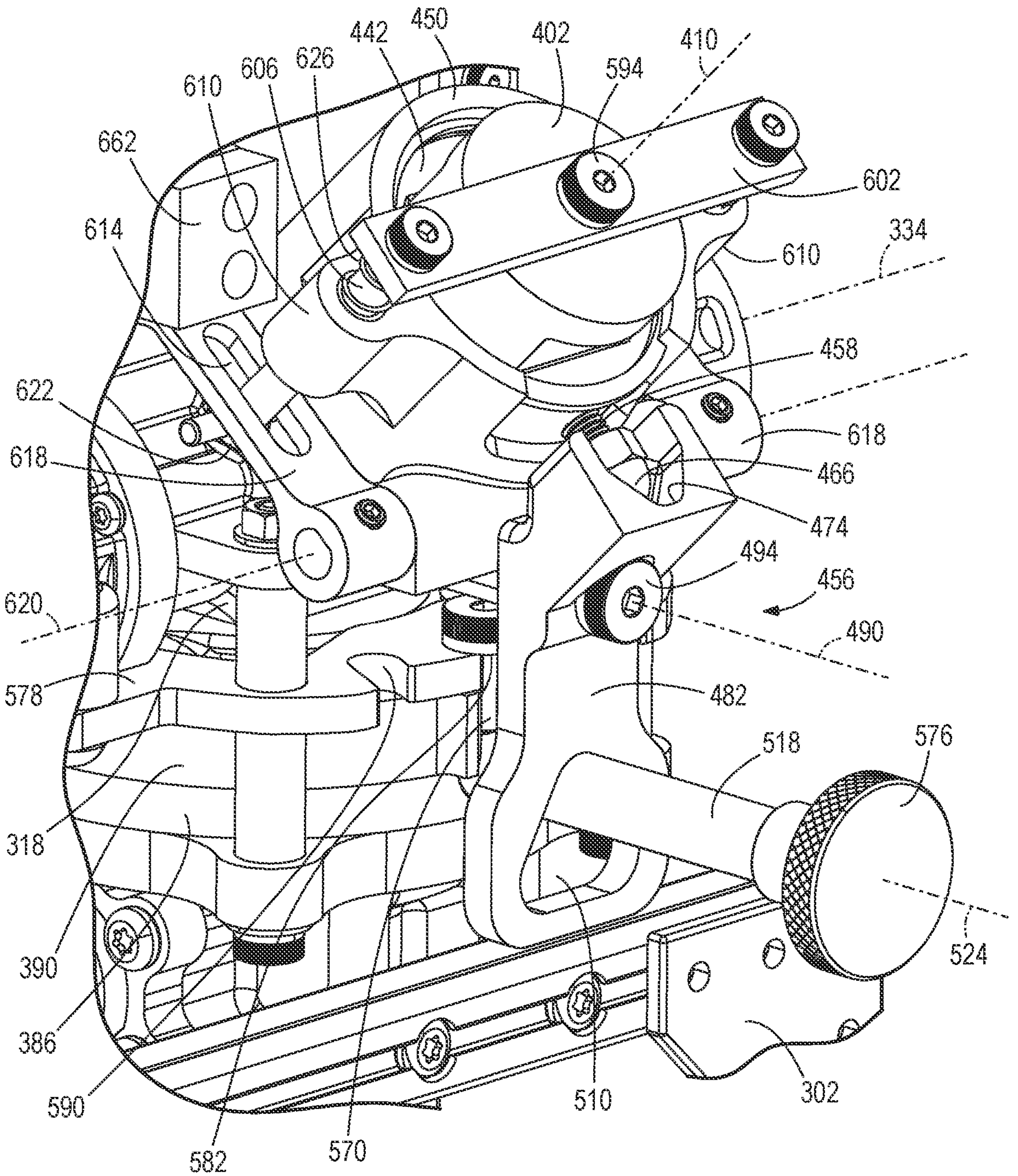
FIG. 23 is an enlarged perspective view of the drain cleaning machine of FIG. 18 with a selection mechanism in a radial drive mode.

With reference to FIGS. 21-23, the first and second rotation collars 442, 446 respectively have first and second collar fasteners 458, 462 extending therefrom in directions respectively perpendicular to the carrier axes 410, 414. The first and second collar fasteners 458, 462 have first and second acorn nuts 466, 470 threaded thereon and respectively arranged in first and second acorn recesses 474, 478 of first and second pivot linkages 482, 486. The first and second pivot linkages 482, 486 are respectively pivotable about a common pivot axis 490 defined by first and second linkage fasteners 494, 498 that respectively couple the first and second pivot linkages 482, 486 to the frame 302. The first and second pivot linkages 482, 486 respectively include first and second compression springs 502, 506 respectively biasing the first and second acorn nuts 466, 470 away from the pivot axis 490. The first and second pivot linkages 482, 486 also respectively include first and second pin recesses 510, 514 through which first and second shift pins 518, 522 are received and arranged along a common shift pin axis 524. As shown in FIG. 21, the common shift pin axis 524 intersects the drive axis 322 and the shift axis 362.

The first and second shift plates 386, 390 are secured for rotation with the first shift pin 518 by virtue of the first shift pin 518 extending into a first common bore 526 defined between the first and second shift plates 386, 390 and arranged along the shift pin axis 524. The first and second shift plates 386, 390 are secured for rotation with the second shift pin 522 by virtue of the second shift pin 522 extending into a second common bore 530 defined between the first and second shift plates 386, 390 and arranged opposite the first common bore 526 along the shift pin axis 524. A first compression spring 534 is arranged within the first common bore 526 and seated against outer edges 538, 542 of the first and second shift plates 386, 390. The first compression spring 534 applies a biasing force against a shoulder 546 of the first shift pin 518, such that the first shift pin 518 is biased along the shift pin axis 524 towards the drive axis 322. A second compression spring 550 is arranged within the second common bore 530 and seated against outer edges 554, 558 of the first and second shift plates 386, 390. The second compression spring 550 applies a biasing force against a shoulder 562 of the second shift pin 522, such that the second shift pin 522 is biased along the shift pin axis 524 towards the drive axis 322.

With continued reference to FIGS. 21 and 22, the first shift pin 518 includes a first detent bore 566 configured to receive a detent bolt 570. The second shift pin 522 includes a second detent bore 574 also configured to receive the detent bolt 570. Thus, depending on whether an operator is right or left handed or what side of the drain cleaning machine 298 the operator prefers to stand, the operator may use either the first shift pin 518 or second shift pin 522 to shift between modes by deciding which detent bore 566, 574 to insert detent bolt 570, as explained in further detail below. A selection knob 576 is alternatively threadable onto the first shift pin 518 or second shift pin 522, to correspond with which detent bore 566, 574 receives the detent bolt 570.

Figure 24:
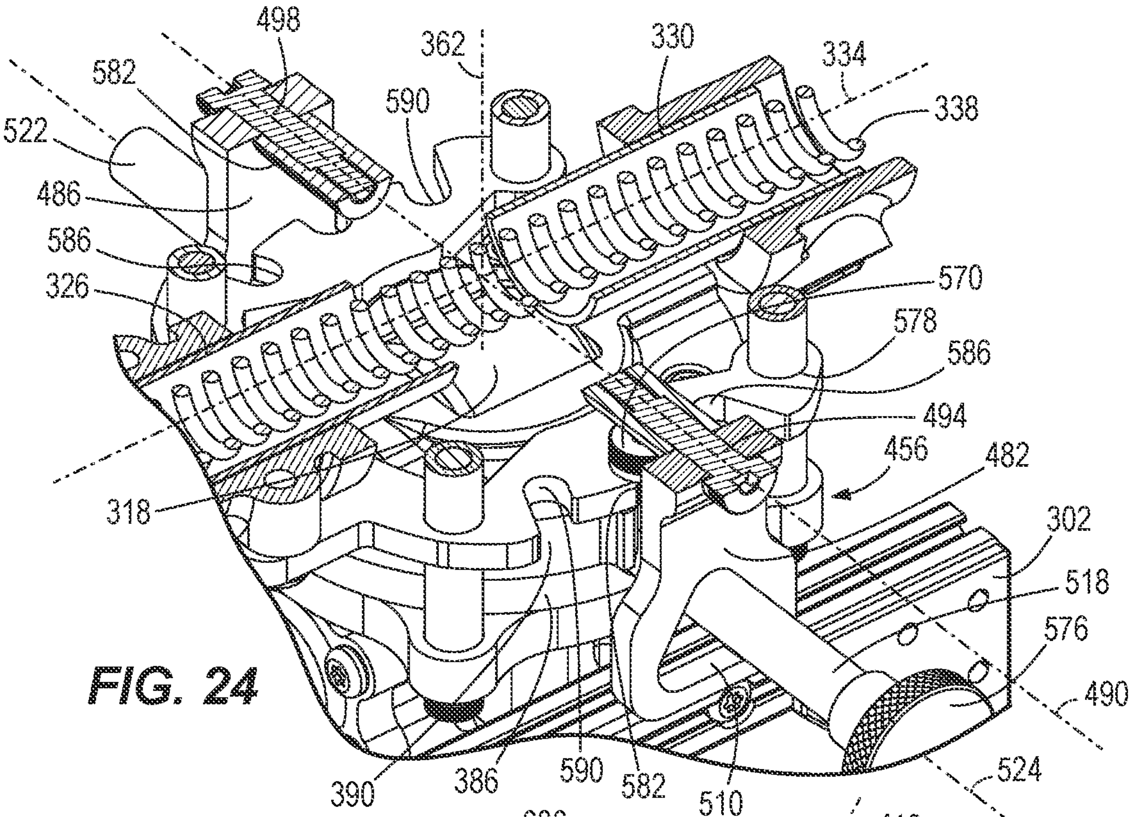
FIG. 24 is a cross-sectional view of the drain cleaning machine of FIG. 18 with a selection mechanism in a radial drive mode.
Figure 27:
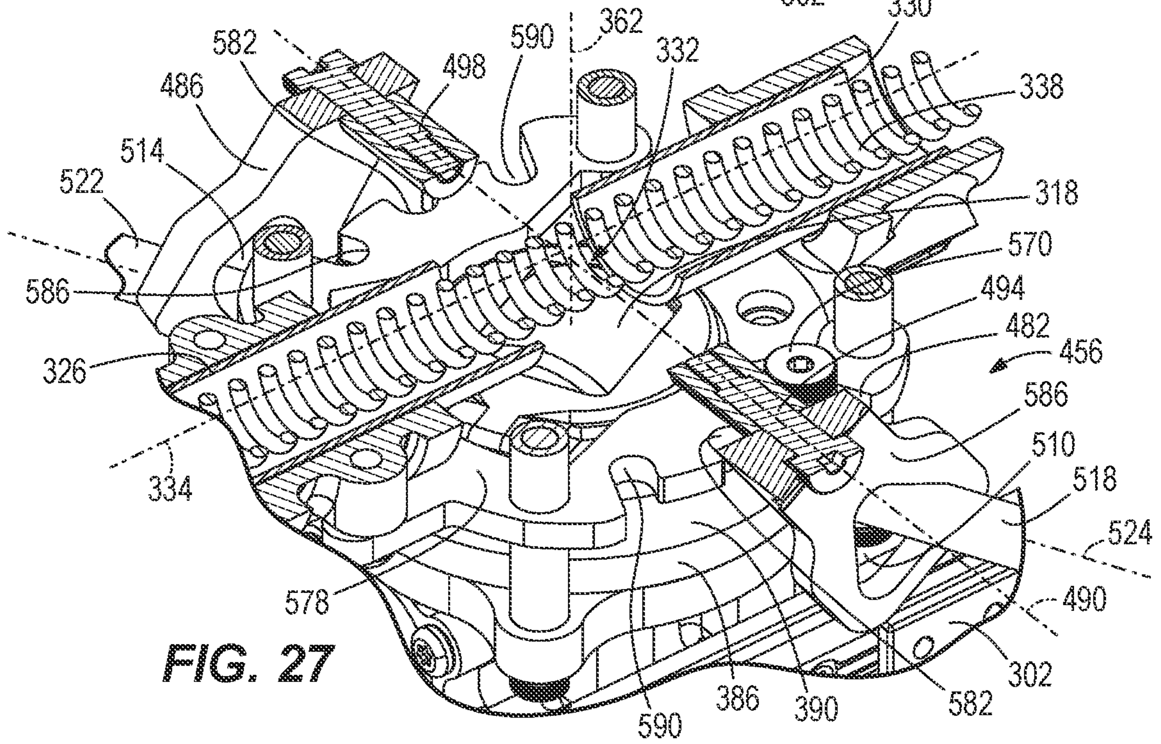
FIG. 27 is a cross-sectional view of the drain cleaning machine of FIG. 18 with the selection mechanism in the feed mode.
Figure 30:
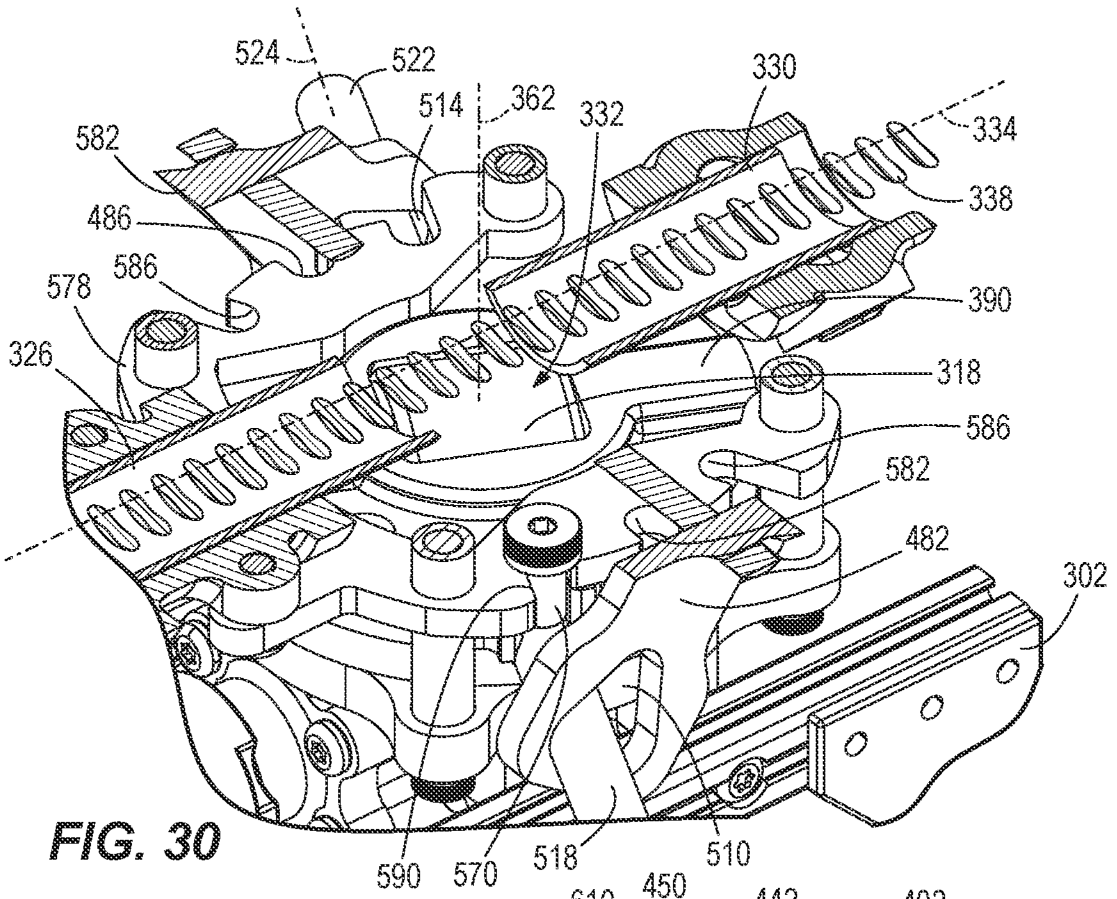
FIG. 30 is a cross-sectional view of the drain cleaning machine of FIG. 18 with the selection mechanism in a retract mode.

With reference to FIGS. 24, 27 and 30, the frame 302 includes a detent plate 578 with a pair of first detents 582 corresponding to radial drive mode, a pair of second detents 586 corresponding to feed mode, and a pair of third detents 590 corresponding to retract mode. As explained in further detail below, when the detent bolt 570 has been placed in one of the first or second detent bores 566, 574, the detent bolt 570 is biased with the first or second shift pins 518, 522 toward the drive axis 322, such that the detent bolt 570 will be received in one of the first, second, or third detents 582, 286, 590, depending on how the shift pins 518, 522 have shifted the first and second shift plates 386, 390 about the shift axis 632.

Engagement Mechanism 592

The drain cleaning machine 298 includes an engagement mechanism 592 that includes everything described in this paragraph and the following three paragraphs. As explained in further detail below, the engagement mechanism 298 allows the first and second idler wheel carriers 402, 406 to move between engaged positions, in which the first and second idler wheels 418, 422 are moved toward the snake axis 334 (FIGS. 20-22), and disengaged positions, in which the first and second idler wheels 418, 422 are neutrally biased away from the snake axis 334.

With reference to FIGS. 21 and 22, the first and second idler wheel carriers 402, 406 respectively include first and second translation fasteners 594, 598 extending therefrom. With reference to FIGS. 19 and 21-23, a first translation plank 602 is secured to the first idler wheel carrier 402 via the first translation fastener 594. The first translation plank 602 is also secured to a pair of first translation posts 606 that respectively extend through a pair of first translation lobes 610 extending from the first idler chute 450. The first translation posts 606 also extend through slots 614 of first translation levers 618 that are pivotable about a first lever axis 620. The first translation posts 606 include first translation nuts 622 on a side of the slots 614 opposite the first translation lobes 610. The first translation plank 602, and thus the first translation posts 606 and the first idler wheel carrier 402, is biased away from the snake passage 332 by a pair of first translation springs 626 that are seated against the first translation lobes 610. Thus, the first translation levers 618 tend to be pulled toward the first translation lobes 610 by the first translation nuts 622.

With reference to FIGS. 21 and 22, a second translation plank 630 is secured to the second idler wheel carrier 406 via the second translation fastener 598. The second translation plank 630 is secured to a pair of second translation posts 634 that respectively extend through a pair of second translation lobes 638 extending from the second idler chute 454, as shown in FIG. 22. The second translation posts 634 also extend through slots 640 of second translation levers 642 that are pivotable about a second lever axis 644, as shown in FIGS. 19, 25, 28 and 31. The second translation posts 634 include second translation nuts 645 (FIG. 19) on a side of the slots 640 opposite the second translation lobes 638. The second translation plank 630, and thus the second translation posts 634 and the second idler wheel carrier 406, is biased away from the snake passage 332 by a pair of second translation springs 646 (FIG. 22) that are seated against the second translation lobes 638. Thus, the second translation levers 642 tend to be pulled toward the second translation lobes 638 by the second translation nuts 645.

With reference to FIGS. 18 and 19, the engagement mechanism 592 also includes an actuator lever 654 that pivots about an actuating axis 658 and an engagement plate 662 that moves along the frame 302 in a direction perpendicular to the snake axis 334. When the actuator lever 654 is in a neutral, deactivated position, the engagement plate 662 is normally pushed by the first and second translation levers 618, 638 toward the actuator lever 654 via the respective biasing forces of the first and second translation springs 626, 646, resulting in the engagement plate 662 being in a first, neutral position, in which the engagement plate 662 does not activate a motor switch 666 in the housing 304 for turning on the motor 310. However, when the actuator lever 654 is moved toward the engagement plate 662 to an activated position, the actuator lever 654 pushes the engagement plate 662 toward the snake axis 334 to a second, engaged, position in which the engagement plate 662 pushes against the first and second translation levers 618, 638 and contacts the motor switch 666 to turn on the motor 310. Thus, unless the actuator lever 654 is moved toward the engagement plate 662, the motor 310 will not turn on, thus helping save battery life when the drain cleaning machine 298 is not being operated.

Selection of Radial Drive Mode

In operation, the snake 338 may already be arranged in the snake passage 332 of the drain cleaning machine 298 and partially positioned in a drain and the operator may wish to rotate the snake 338 about the snake axis 334 to clean the drain. Thus, the operator first ensures that the selection mechanism 456 is set in radial drive mode. Specifically, the operator first must make sure that the detent bolt 570 is received in one of the first detents 582, which causes the first and second shift plates 386, 390 to be in a rotational position about the shift axis 362 that results in the drive wheel 318 being in the first position (FIGS. 20-22 and 24), in which the drive axis 322 is parallel to the snake axis 334. When the detent bolt 570 is received in one of the first detents 582, the first idler wheel 418 is also caused to be in rotational position about the first carrier axis 410 (FIG. 25) such that the first idler wheel axis 434 is parallel to the snake axis 334. When the detent bolt 570 is received in one of the first detents 582, the second idler wheel 422 is also caused to be in rotational position about the second carrier axis 414 (FIG. 25) such that the second idler wheel axis 438 is parallel to the snake axis 334. Thus, the selection mechanism 456 is in radial drive mode and the operator may begin a radial drive operation.

Operation in Radial Drive Mode

To begin the radial drive operation, the operator moves the actuator lever 654 toward the engagement plate 662, causing the engagement plate 662 to move toward the snake axis 334. The engagement plate 662 triggers the motor switch 666 and pushes the first and second translation levers 618, 638 downwardly against the biasing forces of the first and second translation springs 626, 646, causing the first translation nuts 622 and second translation nuts 645 to be respectively be moved along the slots 614 of the first translation levers 618 and slots 640 of the second translation levers 638. This in turn causes the first and second translation posts 606, 634 to be respectively pulled through the first and second translation lobes 610, 638 toward the snake passage 332, which in turn causes the first and second translation planks 602, 630 to be pulled toward the first and second idler chutes 450, 454. As a result, the first and second idler wheel carriers 402, 406 are respectively moved along the first and second carrier axes 410, 414 from their disengaged positions, to the engaged positions in which the first and second idler wheels 418, 422 are pressed against the snake 338, as shown in FIGS. 20-22.

The snake 338 is thus pushed within the snake passage 332 by the first and second idler wheels 418, 422 toward the drive wheel 318, such that the snake 338 is firmly engaged by the rotating drive wheel 318, which is receiving torque from the motor 310 via the transmission 314. Because the drive axis 322 of the drive wheel 318, the first idler wheel axis 434 of the first idler wheel 418, and the second idler axis 438 of the second idler wheel 422 are all parallel to the snake axis 334, the snake 338 is spun about the snake axis 334 and does not translate along the snake axis 334. The drive wheel 319 has a high friction coefficient of friction with the (e.g. steel) snake 338, such that it is able to spin the snake 338 and does not slip along the snake 338. In some embodiments, the drive wheel's coefficient of friction with the snake 338 is at least 0.3. Once the operator has finished operating with radial drive mode, the operator may wish to switch to feed mode.

Selection of Feed Mode

The operator may now move the actuator lever 654 away from the engagement plate 662, resulting in the motor 310 turning off and the first and second idler wheel carriers 402, 406 being biased back to their disengaged positions, such that the first and second idler wheels 418, 422 are not contacting the snake 338.

Then, assuming the detent bolt 570 is in the first detent bore 566 of the first shift pin 518 and the selection knob 576 is on the first shift pin 518, the operator pulls and holds the selection knob 576 to pull first shift pin 518 along the shift pin axis 524 away from the housing 304, such that the detent bolt 570 is removed from the first detent 582. While holding the first shift pin 518 away from the detent plate 578, the operator then rotates the first shift pin 518 (to the right as viewed in FIG. 18) along a slot 670 in the housing 304, which causes the first and second shift plates 386, 390 to rotate the drive wheel 318 negative α degrees about the shift axis 362 from the first position (FIG. 24) to the second position shown in FIG. 27. Once the drive wheel 318 is in the second position, the drive wheel axis 322 is arranged negative α degrees from the first position (FIG. 24) about the shift axis 362. As the first and second shift plates 386, 390 rotate about the shift axis 362, the second bevel gear 378 on the drive axle 382 rolls along the double bevel gear 358, while the double bevel gear 358 remains stationary. Thus, while using shifting mechanism 456 to shift between radial drive, feed, and retract modes, torque is not transmitted back through the transmission 314 to the motor 310.

Figure 26:
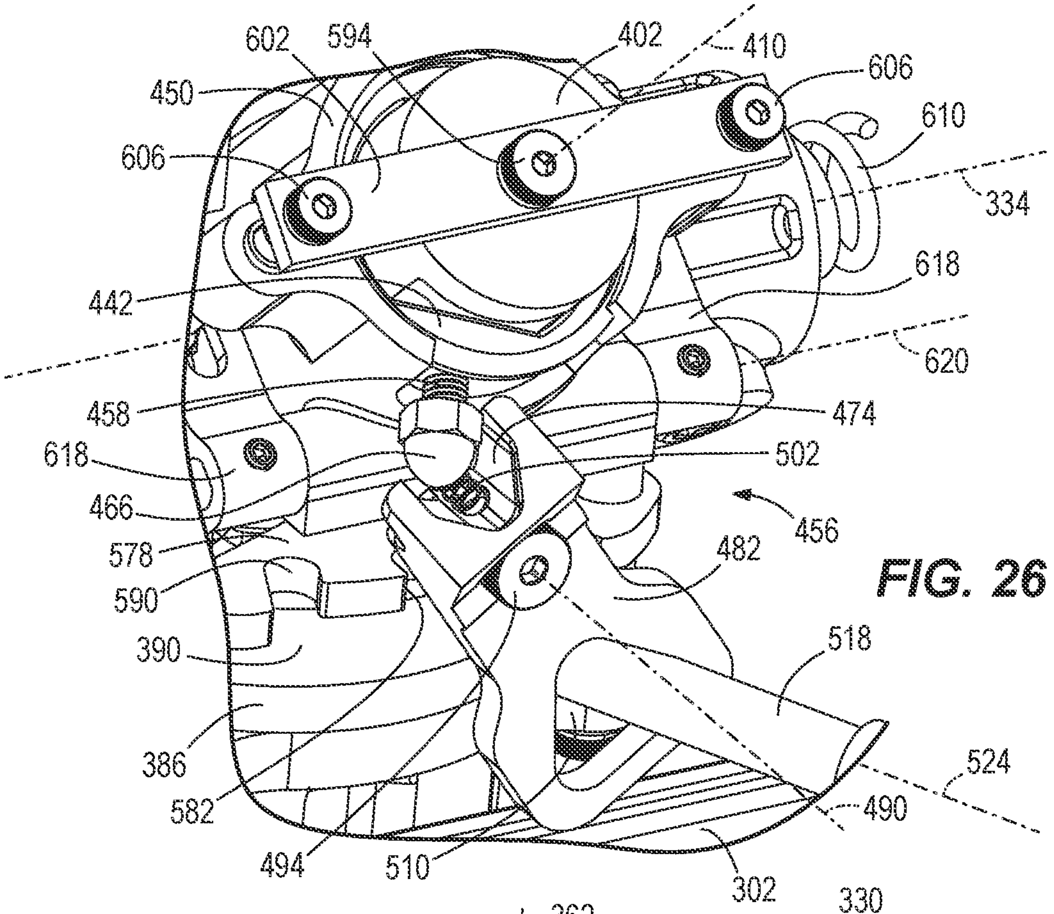
FIG. 26 is an enlarged perspective view of the drain cleaning machine of FIG. 18 with the selection mechanism in a feed mode.

Rotation of the first and second shift plates 386, 390 causes the second shift pin 522 to rotate about the shift axis 362 in a manner identical to the first shift pin 518. Simultaneously, because the first and second shift pins 518, 522 are arranged through first and second pin recess 510, 514, rotation of the first and second shift pins 518, 522 causes the first and second pivot linkages 482, 486 to rotate counterclockwise (when viewing the pivot linkages 482, 486 from outside the drain cleaning machine 298) about the pivot axis 490, as shown in FIG. 26. Because the first and second acorn nuts 466, 470 are respectively positioned within the first and second acorn recesses 474, 478 of the first and second first and second pivot linkages 482, 486, the first and second fasteners 458, 462, the first and second rotation collars 442, 446, the first and second idler wheel carriers 402, 406, and thus the first and second idler wheels 418, 422 are respectively caused to rotate γ degrees clockwise about the first and second carrier axes 410, 414, such that the first and second idler wheels 418, 422 are in their second positions, in which the first and second idler wheel axes 434, 438 are not parallel to the snake axis 334, as shown in FIG. 28. Specifically, once the first and second idler wheels 418, 422 are in their second positions, the first and second idler wheel axes 434, 438 are arranged positive γ degrees from their first positions (FIGS. 21 and 22) about the first and second carrier axes 410, 414.

The operator now releases the selection knob 570, causing the first shift pin 518 to be biased back toward the drive axis 322 until the detent bolt 470 is received in the second detent 586. The drive wheel 318 and the first and second idler wheels 418, 422 are now all locked in their respective second positions, in which the drive wheel, first idler wheel, and second idler wheel axes 322, 434, 438 are not parallel to the snake axis 334. Thus, the selection mechanism 456 is in feed mode and the operator may begin a feed operation.

Operation in Feed Mode

To begin the feed operation, the operator moves the actuator lever 654 toward the engagement plate 662, causing the engagement plate 662 to move toward the snake axis 334. As described above, this triggers the motor switch 666 and results in the first and second idler wheel carriers 402, 406 being moved along the first and second carrier axes 410, 414 from their disengaged positions, to the engaged positions in which the first and second idler wheels 418, 422 are pressed against the snake 338.

The snake 338 is thus pushed within the snake passage 332 by the first and second idler wheels 418, 422 toward the drive wheel 318, such that the snake 338 is firmly engaged by the drive wheel 318, which is receiving torque from the motor 310 via the transmission 314. Because the drive wheel 318, the first idler wheel 418, and the second idler wheel 422 are all in their respective second positions, the snake 338 is moved along the snake axis 334 into the snake inlet tube 326, and out of the snake outlet tube 330 and into the drain. Once the operator has finished operating with feed mode, the operator may wish to switch to retract mode to retract the snake 338 from the drain.

Selection of Retract Mode

The operator may now move the actuator lever 654 away from the engagement plate 662, resulting in the motor 310 turning off and the first and second idler wheel carriers 402, 406 being biased back to their disengaged positions, such that the first and second idler wheels 418, 422 are not contacting the snake 338.

The operator then pulls and holds the selection knob 576 to pull first shift pin 518 along the shift pin axis 524 away from the housing 304, such that the detent bolt 570 is removed from the second detent 586. While holding the first shift pin 518 away from the detent plate 578, the operator then rotates the first shift pin 518 (to the left as viewed in FIG. 18) along the slot 670 in the housing 304, which causes the first and second shift plates 386, 390 to rotate the drive wheel 318 positive (α+β) degrees about the shift axis 362 from the second position (FIG. 27) to the third position shown in FIG. 30. Once the drive wheel 318 is in the third position, the drive wheel axis 322 is arranged positive β degrees from the first position (FIG. 24) about the shift axis 362.

Figure 29:
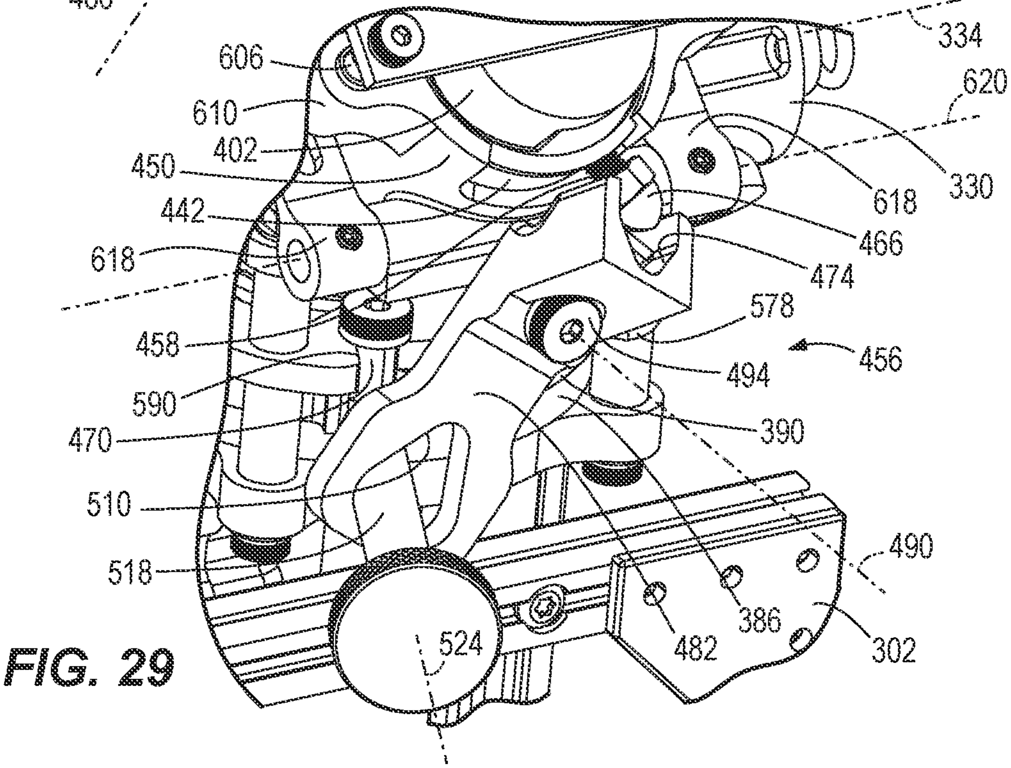
FIG. 29 is an enlarged perspective view of the drain cleaning machine of FIG. 18 with the selection mechanism in a retract mode.

Rotation of the first and second shift plates 386, 390 causes the second shift pin 522 to rotate about the shift axis 362 in a manner identical to the first shift pin 518. Simultaneously, because the first and second shift pins 518, 522 are arranged through first and second pin recess 510, 514, rotation of the first and second shift pins 518, 522 causes the first and second pivot linkages 482, 486 to rotate clockwise (when viewing the pivot linkages 482, 486 from outside the drain cleaning machine 298) about the pivot axis 490, as shown in FIG. 29. As described above, this causes the first and second idler wheels 418, 422 to rotate negative (γ+δ) degrees (counterclockwise) about the first and second carrier axes 410, 414, such that the first and second idler wheels 418, 422 are in their third positions, in which the first and second idler wheel axes 434, 438 are not parallel to the snake axis 334, as shown in FIG. 31. Specifically, once the first and second idler wheels 418, 422 are in their third positions, the first and second idler wheel axes 434, 438 are arranged negative δ degrees from their first positions (FIGS. 21 and 22) about the first and second carrier axes 410, 414.

The operator now releases the selection knob 576, causing the first shift pin 518 to be biased back toward the drive axis 322 until the detent bolt 470 is received in the third detent 590. The drive wheel 318 and the first and second idler wheels 418, 422 are now all locked in their respective third positions, in which the drive wheel, first idler wheel, and second idler wheel axes 322, 434, 438 are not parallel to the snake axis 334. Thus, the selection mechanism 456 is in retract mode and the operator may begin a retract operation.

Operation in Retract Mode

To begin the retract operation, the operator moves the actuator lever 654 toward the engagement plate 662, causing the engagement plate 662 to move toward the snake axis 334. As described above, this triggers the motor switch 666 and results in the first and second idler wheel carriers 402, 406 being moved along the first and second carrier axes 410, 414 from their neutrally biased disengaged positions, to the engaged positions in which the first and second idler wheels 418, 422 are pressed against the snake 338.

The snake 338 is thus pushed within the snake passage 332 by the first and second idler wheels 418, 422 toward the drive wheel 318, such that the snake 338 is firmly engaged by the drive wheel 318, which is receiving torque from the motor 310 via the transmission 314. Because the drive wheel 318, the first idler wheel 418, and the second idler wheel 422 are all in their respective third positions, the snake 338 is moved along the snake axis 334 out of the drain, into the snake outlet tube 330, and out of the snake inlet tube 326.

Switching Modes while the Motor is Running

In some instances, the operator may not wish to wish to discontinue the motor 310 while switching between radial drive, feed, and retract modes of the selection mechanism 456. In these instances, the operator simply continues holding the actuator lever 654 toward the engagement plate 662, keeping the first and second idler wheels 418, 422 in their engaged positions. While holding the actuator lever 654 toward the engagement plate 662, the operator uses the selection mechanism 456 as described to switch between radial drive, feed, and retract modes, thus allowing an operator to seamlessly shift between modes without stopping the motor 310.

Switching Between Feed and Retract the Snake 338 Without Using Selection Mechanism 456

In some instances, the operator may not want to or be able to use selection mechanism 456 to switch between feed and retract modes. For instance, the selection mechanism 456 may be in feed mode, resulting in the drive wheel 318 and the first and second idler wheels 418, 422 being locked in their respective second positions. However, instead of switching the selection mechanism 456 to retract mode to retract the snake 338, the operator can simply reverse direction of the motor 310 using the forward/reverse switch 339, thus allowing the operator to retract the snake 338 from the drain while the selection mechanism is in feed mode.

Manual Feeding and Retraction of the Snake while Engaging the Radial Drive Mechanism 30

In some instances, the operator may want to use the radial drive mode to spin the snake 338 about the snake axis 334 while simultaneously feeding or retracing the snake 338 from the drain. In these instances, the operator selects radial drive mode as described above and pulls the actuator lever 654 towards the engagement plate 662. Then, the operator manually feeds the snake 338 into or pulls the snake 338 out of the snake inlet tube 326. As the snake 338 is moved along the snake axis 334 into or out of the snake inlet tube 326, the snake 338 is simultaneously spun about the snake axis 334, thereby "drilling" the snake into or out a drain.

Third Embodiment—Drain Cleaning Machine 674

Another embodiment of a drain cleaning machine 674 is shown in FIGS. 32-35. The drain cleaning machine 674 is similar to the drain cleaning machine 10, with the following differences and additions explained below. The drain cleaning machine 674 includes a housing 678, a frame 682 to support the housing 678, and two wheels 686 rotatably coupled to one end of the frame 682. The frame 682 includes a handle 690 at an end of the frame 682 opposite the wheels 686, such that an operator can lift the frame 682 and pull the drain cleaning machine 674 along a surface via the wheels 686. In some embodiments, the handle 690 can telescope with respect to the frame 682 between an extended position and a retracted position.

The housing 678 includes a door 694 for securing a battery within a battery receptacle, thus sealing the battery receptacle and isolating the battery from the contaminated environment, thereby keeping the battery clean and dry. The battery provides power to motor 34. The door 694 includes a latch 698 for locking the door 694 against the housing 678 in a closed position. A snake inlet 702 and a snake outlet 706 extend from the housing 678 and help define the snake passage and a snake axis 710. The drain cleaning machine 674 includes a forward/reverse switch 712 to allow an operator to select the feed direction of the motor 34 or the retract direction of the motor 34, depending on whether the operator would like feed or retract the snake when the translate mechanism 26 is in the engaged state.

The drain cleaning machine 674 includes an actuating lever 714 for activating the motor 34. Movement of the actuating lever 714 from a deactivated position (FIGS. 32 and 33) to an activated position (e.g., toward the housing 678) activates the motor 34. Also, like the actuating lever 42 of the drain cleaning machine 10, movement of the actuating lever 714 from the deactivated position to the activated position (e.g., away from the housing 678) moves the push plate 62 toward the selection plate 82, as described above. Unlike the actuating lever 42 of drain cleaning machine 10, the actuating lever 714 includes a first section 722 and a second section 726 that is moveable with respect to the first section 722 between an operative position shown in FIGS. 32 and 33 and an inoperative, or storage, position shown in FIGS. 34 and 35. In the storage position, the second section 726 is approximately parallel to a top portion 728 of the housing 678. To move between the operative position and the storage position, the second section 726 is pivotable with respect to the first section 722 via a pivot pin 730 defining a pivot axis 734.

Figure 32:
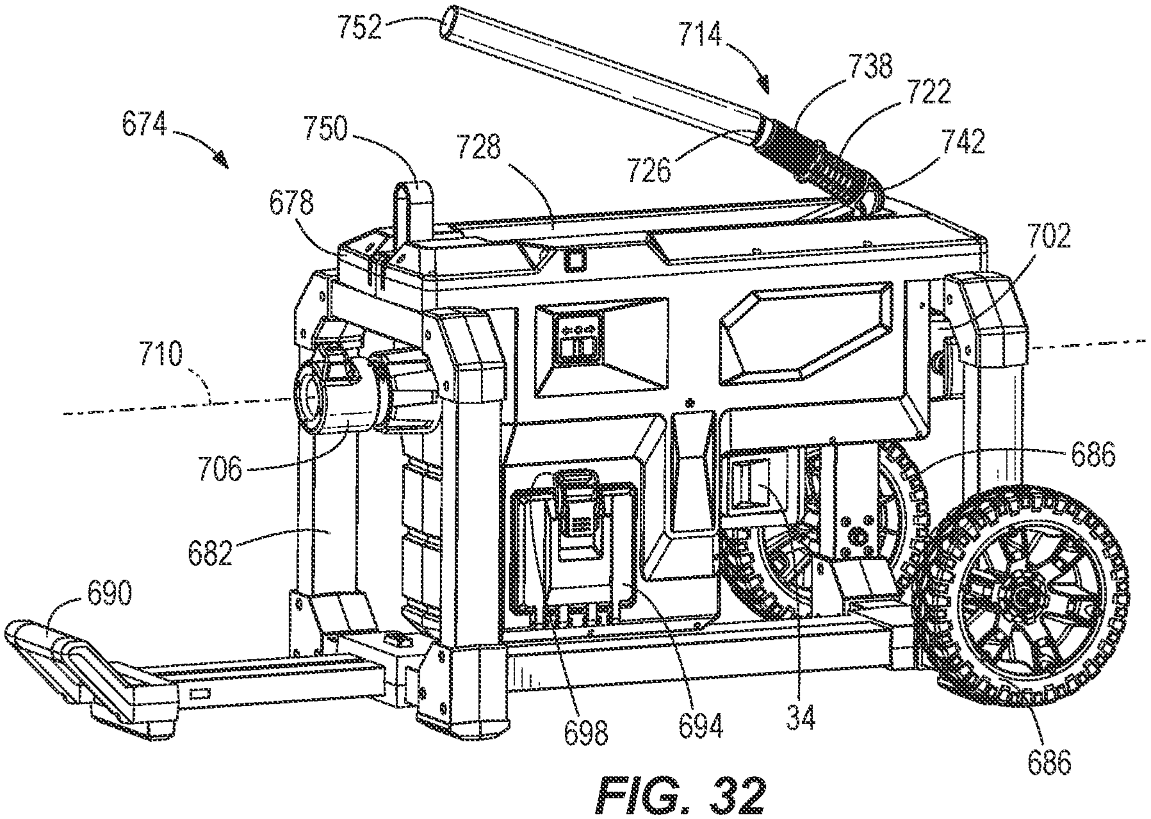
FIG. 32 is a perspective view of a drain cleaning machine according to another embodiment of the invention, with a second section of an actuating lever in an operative position.
Figure 33:
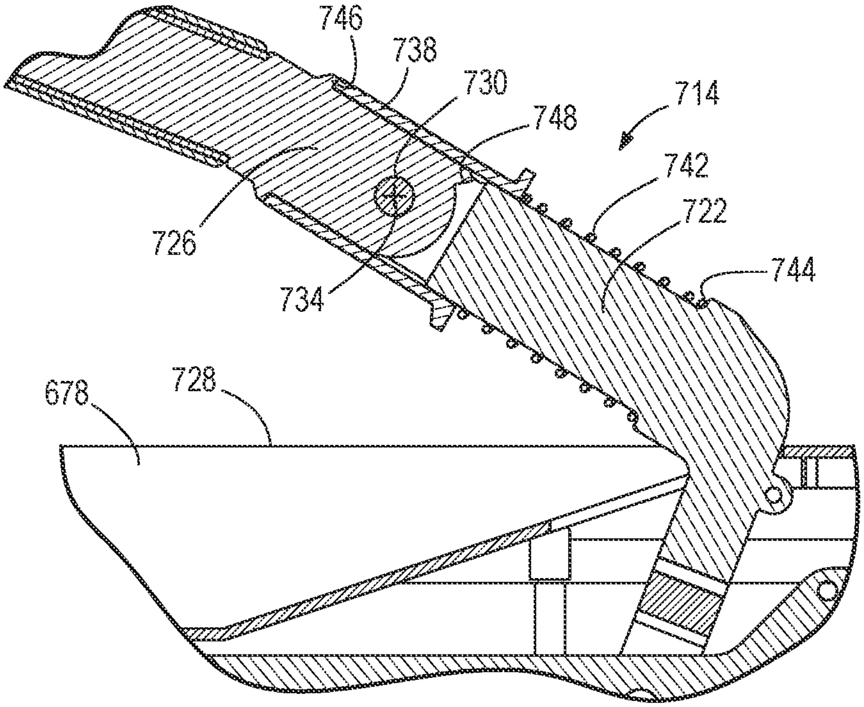
FIG. 33 is an enlarged cross-sectional view of the drain cleaning machine of FIG. 32, with the second section of the actuating lever in the operative position.
Figure 34:
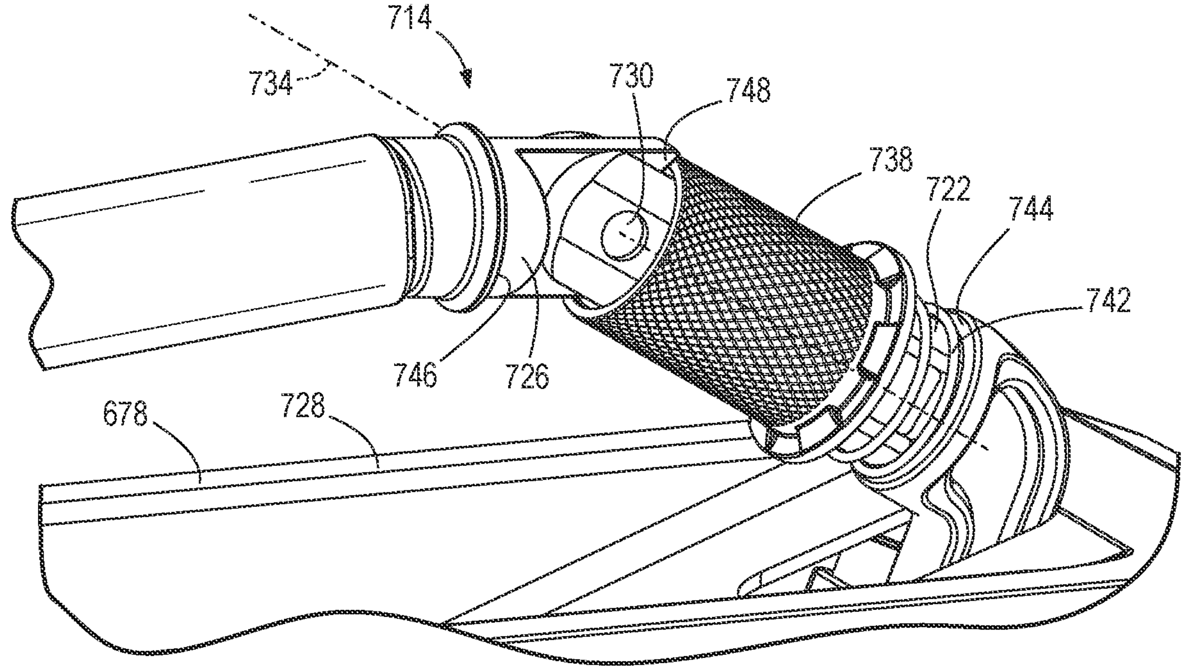
FIG. 34 is an enlarged perspective view of the drain cleaning machine of FIG. 32, with the second section of the actuating lever in a storage position.
Figure 35:
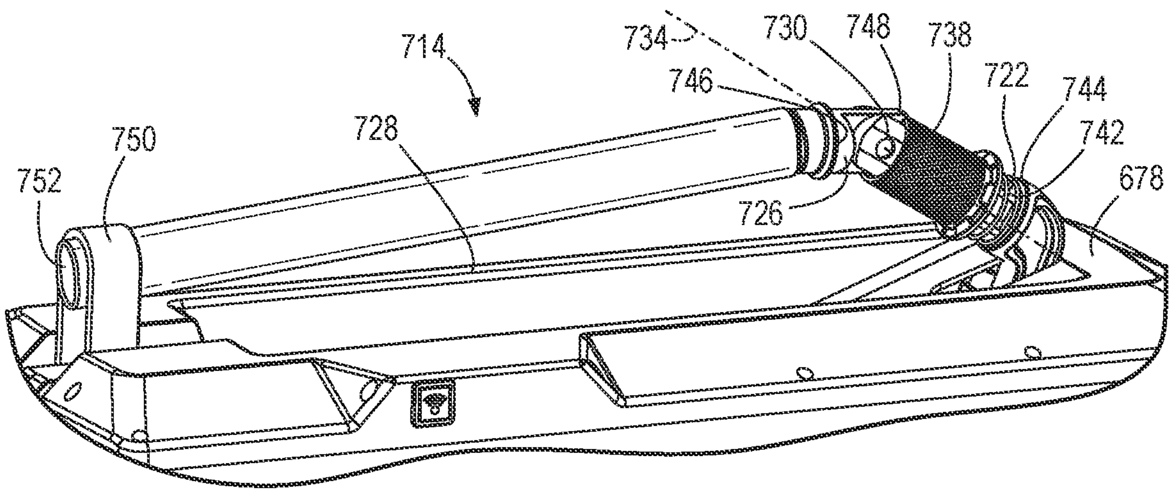
FIG. 35 is an enlarged perspective view of the drain cleaning machine of FIG. 32, with the second section of the actuating lever in the storage position.

The actuating lever 714 also includes a lock member, such as a collar 738 that is moveable between a first position shown in FIGS. 32 and 33, in which the second section 726 is locked in the operative position, and a second position shown in FIGS. 34 and 35, in which the second section 726 is permitted to pivot with respect to the first section 722, and thus permitted to pivot to the storage position. The collar 738 is arranged on the first section 722 and is biased toward the first position by a compression spring 742 that is seated against a flange 744 on the first section 722. When the collar 738 is in the first position, the collar 738 is arranged over the second section 726 and abuts a flange 746 on the second section 726. Thus, when the second section 726 is in the operative position and the collar 738 is in the first position, the first section 722 is forced to move with the second section 726 when the second section 726 is used by the operator to manipulate the actuating lever 714 between the activated and deactivated positions. When the collar 738 is in the second position, the collar 738 is moved off the second section 726.

In operation, when an operator wishes to operate the drain cleaning machine 674 in radial drive or translate mode, the operator first ensures that the second section 726 is in the operative position and the collar 738 is in the first position, thus locking the second section 726 in the operative position (FIGS. 32 and 33). An operator may then move the actuating lever 714 from the deactivated position (FIGS. 32 and 33) to the activated position that is towards housing 678. When the actuating lever 714 is moved toward the activated position, the first and second sections 722, 726 pivot together toward the housing 678 because the collar 738 is in the first position. Movement of the lever 714 to the activated position actuates the motor 34 and switches either the radial drive or the translate mechanism to the engaged position, depending on what the operator has selected. When the operator has finished operating drain cleaning machine 674, the operator moves the actuating lever 714 back to the deactivated position, thus deactivating the motor and switching the radial drive or translate mechanism to the disengaged position.

The operator may then desire to transport or store the drain cleaning machine 674. Thus, the operator may wish to put the second section 726 of the actuating lever 714 into the storage position to inhibit inadvertent activation of the motor 34. To put the second section 726 into the storage position, the operator first moves the collar 738 from the first position to the second position against the force of spring 742, such that the second section 726 is now permitted to move with respect to the first section 722. While holding the collar 738 in the second position, the operator pivots the second section 726 about the pivot axis 734 from the operative position to the storage position shown in FIGS. 34 and 35.

Once the second section 726 is in the storage position, a detent 748 of the second section 726 is moved to a position shown in FIG. 34. The illustrated detent 748 is a shark fin detent 748. While in the storage position, the shark fin detent 748 catches the collar 738 when the collar 738 is biased by the spring 742 back toward the first position, thus inhibiting the collar 738 from returning to the first position. Also, the operator may rotate a securing member, such as a hook 750, with respect to the housing 678 between a disengaged position, in which the hook 750 is not capable of engaging the second section 726, and an engaging position (FIGS. 32 and 35), where the hook 750 is capable of engaging an end 752 of the second section 726, thereby inhibiting the second section 726 from moving away from housing 678 and securing the second section 726 in the storage position. Thus, with the second section 726 in the storage position, the actuating lever 714 is inhibited from moving to the activated position, because the first section 722 is no longer coupled for actuating movement with the second section 726, such that the operator is inhibited from inadvertently moving the actuating lever 714 to the activated position during transport or while in storage. Also, because the collar 738 requires no tools (screwdrivers, etc.) to move between the first and second positions, and because the second section 726 requires no tools to move between the operative and storage positions, the operator is afforded greater convenience in preparing the drain cleaning machine 674 for storage or transport.

Figure 36:
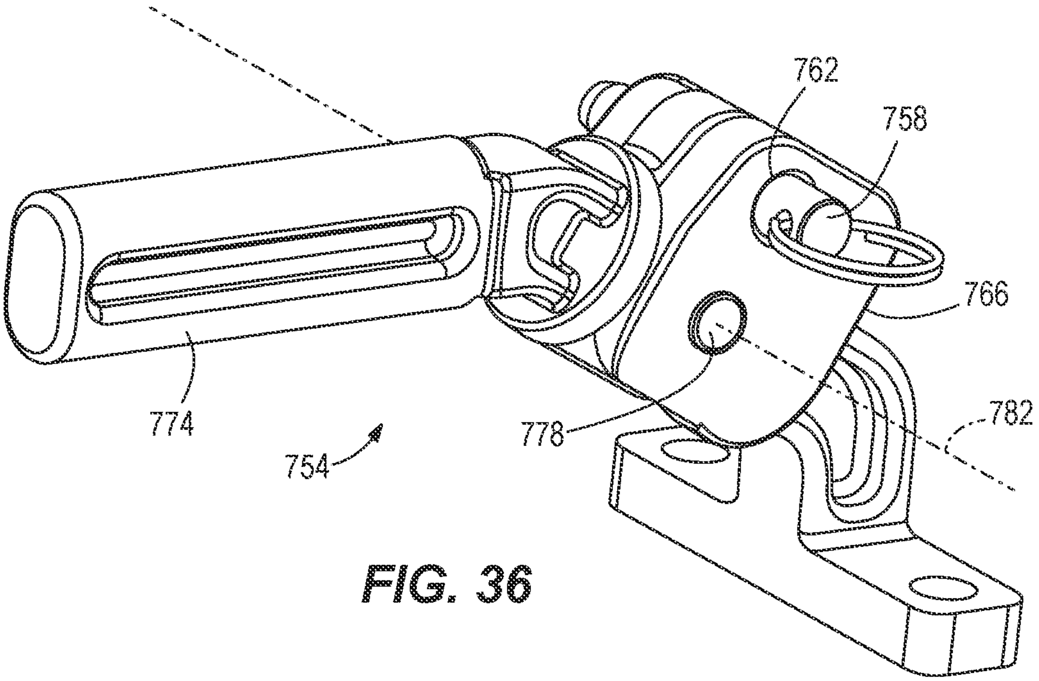
FIG. 36 is a perspective view of another embodiment of an actuating lever for the drain cleaning machine of FIG. 32, with a second section of the actuating lever in an operative position.
Figure 37:
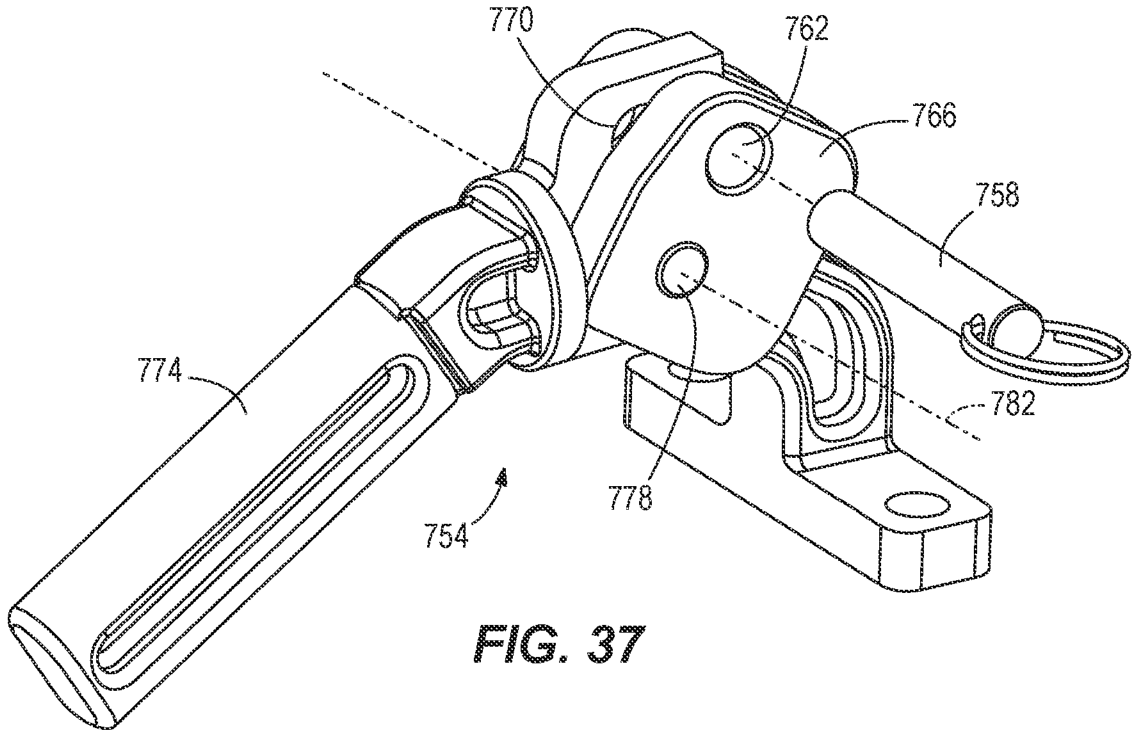
FIG. 37 is a perspective view of the actuating lever of FIG. 36, with the second section of the actuating lever in a storage position.

As shown in FIG. 36, in another embodiment of an actuating lever 754 for the drain cleaning machine 674, the lock member is a removable pin 758 that in a first position is receivable in a first recess 762 of a first section 766 and a second recess 770 of a second section 774, such that the second section 774 is locked in the operative position. As shown in FIG. 37, in a second position of pin 758, the pin 758 is removed from the first and second recesses 762, 770, such that the second section 774 is permitted to move with respect to the first section 766 to a storage position, in which the second section 774 can be engaged by the hook 750. Specifically, the second section 774 is pivotable with respect to the first section 766 via a pivot pin 778 defining a pivot axis 782. In the illustrated embodiment, the pin 758 is a cotter pin. In other embodiments, the pin 758 may include other suitable pin-type members for securing the second section 774 in the operative position.

Figure 38:
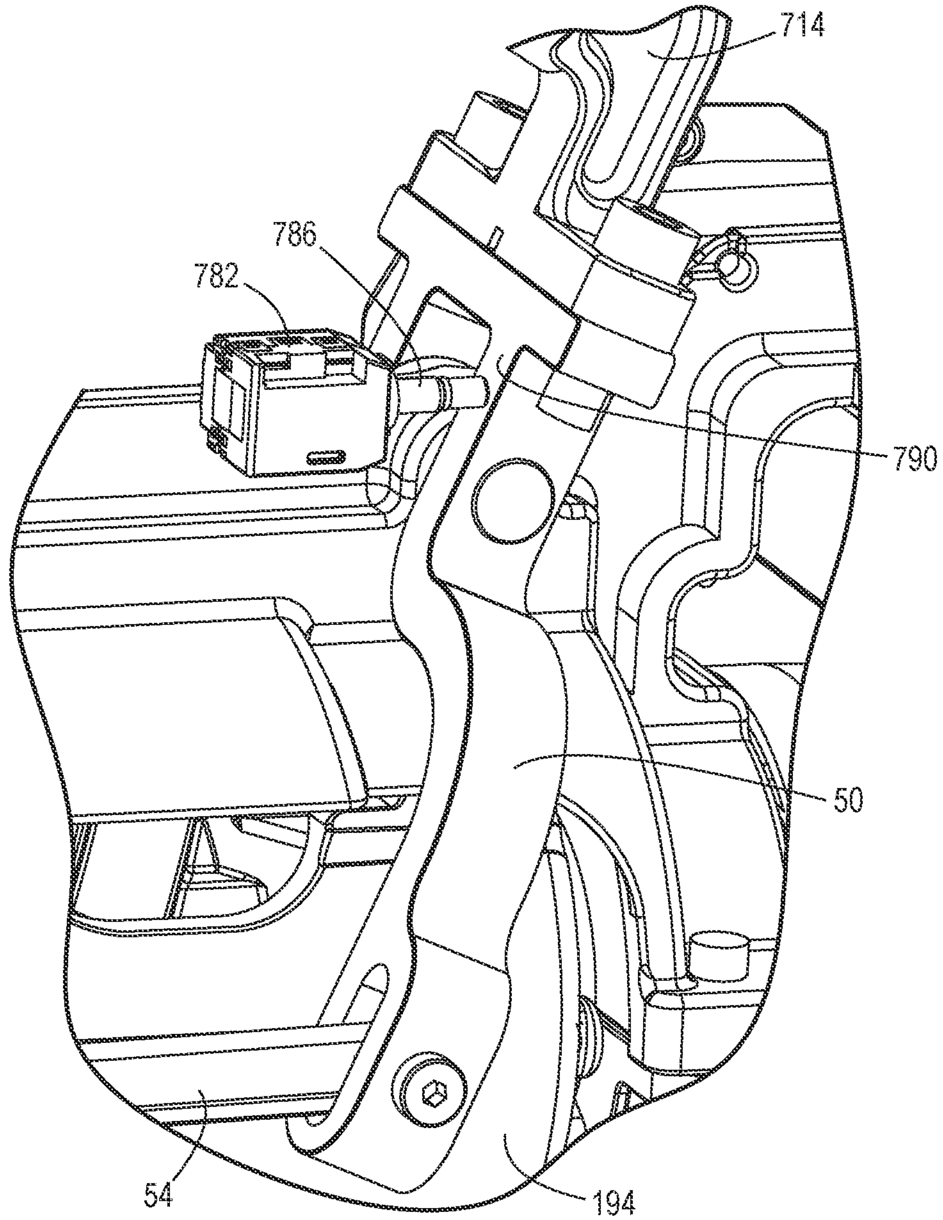
FIG. 38 is a perspective view of the drain cleaning machine of FIG. 32, with portions removed.

As shown in FIG. 38, in some embodiments, the drain cleaning machine 674 includes a motor switch 782 with a switch trigger 786 biased away from the motor switch 782. The switch trigger 786 is used to close the motor switch 782 for activating the motor 34 when the actuating lever 714 is moved to the activated position. Specifically, the arms 50 include a switch face 790 configured to depress the switch trigger 786 when the actuating lever 42 is moved to the activated position, thereby closing the motor switch 782 and activating motor 34. However, when the actuating lever 714 is moved to the deactivated position, the switch face 786 moves away from the motor switch 782, allowing the switch trigger 786 to be biased away from the switch 782 and causing the motor 34 to be deactivated. In some embodiments, the maximum travel distance of the switch trigger 786 is 8.5 mm and the maximum travel distance of the switch face 790 is also 8.5 mm. Thus, in the embodiment of FIG. 38, movement of the actuating lever 714 simultaneously activates the motor 34 and causes the selection mechanism 40 to engage the translate mechanism 26 or radial drive mechanism 30, depending on which has been selected by the selection plate 82. The motor switch 782 arrangement of the embodiment of FIG. 38 can also be used in drain cleaning machines 10 or 298.

Figure 39:
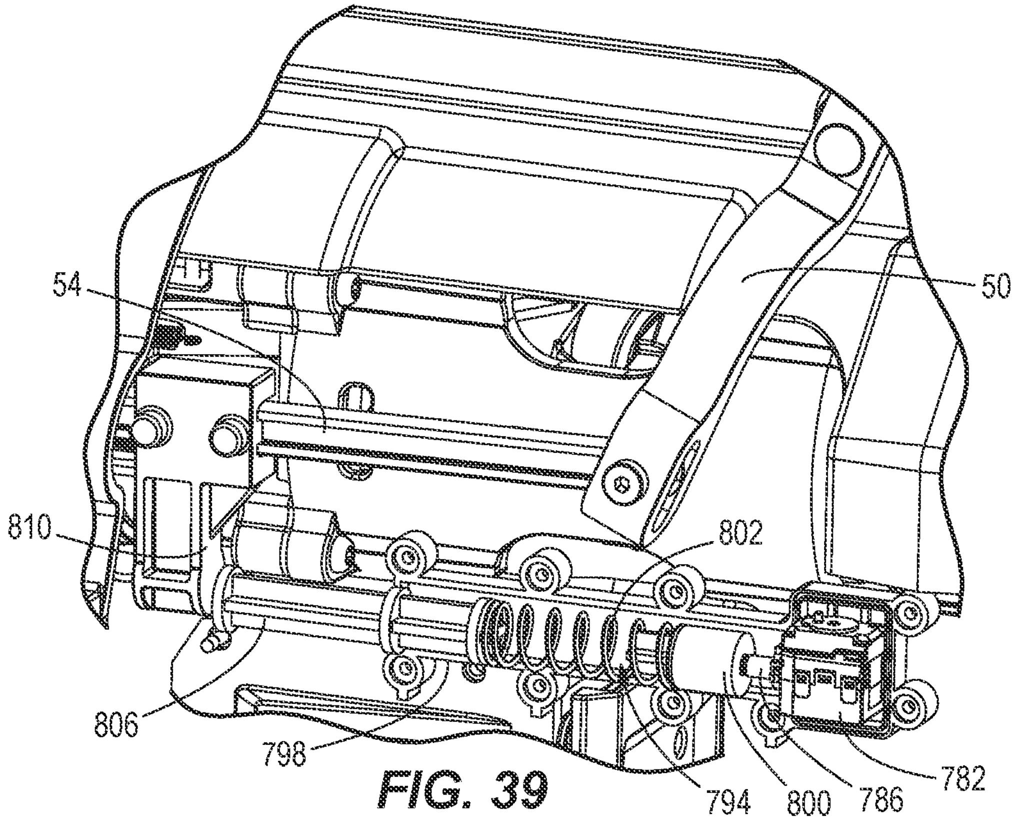
FIG. 39 is a perspective view of the drain cleaning machine of FIG. 32 according to another embodiment of the invention, with portions removed.
Figure 40:
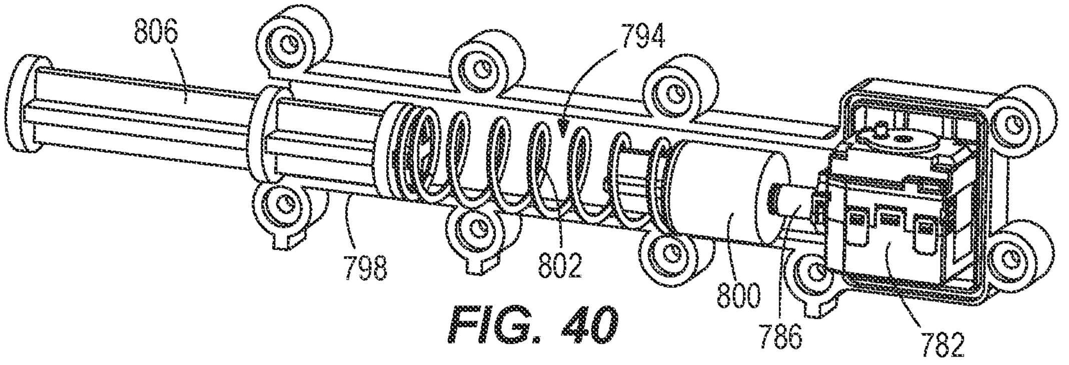
FIG. 40 is a perspective view of the drain cleaning machine of FIG. 32 according to another embodiment of the invention, with portions removed.
Figure 41:
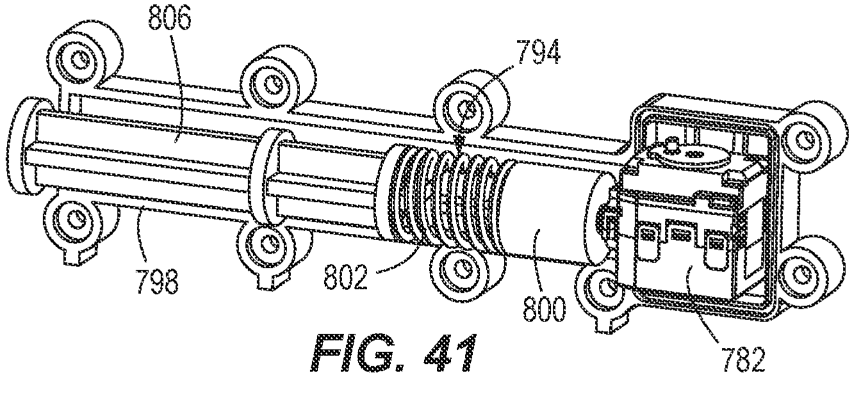
FIG. 41 is a perspective view of the drain cleaning machine of FIG. 32 according to another embodiment of the invention, with portions removed.

As shown in FIGS. 39-41, in some embodiments, the motor switch 782 is arranged in a different location than the embodiment of FIG. 38, and the drain cleaning machine 674 includes an over-travel mechanism 794 arranged within a bracket 798 inside the housing 678 to activate the switch 782. The over-travel mechanism 794 includes a plunger 800 configured to depress the switch trigger 786 and a spring 802 seated against the plunger 800 and biasing a switch linkage 806 away from the plunger 800 within the bracket 798. As shown in FIG. 39, the switch linkage 806 is thus biased against a push member 810 arranged on one of the two linkage members 54. When the actuating lever 714 is in the deactivated position (FIG. 32), the switch linkage 806 is in a first switch linkage position (FIGS. 39 and 40) and the plunger 798 is in a first plunger position, in which it is not depressing the switch trigger 786, such that the switch trigger 786 is in a first switch trigger position and the motor 34 is not activated.

When the actuating lever 714 is moved to the activated positon, the arms 50 pivot counterclockwise as shown in FIG. 39, thus moving the linkage members 54 in a direction to the right as viewed in FIG. 39. The linkage members 54 thus pull the push plate 62 as described above, and at the same time the push member 810 pushes the switch linkage 806 toward the motor switch 782 to a second switch linkage position shown in FIG. 41, thereby compressing spring 802 and pushing the plunger 800 to a second plunger position, in which the plunger 798 depresses the switch trigger 786 to a second switch trigger position in which the switch trigger 786 closes the motor switch 782 and activate the motor 34. When the operator moves the actuating lever 714 back to the deactivated positon (FIG. 32), the spring 802 expands as the switch linkage 806 moves back to the first switch linkage position, thus allowing the plunger 800 to move away from the motor switch 782, thereby deactivating the motor 34.

In some embodiments, when the activing lever 714 moves from the deactivated position to the activated positon of FIG. 2, the linkage members 54 each move approximately and the switch trigger 786 moves approximately 8 mm. By utilizing the plunger 800, the spring 802, and the switch linkage 806 of the over-travel mechanism 794, the linkage member 54 is permitted to move its full travel distance of 40 mm without over compressing the switch trigger 786, which only travels 8 mm, thereby preventing the switch trigger 786 from being crushed. Thus, the switch trigger 786 travels 20% or less than the distance of the linkage member 54 when the actuating lever 714 is moved between the deactivated and activated positions. Thus, in the embodiment of FIGS. 39-41, movement of the actuating lever 714 to the activated position simultaneously activates the motor 34 and causes the selection mechanism 40 to engage the translate mechanism 26 or radial drive mechanism 30, depending on which has been selected by the selection plate 82. The motor switch 782 arrangement of the embodiment of FIGS. 39-41 can also be used in drain cleaning machines 10 or 298. In alternative embodiments, instead of the actuating lever 714, a separate switch or actuator, such as a foot pedal, can be used to activate the motor 34.

Figure 42:
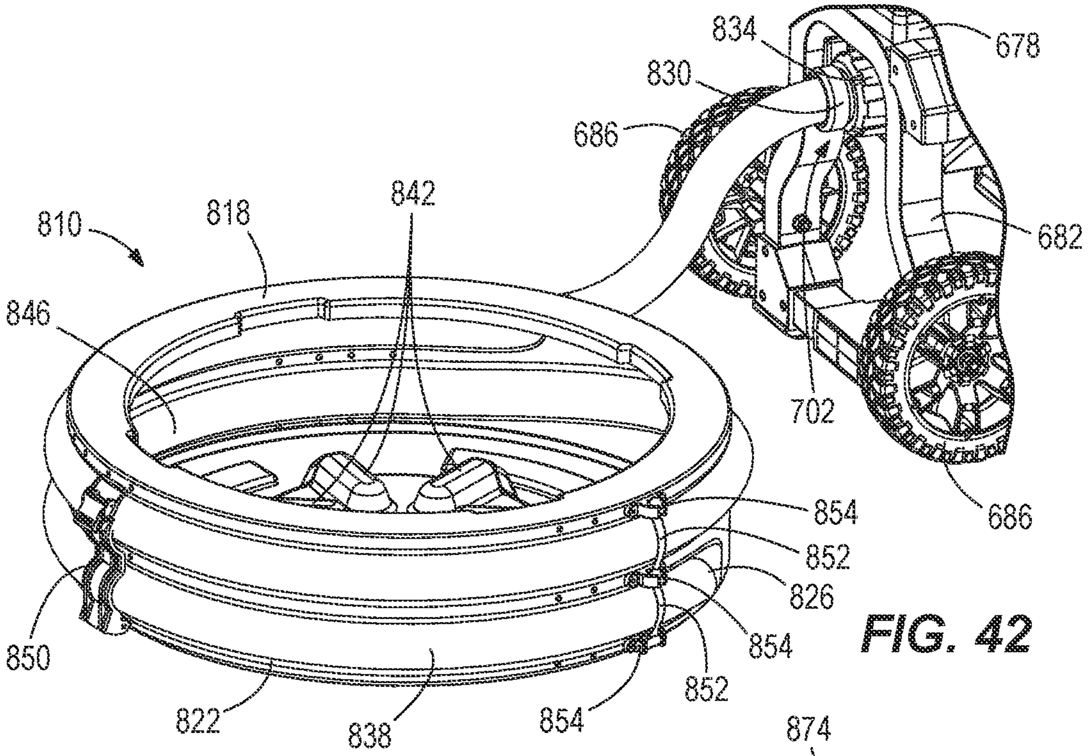
FIG. 42 is a perspective view of a pilot assembly coupled to the drain cleaning machine of FIG. 32.
Figure 43:
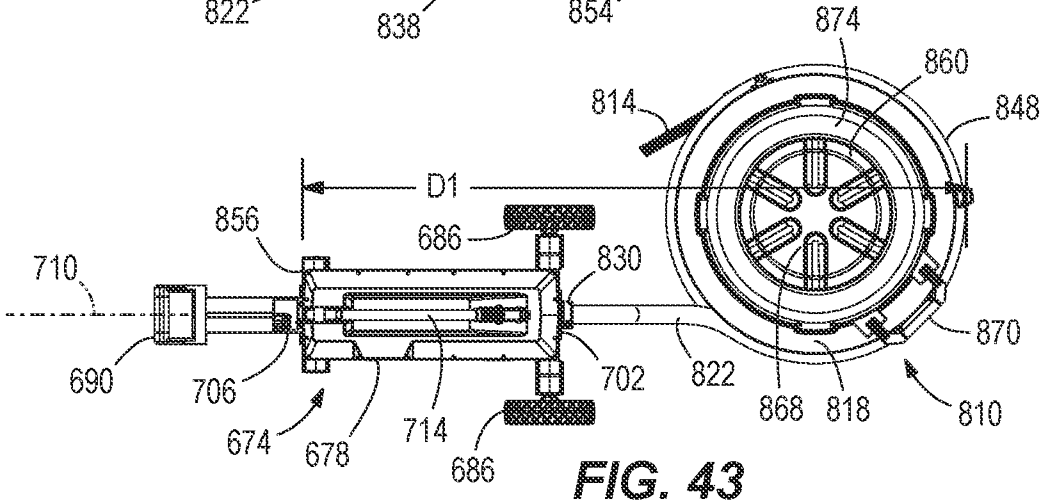
FIG. 43 is a plan view of the pilot assembly of FIG. 42 coupled to the drain cleaning machine of FIG. 32.
Figure 46:
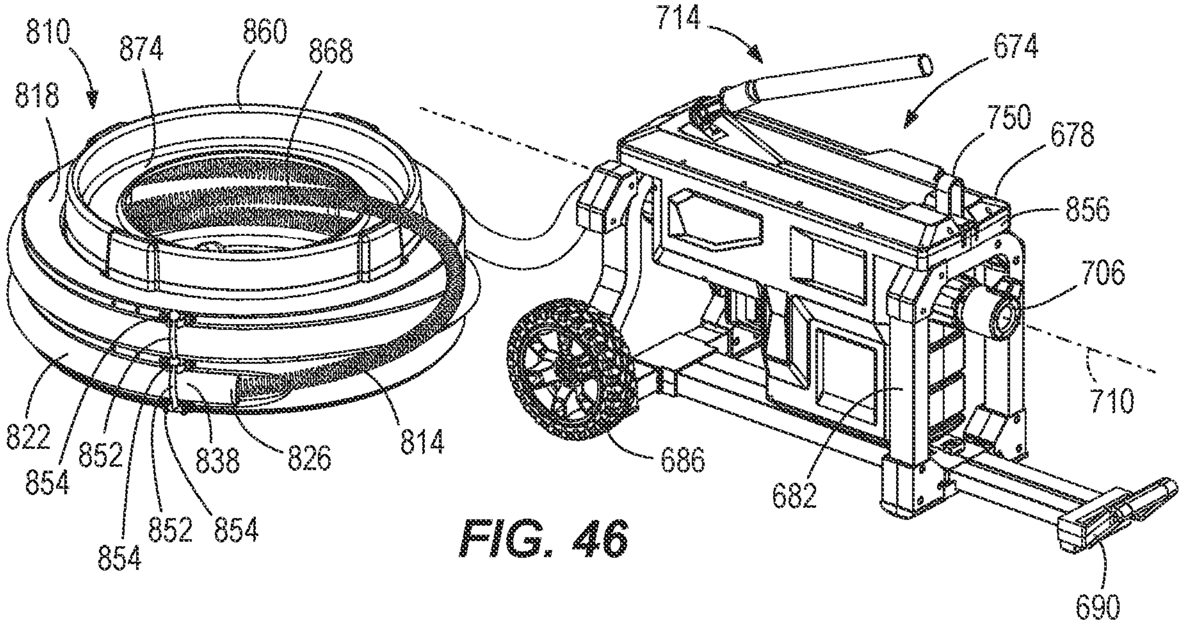
FIG. 46 is a perspective view of the pilot assembly of FIG. 42 coupled to the drain cleaning machine of FIG. 32.

As shown in FIGS. 42, 43, and 46, a pilot assembly 810 can assist an operator in feeding a snake 814 into the snake inlet 702 of the drain cleaning machine 674. Specifically, the pilot assembly 810 includes a pilot hub 818 and a pilot tube 822 coiled around the pilot hub 818 and configured to pilot the snake 814 to the drain cleaning machine 674. In some embodiments, the snake 814 can also be stored in the pilot tube 822. The pilot tube 822 has an entrance end 826 to receive the snake 814 and an exit end 830 for removable connection to a collar 834 of the snake inlet 702. The pilot hub 818 includes a helical groove 838 extending around the circumference of the pilot hub 818 to receive the pilot tube 822. The pilot hub 818 also includes a plurality of ribs 842 in an inner recess 846 of the pilot hub 818. The pilot hub 818 also includes a latch mechanism 850 and a plurality of rubber straps 852 secured between brackets 854 on the exterior of the pilot hub 818. The latch mechanism 850 and straps 852 are used to secure the pilot tube 822 to the pilot hub 818 when the pilot tube 822 is coiled around the pilot hub 818 within the groove 838.

Figure 44:
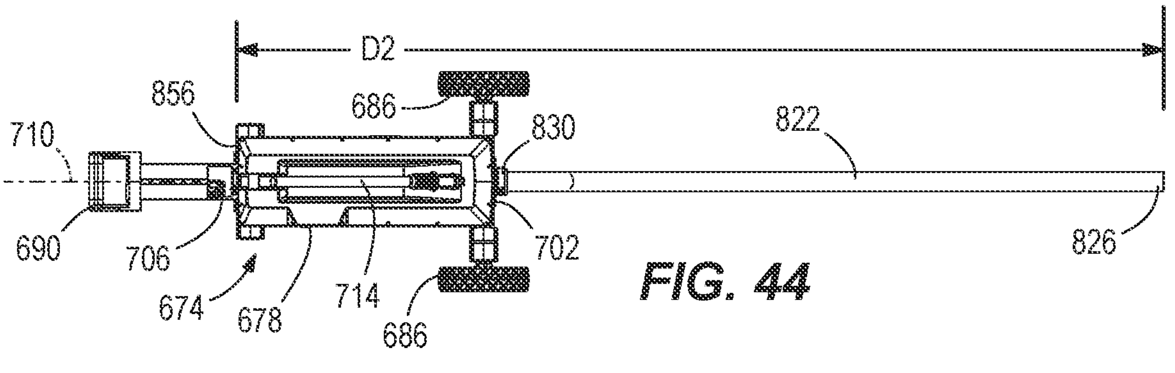
FIG. 44 is a plan view of a pilot tube coupled to the drain cleaning machine of FIG. 32.

As shown in FIG. 43, a first distance D1 running parallel to the snake axis 710 is defined between a front 856 of the drain cleaning machine 674 and a rear 858 of the pilot assembly 810. In some embodiments, D1 is less than or equal to approximately 66 inches. In comparison, when the pilot hub 818 is not used and the pilot tube 822 is stretched straight out behind the sectional sewer machine as shown in FIG. 44, a second distance D2 is defined between the front 856 of the drain cleaning machine 674 and the entrance end 826 of the pilot tube. In some embodiments, the distance D2 is approximately 174 inches. Thus, by using the pilot assembly 810 to coil the pilot tube 822 onto the pilot hub 818, the linear footprint behind the drain cleaning machine 674 is reduced by approximately 62%, providing space savings that make it easier and quicker for the operator to operate the drain cleaning machine 674.

Figure 45:
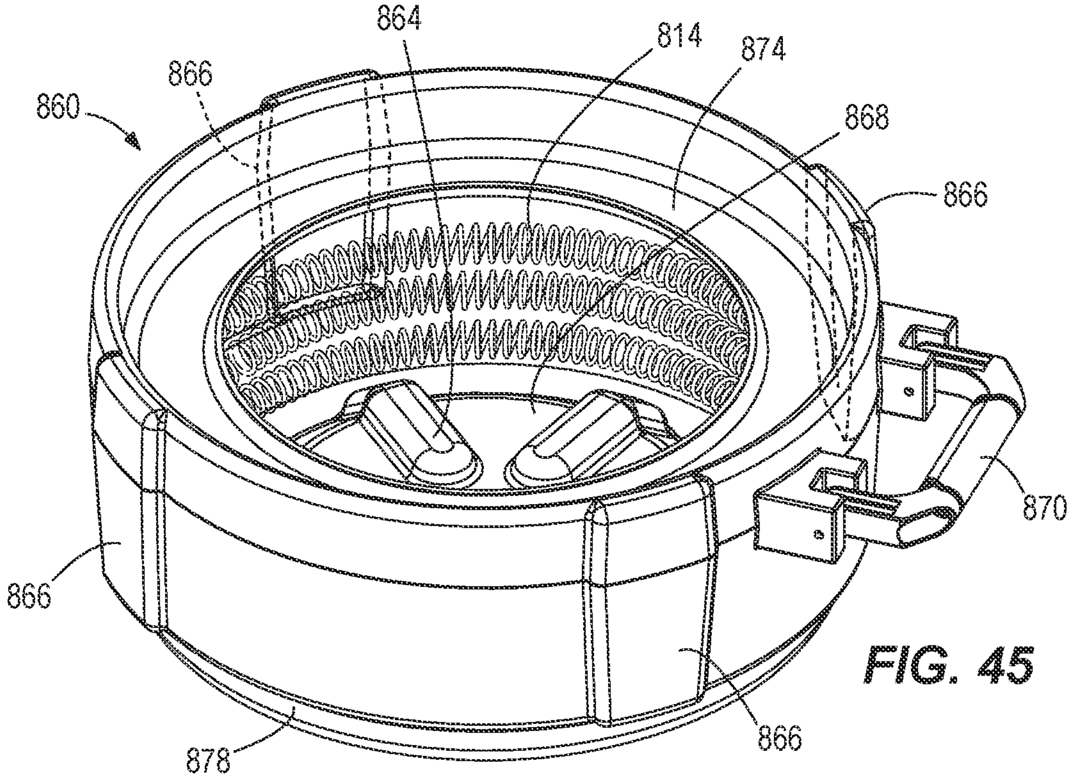
FIG. 45 is a perspective view of a snake drum for use with the pilot assembly of FIG. 42.

The recess 846 of the pilot hub 818 removably receives a snake drum 860 holding the snake 814, as shown in FIGS. 45 and 46. The snake drum 860 has a plurality of recesses on its underside that are defined by complimentary ribs 864 in an inner recess 868 of the snake drum 860. The recesses defined by the complimentary ribs 864 are configured to mate with the ribs 842 of the pilot hub 818, such that when the recesses of the snake drum 860 are received in the ribs 842 of the pilot hub 818, the snake drum 860 is rotationally constrained. The snake drum 860 also includes a plurality of circumferential brace points 866 in the inner recess 868 of the snake drum 860. In the illustrated embodiment, the snake drum 860 includes four brace points 866, but in other embodiments can include more or fewer brace points 866. The brace points 866 each provide a point against which an end of the snake 814 can push or anchor against when an operator is coiling the snake 814 into the inner recess 868 of the drum 860. An operator may also use his or her foot to anchor the snake 814 in the inner recess 868 as the snake 814 is coiled into the recess.

In other embodiments, the recesses of the snake drum 860 and the ribs 842 of the pilot hub 818 are omitted, such that the snake drum 860 is configured to rotate within the inner recess 846 of the pilot hub 818. Thus, in embodiments where the ribs 842 and recesses are omitted, after anchoring the snake 814 into the snake drum 860, the operator can perform a retracting operation and utilize the snake drum 860 rotating within the stationary pilot hub 818 to allow the snake 814 to coil itself within the inner recess 868 of the snake drum 860 with little to no operator assistance. Similarly, in embodiments where the ribs 842 and recesses are omitted, the operator can perform a feeding operation and utilize the snake drum 860 rotating within the stationary pilot hub 818 to allow the snake 814 to coil itself out of the inner recess 868, through the pilot tube 822, and through the snake passage of the drain cleaning machine 674 with little to no operator assistance.

Figure 47:
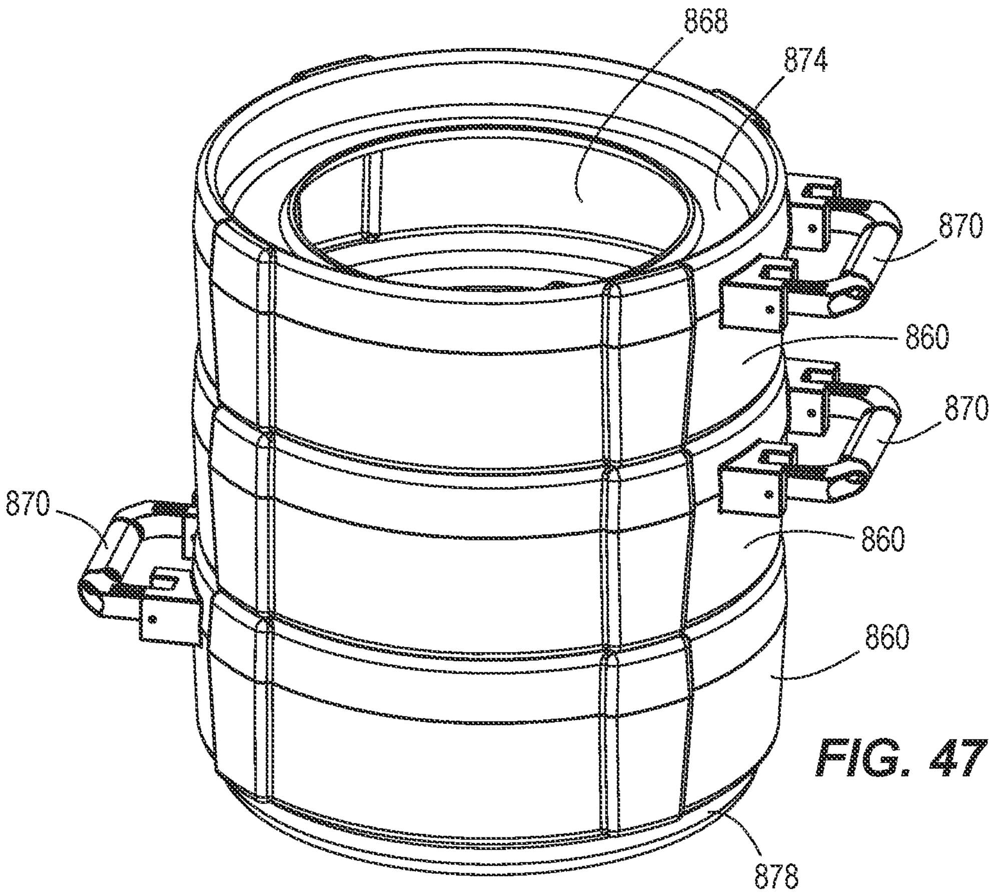
FIG. 47 is a perspective view of a plurality of the snake drums of FIG. 45 stacked on top of one another.

When the snake 814 has been coiled into the drum 860 after a drain cleaning operation, the recess 868 holds all of the debris cleaned out of the drain, so it is less likely that the debris spills on the ground, and it is easier to wash the drum 860 out off-site. The drum 860 also includes a handle 870 to allow an operator to easily carry the drum 860. The drum 860 also includes an upper rim 874 and a lower rim 878. The upper rim 874 of a first snake drum 860 is configured to receive the lower rim 878 of a second snake drum 860, such that multiple drums 860 can be stacked upon one another in a column, as shown in FIG. 47.

Figure 48:
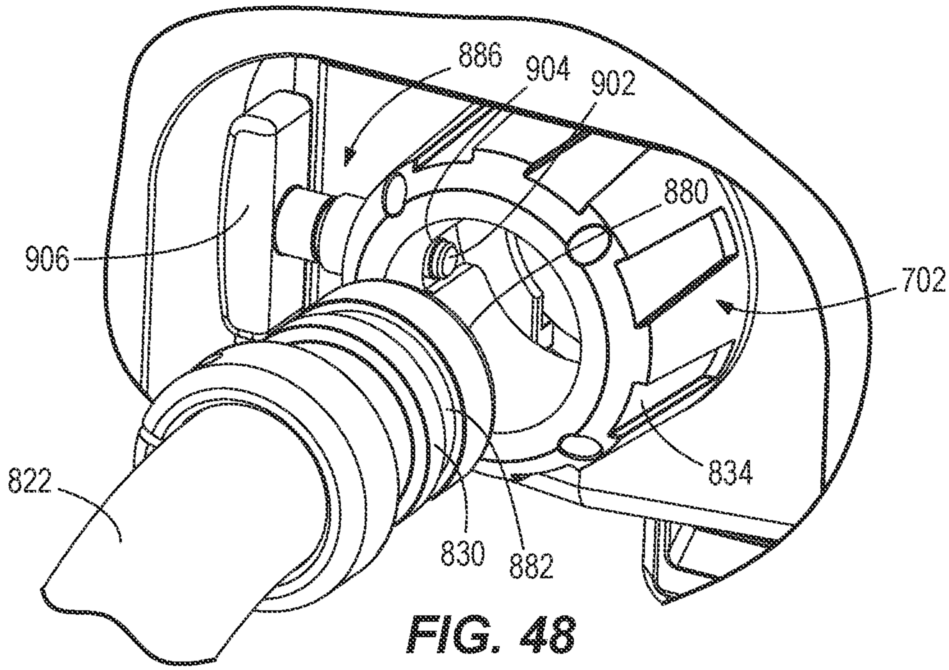
FIG. 48 is a perspective view of a pilot tube of the pilot assembly of FIG. 42 preparing to couple to the drain cleaning machine of FIG. 32.
Figure 49:
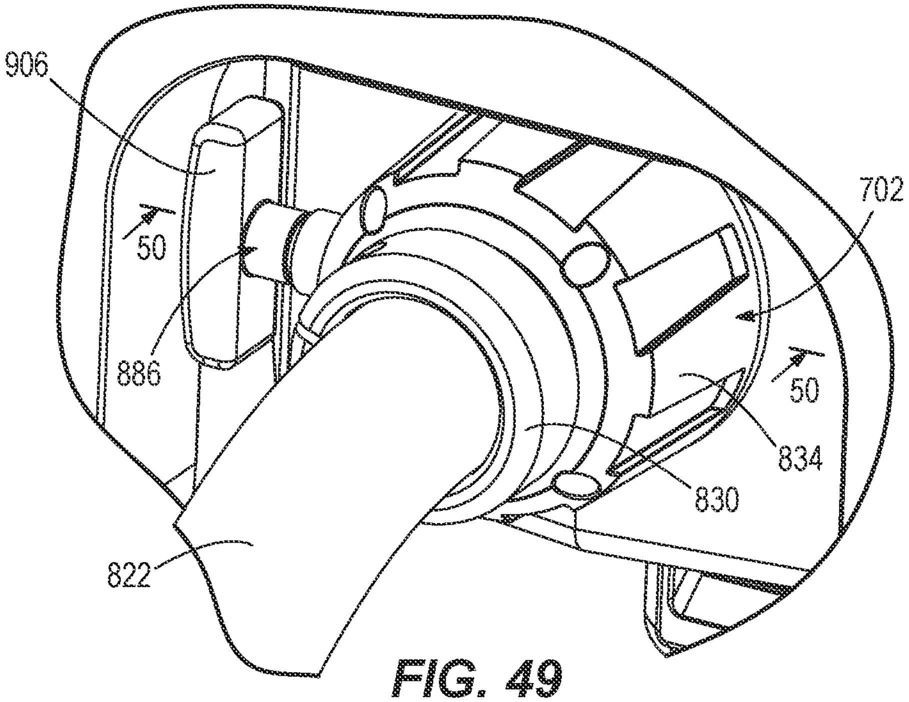
FIG. 49 is a perspective view of a pilot tube of the pilot assembly of FIG. 42 coupled to the drain cleaning machine of FIG. 32.
Figure 50:
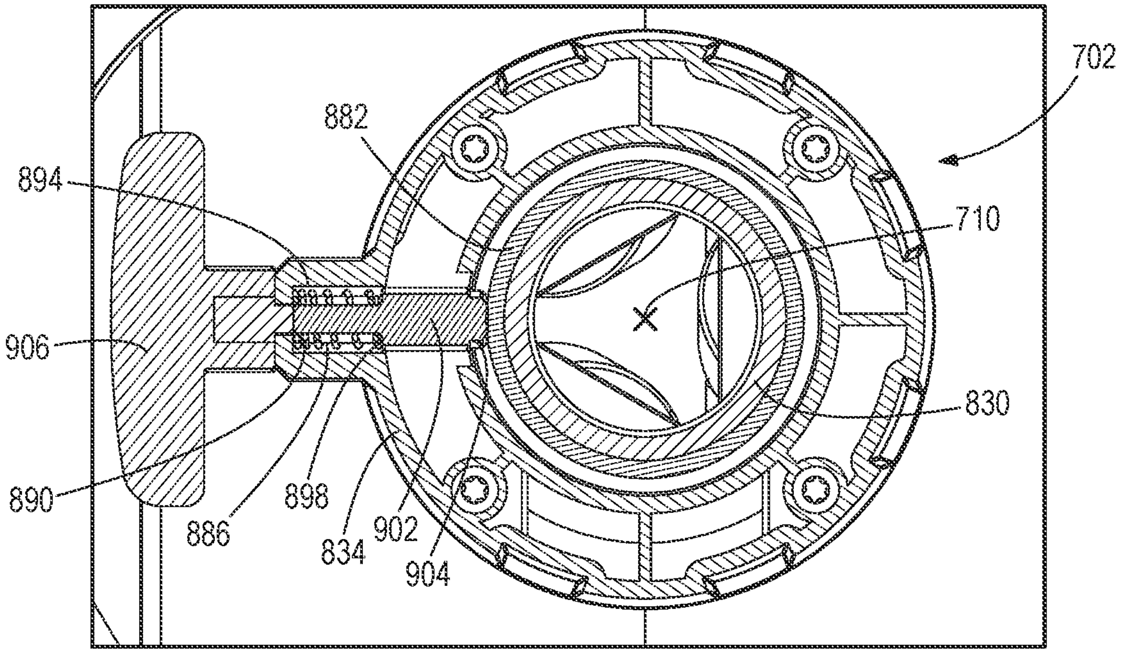
FIG. 50 is a cross-sectional view of a pilot tube of the pilot assembly of FIG. 42 coupled to the drain cleaning machine of FIG. 32.

As shown in FIGS. 48-50, the exit end 830 of the pilot tube 822 includes a tapered front edge 880 (FIG. 51) and a recess, such as circumferential slot 882, and the collar 834 of the snake inlet 702 includes a quick-connect mechanism 886. The quick-connect mechanism 886 includes a spring 890 seated within a cavity 894 of the collar 834. The spring 890 is arranged against a flange 898 of a detent member 902 and thus biases the detent member 902 through an aperture 904 in the collar 834 toward the snake axis 710. The detent member 902 is coupled to a pull knob 906 arranged outside of the collar 834.

Figure 51:
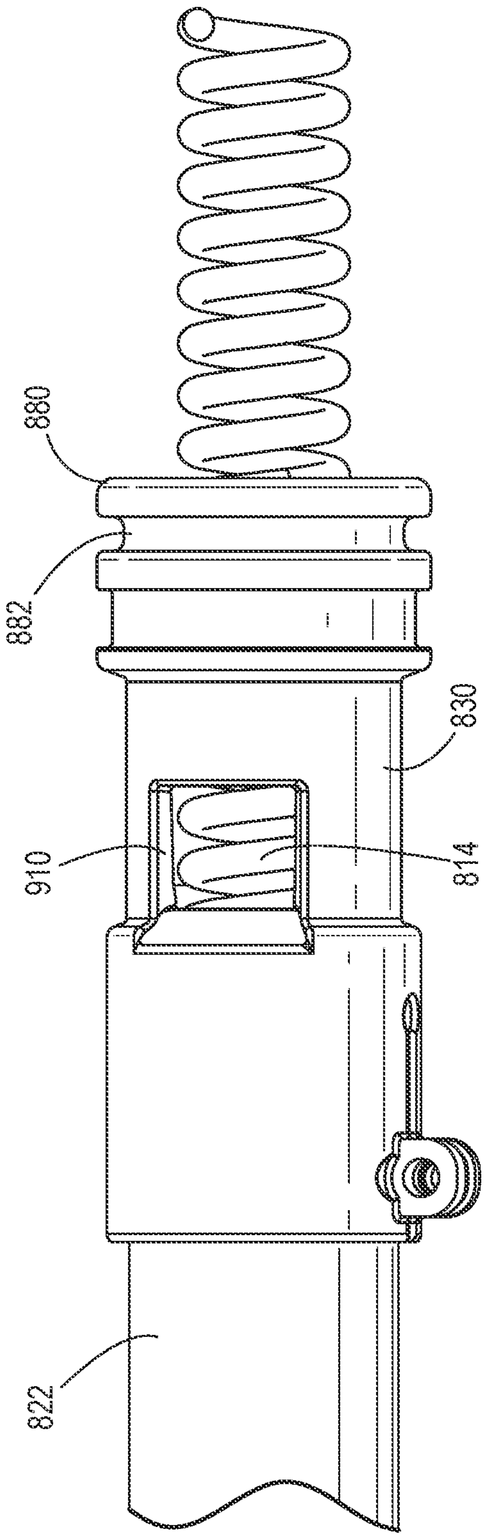
FIG. 51 is a perspective view of an exit end of a pilot tube of the pilot assembly of FIG. 42, according to another embodiment of the invention.

In another embodiment of the exit end 830 shown in FIG. 51, the exit end 830 includes a viewing window 910 that is configured to remain outside of the collar 834 of the snake inlet 702 when the exit end 830 is coupled to the collar 834. The viewing window 910 allows the operator to view the snake 814 in the exit end 830 to ensure the snake 814 has been fed a sufficient amount through the pilot tube 822 to reach the exit end 830, and also view the position of the snake 814 and ensure that the snake 814 is properly spinning or translating in radial drive or translate mode, respectively.

In operation, when an operator wishes to attach the exit end 830 to the collar 834, such that the snake 814 can be fed through the drain cleaning machine 674, the operator simply pushes the exit end 830 of the pilot tube 822 into the collar 834. As the exit end 830 slides into the collar 834, the rounded front edge 880 of the exit end 830 pushes the detent member 902 into the cavity 894. The operator continues pushing the exit end 830 into the collar 834 until the slot 882 is axially aligned with the detent member 902 i, at which point the detent member 902 is biased into the circumferential slot 882, thereby locking the exit end 830 onto the collar 834. When the circumferential slot 882 is axially aligned with the detent member 902, the detent member 902 is moveable between a first, locked position, in which it is biased into the slot 822, and a second, unlocked position, in which the detent member 902 is moved radially outward out of the slot 822. When the detent member 902 is in the locked position, the exit end 830 cannot be removed from the collar 834 without first pulling on the knob 906 to move the detent member to the unlocked position, and thus remove the detent member 902 from the circumferential slot 882. Because the circumferential slot 882 extends around the full circumference of the exit end 830, it does not matter what rotational orientation the exit end 830 is inserted into the collar 834, providing additional flexibility for the operator when attaching the pilot tube 822 to the snake inlet 702.

In operation, after securing the snake drum 860 in the pilot hub 818 by mating the ribs 842 of the pilot hub with the recesses of the snake drum, the operator feeds the snake 814 from the drum 860 into the entrance end 826 of the pilot tube 822 until the snake 814 is pushed through the exit end 830 and the collar 834 of the snake inlet 702, such that the snake 814 is arranged in the snake passage of the drain cleaning machine 674. The operator is able to verify the position and proper arrangement of the snake 814 via the viewing window 910. If the viewing window 910 is not visible to the operator from his or her operating location, the operator can simply rotate the exit end 830 within the collar 834 until the viewing window 910 is visible. The machine 674 can then be operated in radial drive or translate mode, during which time the operator can view that the snake 814 is properly spinning or translating via the viewing window 910. The pilot tube 822 is configured to allow the snake 814 to rotate or translate within the pilot tube 822, depending on which mode has been selected. When the snake 814 has been completely paid out, an additional snake 814 can be fed into the entrance end 826 of the pilot tube 822. Once the drain cleaning operation has finished, the snake 814 can be retracted into the pilot tube 822 by using the translate mechanism and rotating the motor in a retract direction (as described above) until an end of the snake 814 emerges from the entrance end 826, at which point the snake 814 can be grabbed and coiled into the snake drum 860.

Figure 56:
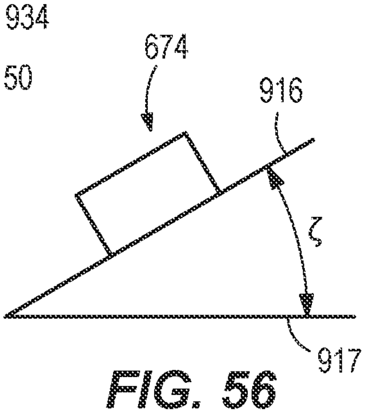
FIG. 56 is a schematic view of the drain cleaning machine of FIG. 32 supported on a sloped surface.

In some embodiments, the frame 682 includes one or more rubber feet 914 (FIG. 52) to inhibit the drain cleaning machine 674 from tipping over, particularly when the drain cleaning machine 674 is supported on a sloped support surface 916, such as a roof, defining an angle ζ with respect to a horizontal plane 917 substantially defined by, e.g., the earth (FIG. 56). Also, the frame 682 is wide enough, and the feet 914 are spaced from one another enough, such that the frame 682 enables the drain cleaning machine 674 to be supported on the sloped surface 916 when the angle ζ is up to 26.6 degrees without the drain cleaning machine 674 tipping over. In some embodiments, a tip-switch 918 (FIG. 52) is arranged on one of the feet 914 and is activated when the foot 914 to which the tip-switch 918 is arranged loses contact with the support surface 916, indicating that the drain cleaning machine 674 has become unstable and may be tipping over. Thus, when the tip switch 918 is activated, the motor 34 is deactivated, even if the actuating lever 714 is in the activated position, thereby reducing the possibility that the moving parts of the drain cleaning machine 674 are damaged during a fall.

Figure 52:
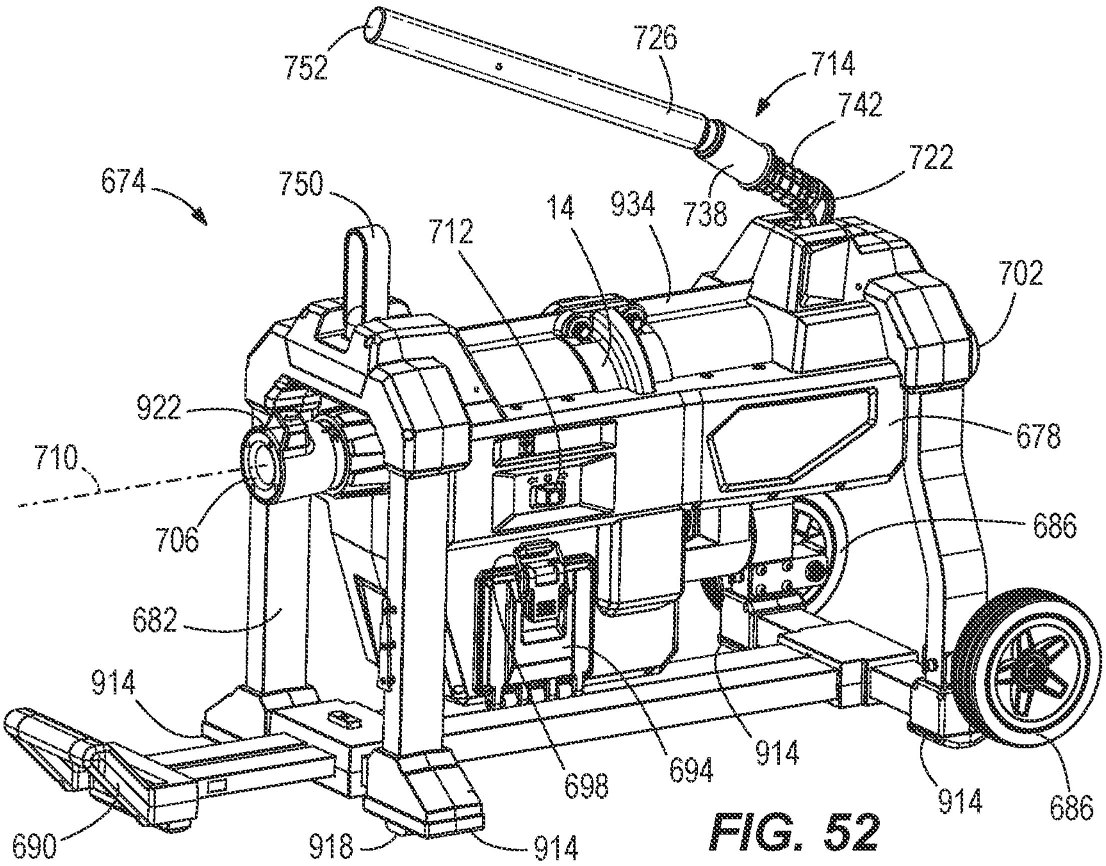
FIG. 52 is a perspective view of the drain cleaning machine of FIG. 32, with portions removed.
Figure 53:
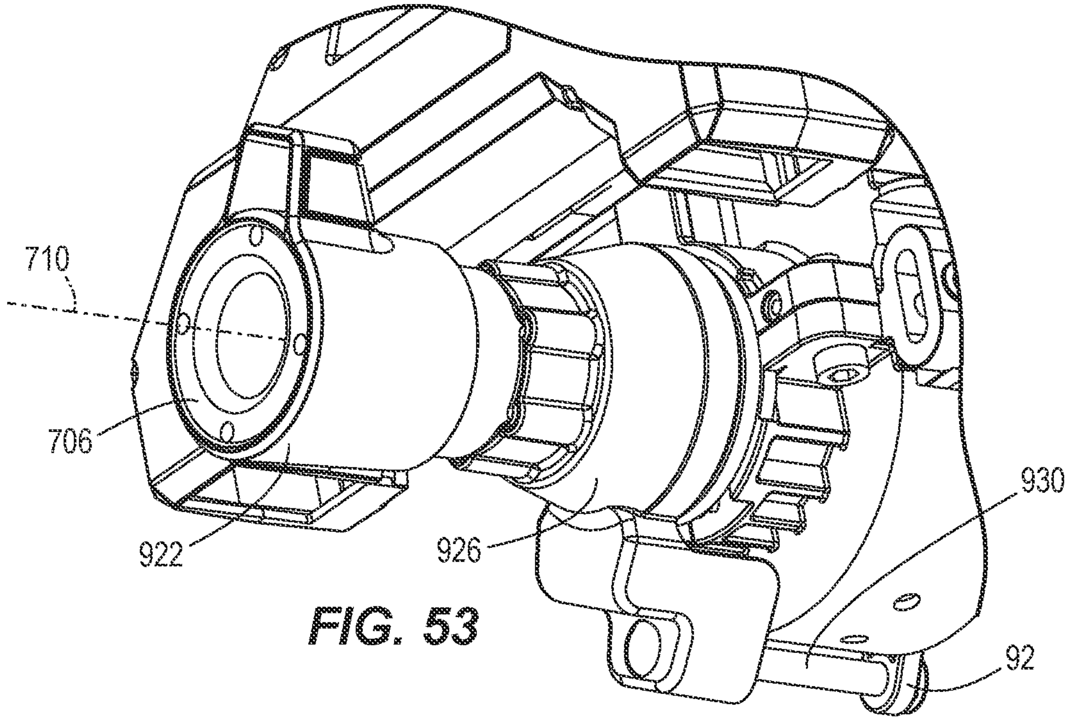
FIG. 53 is an enlarged perspective view of the drain cleaning machine of FIG. 32, with portions removed.

As shown in FIGS. 52 and 53, in some embodiment the selection mechanism 40 includes a selection collar 922 rotatably arranged on the snake outlet 706. The finger 92 of the selection plate 82 is coupled for rotation with the selection collar 922 via a first linkage member 926 that rotates with the selection collar 922 about the snake outlet 706 and a second linkage member 930 that couples the first linkage member 926 to the finger 92. Thus, the operator can rotate the selection collar 922 about the snake outlet 706 to thereby rotate the selection plate 82 between the translate position shown in FIGS. 5 and 6 and the radial drive position shown in FIGS. 4, 12, and 13.

Figure 54:
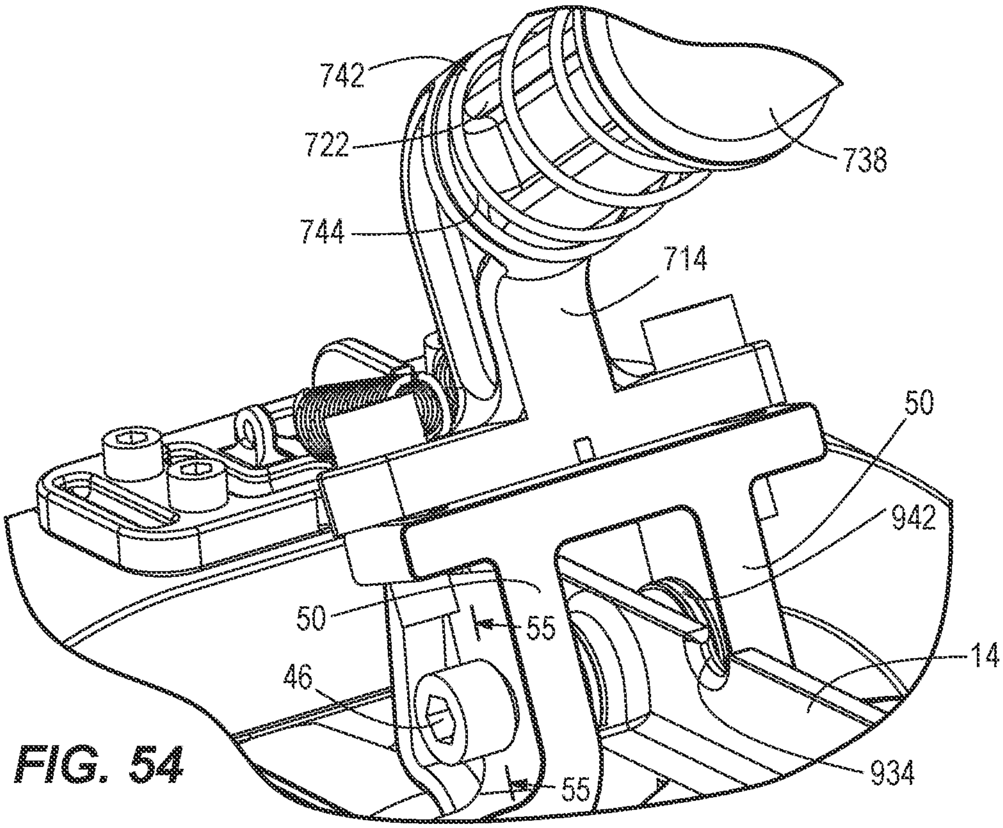
FIG. 54 is an enlarged perspective view of the drain cleaning machine of FIG. 32, with portions removed.
Figure 55:
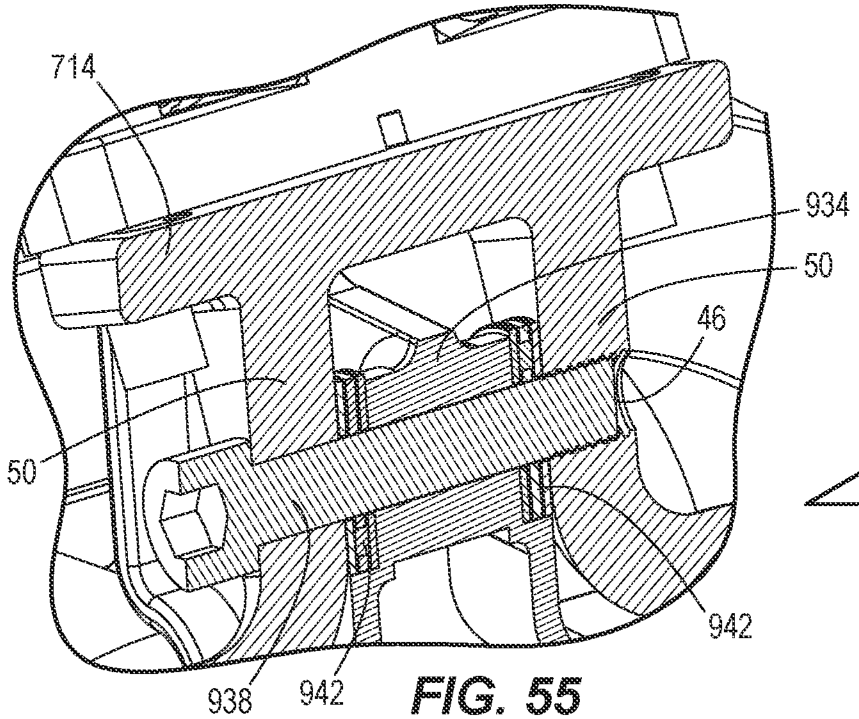
FIG. 55 is an enlarged perspective view of the drain cleaning machine of FIG. 32, with portions removed.

As shown in FIGS. 54 and 55, in some embodiments the arms 50 of the actuating lever 714 are coupled to a backbone 934 of the inner frame 14 at the pivot point 46 via a bolt 938 that extends through both arms 50 and the backbone 934. A thrust bearing 942 is arranged between each arm 50 and the backbone 934. In some embodiments, there is a 0 mm clearance between each arm 50 and the backbone 934 because the space between each arm 50 and the backbone 934 is substantially filled by the thrust bearing 942. Thus, the thrust bearings 942 inhibit vibration transferred from the inner frame 14 to the actuating lever 714 and the operator, as any clearance not filled by the thrust bearings 942 would amplify such vibration.

Various features of the invention are set forth in the following claims.

What is claimed is:

1. A drain cleaning machine for moving a snake in a drain, the drain cleaning machine comprising:

a housing;

a snake passage in the housing and defining a snake axis;

a motor configured to move the snake in the drain when the snake is arranged along the snake axis and the motor is activated;

a switch trigger configured to move between a first switch trigger position, in which the motor is not activated, and a second switch trigger position, in which the motor is activated, the switch trigger biased to the first switch trigger position;

an actuating lever moveable between a deactivated position, in which the drain cleaning machine is configured to disengage the snake, and an activated position, in which the drain cleaning machine is configured to engage the snake to move the snake; and a switch linkage configured to be moved by the actuating lever between a first switch linkage position, in which the switch trigger is moved to the first switch trigger position, and a second switch linkage position, in which the switch trigger is moved to the second switch trigger position;

wherein in response to the actuating lever moving from the deactivated position to the activated position, the switch linkage is moved from the first switch linkage position to the second switch linkage position, and in response to the actuating lever moving from the activated position to the deactivated position, the switch linkage is moved from the second switch linkage position to the first switch linkage position.

2. The drain cleaning machine of claim 1, further comprising a plunger engaged against the switch trigger and a spring between the plunger and the switch linkage, the spring biasing the switch linkage toward the first position.

3. The drain cleaning machine of claim 2, wherein the switch trigger, the switch linkage, the spring, and the plunger are arranged in a bracket in the housing.

4. The drain cleaning machine of claim 2, wherein the plunger is moveable between a first plunger position, in which the switch trigger is in the first switch trigger position, and a second plunger position, in which the switch trigger is in the second switch trigger position.

5. The drain cleaning machine of claim 4, further comprising:

a linkage member configured to be moved by the actuating lever when the actuating lever moves between the deactivated and activated positions; and a push member coupling the linkage member to the switch linkage.

6. The drain cleaning machine of claim 5, wherein the actuating lever is coupled to the linkage member via an arm, and wherein when the actuating lever moves to the activated position, the arm pivots, moving the linkage member toward the switch trigger.

7. The drain cleaning machine of claim 6, wherein when the actuating lever moves to the activated position, the push member pushes the switch linkage to the second switch position, compressing the spring and pushing the plunger to the second plunger position, in which the plunger depresses the switch trigger, moving the switch trigger to the second switch trigger position.

8. The drain cleaning machine of claim 7, wherein when the actuating lever moves to the deactivated position, the spring expands as the switch linkage moves back to the first switch linkage position, allowing the plunger to move away from the switch trigger and the switch trigger to move to the first switch trigger position.

9. The drain cleaning machine of claim 5, wherein when the actuating lever moves between the deactivated and activated positions, the switch trigger travels less than or equal to 20% of a distance traveled by the linkage member.

10. The drain cleaning machine of claim 9, wherein the linkage member moves 40 mm and the switch trigger moves 8 mm.

11. A drain cleaning machine for moving a snake in a drain, the drain cleaning machine comprising:

a housing;

a snake passage in the housing and defining a snake axis;

a motor configured to move the snake in the drain when the snake is arranged along the snake axis and the motor is activated;

a switch trigger configured to activate the motor when pressed;

an actuating lever moveable between a deactivated position and an activated position;

a switch linkage configured to be moved by the actuating lever toward the switch trigger;

a plunger configured to depress the switch trigger;

a spring seated against the plunger and configured to bias the switch linkage away from the plunger; and wherein when the actuating lever moves to the activated position, the switch linkage is pushed toward the switch trigger, compressing the spring and pushing the plunger toward the switch trigger, causing the plunger to depress the switch trigger.

12. The drain cleaning machine of claim 11, wherein the plunger is moveable between a first plunger position, in which the switch trigger is not pressed and a second plunger position, in which the switch trigger is pressed.

13. The drain cleaning machine of claim 12, wherein the switch trigger, the switch linkage, the spring, and the plunger are arranged in a bracket in the housing.

14. The drain cleaning machine of claim 13, further comprising a linkage member configured to be moved by the actuating lever when the actuating lever moves between the deactivated and activated positions, the linkage member being coupled to the actuating lever via an arm.

15. The drain cleaning machine of claim 14, wherein when the actuating lever moves to the activated position, the arm pivots, moving the linkage member toward the switch trigger.

16. The drain cleaning machine of claim 15, wherein when the actuating lever moves between the deactivated and activated positions, the switch trigger travels less than or equal to 20% of a distance traveled by the linkage member.

17. The drain cleaning machine of claim 15, wherein the linkage member moves 40 mm and the switch trigger moves 8 mm.

18. A drain cleaning machine for moving a snake in a drain, the drain cleaning machine comprising:

a snake passage defining a snake axis;

a motor configured to move the snake in the drain when the snake is arranged along the snake axis and the motor is activated;

a radial drive mechanism used to spin the snake about the snake axis, the radial drive mechanism being switchable between an engaged state and a disengaged state;

a translate mechanism used to translate the snake along the snake axis, the translate mechanism being switchable between an engaged state and a disengaged state;

a selection mechanism configured to switch the radial drive mechanism from the disengaged state to the engaged state and configured to switch the translate mechanism from the disengaged state to the engaged state, a switch trigger configured to move between a first switch trigger position, in which the motor is not activated, and a second switch trigger position, in which the motor is activated, the switch trigger biased to the first switch trigger position;

an actuating lever moveable between a deactivated position and an activated position; and a switch linkage configured to be moved by the actuating lever between a first switch linkage position, in which the switch trigger is moved to the first switch trigger position, and a second switch linkage position, in which the switch trigger is moved to the second switch trigger position;

wherein moving the actuating lever to the activated position activates the motor and causes the selection mechanism to engage the translate mechanism or the radial drive mechanism.

19. The drain cleaning machine of claim 18, further comprising a plunger engaged against the switch trigger and a spring between the plunger and the switch linkage, the spring biasing the switch linkage toward the first position.

20. The drain cleaning machine of claim 19, wherein the plunger is moveable between a first plunger position, in which the switch trigger is in the first switch trigger position, and a second plunger position, in which the switch trigger is in the second switch trigger position.

* * * * *